US011260407B2

(12) United States Patent
Zhang

(10) Patent No.: US 11,260,407 B2
(45) Date of Patent: Mar. 1, 2022

(54) METHODS AND SYSTEMS FOR A FUEL INJECTOR ASSEMBLY

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 15/251,852

(22) Filed: Aug. 30, 2016

(65) Prior Publication Data
US 2018/0058405 A1 Mar. 1, 2018

(51) Int. Cl.
*B05B 1/16* (2006.01)
*F02M 61/18* (2006.01)
(Continued)

(52) U.S. Cl.
CPC .......... *B05B 1/1663* (2013.01); *F02D 41/20* (2013.01); *F02D 41/402* (2013.01);
(Continued)

(58) Field of Classification Search
CPC .......... B05B 1/1663; F02M 61/1806; F02M 51/0653; F02M 61/042; F02M 61/182; F02M 61/1813; F02D 41/20; F02D 41/402; F02D 2041/2051; F02D 2041/2055; F02D 2041/2058
(Continued)

(56) References Cited

U.S. PATENT DOCUMENTS

| 4,266,727 A | * | 5/1981 | Happel | F02M 43/04 239/409 |
| 5,199,398 A | * | 4/1993 | Nylund | F02M 43/04 123/299 |

(Continued)

FOREIGN PATENT DOCUMENTS

| DE | 102013022260.5 | * 12/2013 | ............. F02D 19/06 |
| EP | 2268913 B1 | 9/2014 | |
| EP | 2705239 B1 | 8/2015 | |

OTHER PUBLICATIONS https://howthingsfly.si.edu/ask-an-explainer/air-fluid, "Ask an explainer," Mar. 13, 2017, of Smithsonian National Air and Space Museum (Year: 2017).*
(Continued)

*Primary Examiner* — Chee-Chong Lee
(74) *Attorney, Agent, or Firm* — Geoffrey Brumbaugh; McCoy Russell LLP

(57) ABSTRACT

Methods and systems are provided for injecting fuel through three different rows of injector nozzles, where each row of the injector nozzle is arranged along a different vertical plane of the injector body. In one example, an injector needle housed movably inside the injector body may supply high-pressure fuel to each of the rows of injector nozzles sequentially to deliver up to five fuel injections in one actuation cycle of the fuel injector. In another example, a fuel injector may include three injector needles, where movement of each injector needle inside a respective chamber of the fuel injector body may supply high-pressure fuel to the chamber from where the fuel may be injected through the coupled fuel injector nozzles.

18 Claims, 25 Drawing Sheets

(51) Int. Cl.
*F02D 41/40* (2006.01)
*F02M 61/04* (2006.01)
*F02D 41/20* (2006.01)

(52) U.S. Cl.
CPC ........ *F02M 61/042* (2013.01); *F02M 61/182* (2013.01); *F02M 61/1813* (2013.01); *F02D 2041/2051* (2013.01); *F02D 2041/2055* (2013.01); *F02D 2041/2058* (2013.01); *F02M 2200/46* (2013.01); *Y02T 10/40* (2013.01)

(58) Field of Classification Search
USPC .......................................................... 239/5
See application file for complete search history.

(56) References Cited

U.S. PATENT DOCUMENTS

| | | | |
|---|---|---|---|
| 5,645,225 A * | 7/1997 | Hasegawa | F02M 61/18 239/533.12 |
| 5,669,334 A * | 9/1997 | Schonfeld | F02M 43/04 123/25 C |
| 6,293,261 B1 | 9/2001 | Oemcke et al. | |
| 6,705,278 B2 | 3/2004 | McGee et al. | |
| 7,056,474 B2 | 6/2006 | Dumas et al. | |
| 7,774,128 B2 | 8/2010 | Kim | |
| 7,803,039 B2 | 9/2010 | Inoue et al. | |
| 8,181,631 B2 | 5/2012 | Bohr et al. | |
| 8,573,187 B2 | 11/2013 | Knittel et al. | |
| 8,707,935 B2 | 4/2014 | Weber et al. | |
| 2002/0113140 A1 | 8/2002 | Beck | |
| 2002/0195081 A1 | 12/2002 | McGee et al. | |
| 2003/0066509 A1 * | 4/2003 | Shafer | F02D 41/3035 123/305 |
| 2006/0243827 A1 * | 11/2006 | Cooke | F02M 45/086 239/533.12 |
| 2013/0200174 A1 | 8/2013 | Jeon et al. | |
| 2014/0034023 A1 | 2/2014 | Coldren | |
| 2016/0319754 A1 * | 11/2016 | Kalenborn | F02M 43/04 |

OTHER PUBLICATIONS

Zhang, Xiaogang, "Methods and Systems for a Fuel Injector Assembly," U.S. Appl. No. 14/978,801, filed Dec. 22, 2015, 69 pages.
Zhang, Xiaogang, "An Annulus Nozzle Injector with Tangential Fins," U.S. Appl. No. 14/932,780, filed Nov. 4, 2015, 50 pages.
Zhang, Xiaogang, "An Annulus Nozzle Injector with Tangential Fins," U.S. Appl. No. 14/932,824, filed Nov. 4, 2015, 50 pages.
National Intellectual Property Administration of the People's Republic of China, Office Action and Search Report Issued n Application No. 201710754526.2, dated May 20, 2021, 11 pages. (Submitted with Partial Translation).

* cited by examiner

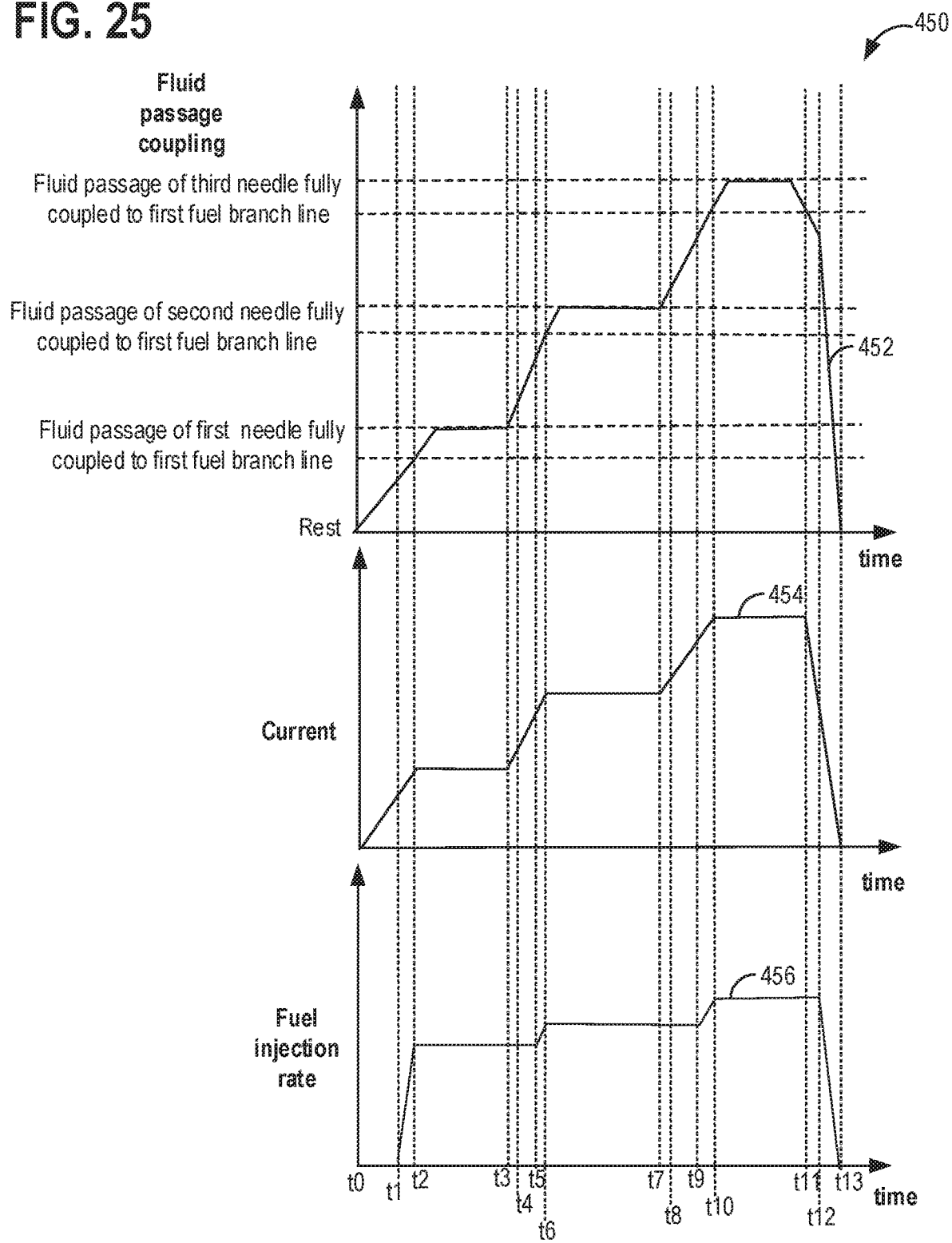

METHODS AND SYSTEMS FOR A FUEL INJECTOR ASSEMBLY

FIELD

The present description relates generally to methods and systems for a fuel injector assembly.

BACKGROUND/SUMMARY

Internal combustion engines are equipped with one or more fuel injectors for delivering fuel to the engine for combustion. During certain engine operating conditions, it may be desirable to perform more than one fuel injection. For example, a fuel injection event may be split into three separate fuel injections, such as a pilot injection, a main fuel injection, and a post fuel injection. As such, a pilot fuel injection is performed before the main fuel injection, and is provided to address combustion noise and enhance combustion while a post fuel injection is performed after the main fuel injection, and is provided for improved emission control. Thus, multiple split fuel injections may be performed during a single combustion cycle in order to improve engine performance and reduce emissions.

Fuel injectors are controlled by an engine controller, which provides an actuation signal to the injector for each fuel delivery event, such as the fuel injector described in U.S. Pat. No. 6,705,278. For injecting fuel during split fuel injections, different actuation signals are provided to the fuel injector, wherein the split fuel injections may include a main fuel injection event flanked by fuel pre-injection, and fuel post-injection events.

However, the inventors herein have recognized some issues with the above fuel injector control. As an example, when a time interval between two injections is short, providing an actuation signal for each injection can result in overlapping signals. Consequently, there is a limit on the minimum duration of the time interval. Thus, when short time intervals are desired, providing separate actuation signals for each injection cause variability in the amount of fuel delivered and timing of each fuel delivery event. As a result, engine performance and emission control are compromised. Further, the injector ector cycles through an actuation cycle for each of the split fuel injections. This can cause additional wear and tear on the injector. Still further, as the controller is required to generate a signal for each of the split injections, the controller consumes more resources, thereby decreasing the efficiency of the control system.

In one example, the issues described above may be addressed by a method for a fuel injector, comprising injecting fuel from the fuel injector by displacing a plurality of fuel injector needles of the fuel injector to deliver fuel through a first nozzle coupled to a first fuel chamber, a second nozzle coupled to a second fuel chamber, and a third nozzle coupled to a third fuel chamber during a single actuation cycle of the fuel injector. Each of the first nozzle, the second nozzle, and the third nozzle may be positioned along different vertical planes of a fuel injector body. Multiple fuel injections may be performed in one actuation cycle of the fuel injector to deliver high-pressure fuel from each of the chambers through the coupled nozzles into different locations inside the combustion chamber, resulting in enhanced fuel spray atomization, and reduced fuel spray penetration.

Another example method for a fuel injector may include moving an injector needle from a first position to a fourth position via a second position and a third position, performing a first fuel injection at the second position, a second fuel injection at the third position, and a third fuel injection at the fourth position and subsequently moving the needle from the fourth position to the first position via the third position and the second position, and performing a fourth fuel injection at the third position and a fifth fuel injection at the second position. The first through the fifth fuel injections may be performed during a single cycle of the injector needle movement. Fuel may be injected through a first row of nozzles, a second row of nozzles, and/or a third row of nozzles at each of the fuel injection positions, wherein the first row of nozzles may be positioned vertically lower than the second row of nozzles, and the second row of nozzles may be vertically lower than the third row of nozzles along a fuel injector body.

In this way, multiple fuel injections with quick transition time between consecutive fuel injections may be performed during a single actuation cycle of the fuel injector. Fuel may be injected through fuel injector nozzles located at different vertical planes of the fuel injector body, ensuring optimal fuel distribution and reduced fuel spray penetration. Additionally, injecting high-pressure fuel from the nozzle holes at each position of the fuel injector may increase fuel spray atomization. Fuel spray pattern in combination with quick transition time between consecutive fuel injections during the single actuation cycle may reduce fuel injector wear and tear, enhance combustion efficiency, and reduce harmful emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 25 shows an example operating sequence of injecting fuel through the fuel injector assembly of FIG. 18.

DETAILED DESCRIPTION

The following description relates to systems and methods for operating a fuel injector assembly. The fuel injector may include multiple rows (for example, three rows) of fuel injector nozzle holes, wherein each row of nozzle holes may be positioned along a different vertical plane of a fuel injector body. High-pressure fuel from an internal fuel chamber inside the fuel injector body may be delivered through each row of the nozzle holes to outside the fuel injector body. A downward movement of one or more fuel injector needles along the internal fuel chamber may sequentially deliver fuel from each of the rows of nozzle holes. The downward movement of the fuel injector needle/s may be adjusted by an actuator receiving signals from a controller to perform a single fuel injection or up to five fuel injections in one actuation cycle of the fuel injector needle based on engine operating conditions. Delivering fuel through different rows of injector nozzles may reduce fuel spray penetration, decrease fuel spray interaction, enhance spray atomization, thereby increasing fuel combustion efficiency and reducing emission degradation.

Figure 1:
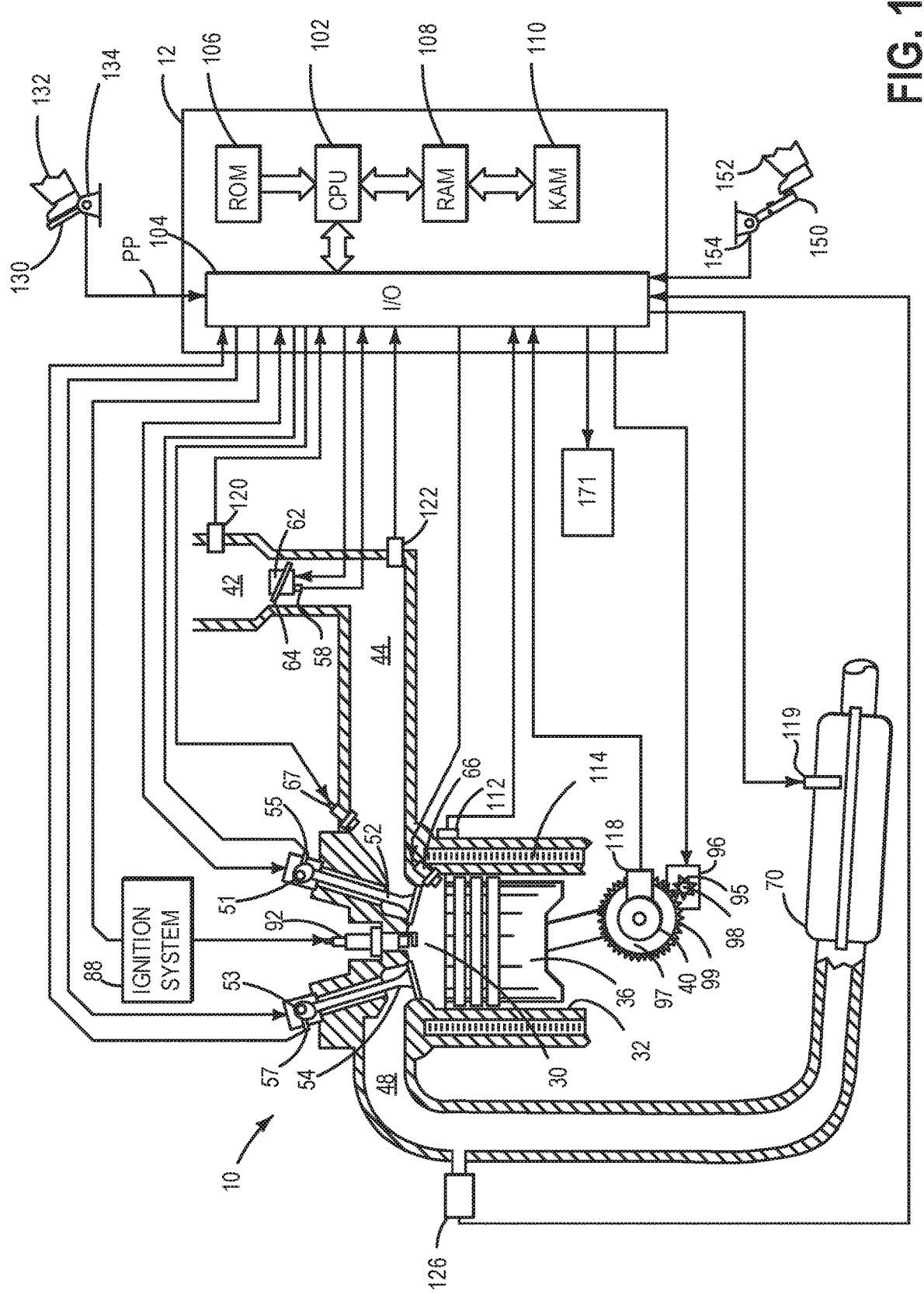
FIG. 1 shows a schematic depiction of an internal combustion engine.

The fuel injector assembly may be incorporated in an engine as shown in FIG. 1. A controller may send control signals to an electric actuator coupled to a needle of the fuel injector assembly to adjust the position of the needle, as shown in FIGS. 2-6. The controller may perform a control routine, such as the example routine of FIG. 7, to determine a fuel injection strategy (e.g., one, two, or three injections during a combustion cycle). In conjunction with the routine of FIG. 7, based on the fuel injection strategy, the controller may perform example routines of FIGS. 8, 10, 12, 14, and 16 to deliver one, two, three, four, or five fuel injections per combustion cycle with a single actuation of the fuel injector assembly. Specifically, the controller may provide signals to an actuator of the injector assembly based on the routines described below. An example single fuel injection by utilizing the fuel injection assembly is shown at FIG. 9. FIGS. 11 and 13 show examples of two and three fuel injections, respectively, performed during a single actuation event of the fuel injection assembly, and FIGS. 15 and 17 show an example of four and five fuel injections performed during a single actuation of the fuel injector assembly.

Figure 18:
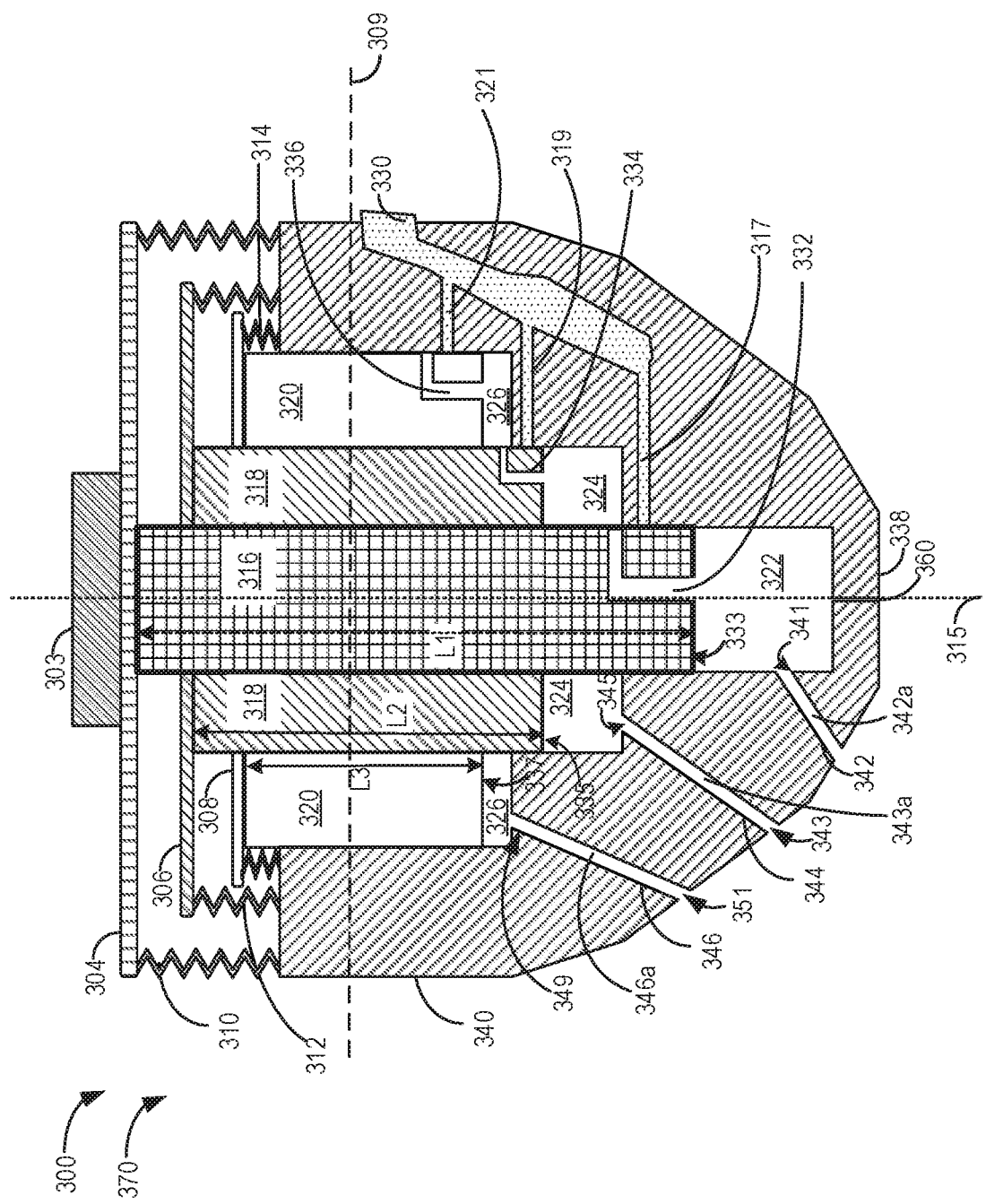
FIG. 18 shows a second embodiment of a fuel injector assembly used in the engine of FIG. 1 in a closed position.

A second embodiment of a fuel injector assembly, illustrated in FIG. 18, may be coupled to the engine of FIG. 1 to inject desired fuel volume for combustion. The second embodiment may include a first injector, housed at least partially within a second annulus injector, and the second annulus injector is movably partially housed within a third annulus injector needle. A controller may send control signals to an electric actuator coupled to the first injector needle of the fuel injector assembly to adjust the position of the first, the second, and the third injector needles, as shown in FIGS. 19-22. The controller may perform a control routine, such as the example routine of FIG. 23, to determine a fuel injection strategy. A method for operating the second embodiment of the fuel injector assembly is illustrated in FIG. 24. In conjunction with the routines of FIG. 23 and FIG. 24, the controller may perform the example routine of FIG. 25 to inject fuel.

A fuel injector assembly with three or more rows of fuel injector nozzles arranged circumferentially around an injector body may fluidically connect a fuel chamber to a combustion chamber or intake manifold for injecting fuel for combustion. In one example, a first row of fuel injector nozzles may be arranged vertically higher than a second row of fuel injector nozzles and the second row of injector nozzles may be arranged vertically higher than a third row of nozzles along the injector body. Delivering fuel through rows of injector nozzles, which are at different vertical planes, may reduce fuel penetration, fuel impingement into cylinder walls, enhance combustion characteristics, which in turn may reduce emission degradation.

In one embodiment of a fuel injector assembly, a fuel injector needle may be actuated to move inside a chamber of the fuel injector body to fluidically connect an annulus cut portion of the fuel injector needle to each of the rows of the fuel injector nozzle sequentially to deliver high pressure fuel through either the first row, the second row, or the third row of fuel injector nozzles. The movement of the injector needle may be controlled to deliver up to five fuel injections in one actuation cycle of the fuel injector depending on engine operating parameters.

A second embodiment of the fuel injector assembly may include three injector needles movably housed inside respective chambers in the fuel injector body. Movement of the injector needles with an injector body may supply high-pressure fuel to the respective chambers in the injector body. Each of the chamber may be fluidically coupled to a row of injector nozzles. High-pressure fuel from each chamber may be injected through the respective rows of fluidically coupled nozzle hole based on engine operating conditions.

FIGS. 1-6 and FIGS. 18-22 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector by a fuel system (not shown) including a fuel tank, fuel pump, and fuel rail (not shown). In addition, intake manifold 44 is shown communicating with optional electronic throttle 62, which adjusts a position of throttle plate 64 to control airflow from air intake 42 to intake manifold 44. Distributorless ignition system 88 provides an ignition spark to combustion chamber 30 via spark plug 92 in response to controller 12. In another example, where the engine is a diesel engine, fuel injected into the combustion chamber may be ignited by compression ignition. Compression of the air-fuel mixture inside the combustion chamber may result in a rise in temperature, which in turn may ignite the fuel. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including, microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four-stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As explained above, a direct fuel injector 66 may be used to supply fuel directly to a cylinder of an engine, as shown in FIG. 1. Additionally or alternatively, a port fuel injector 67 may be used for delivering fuel into the intake manifold 44. As shown, fuel injectors 66 and 67 may receive signals from the controller 12 for controlling fuel injection during engine operation. Specifically, an injector actuator coupled to each of the fuel injectors 66 and 67 may receive electrical signals from the controller 12 based on a fuel injection strategy for delivering fuel. A fuel injector assembly described below with respect to FIGS. 2-5 and a second embodiment of a fuel injector assembly described below with reference to FIGS. 18-22, may be configured as a direct fuel injector or a port fuel injector.

Figure 2:
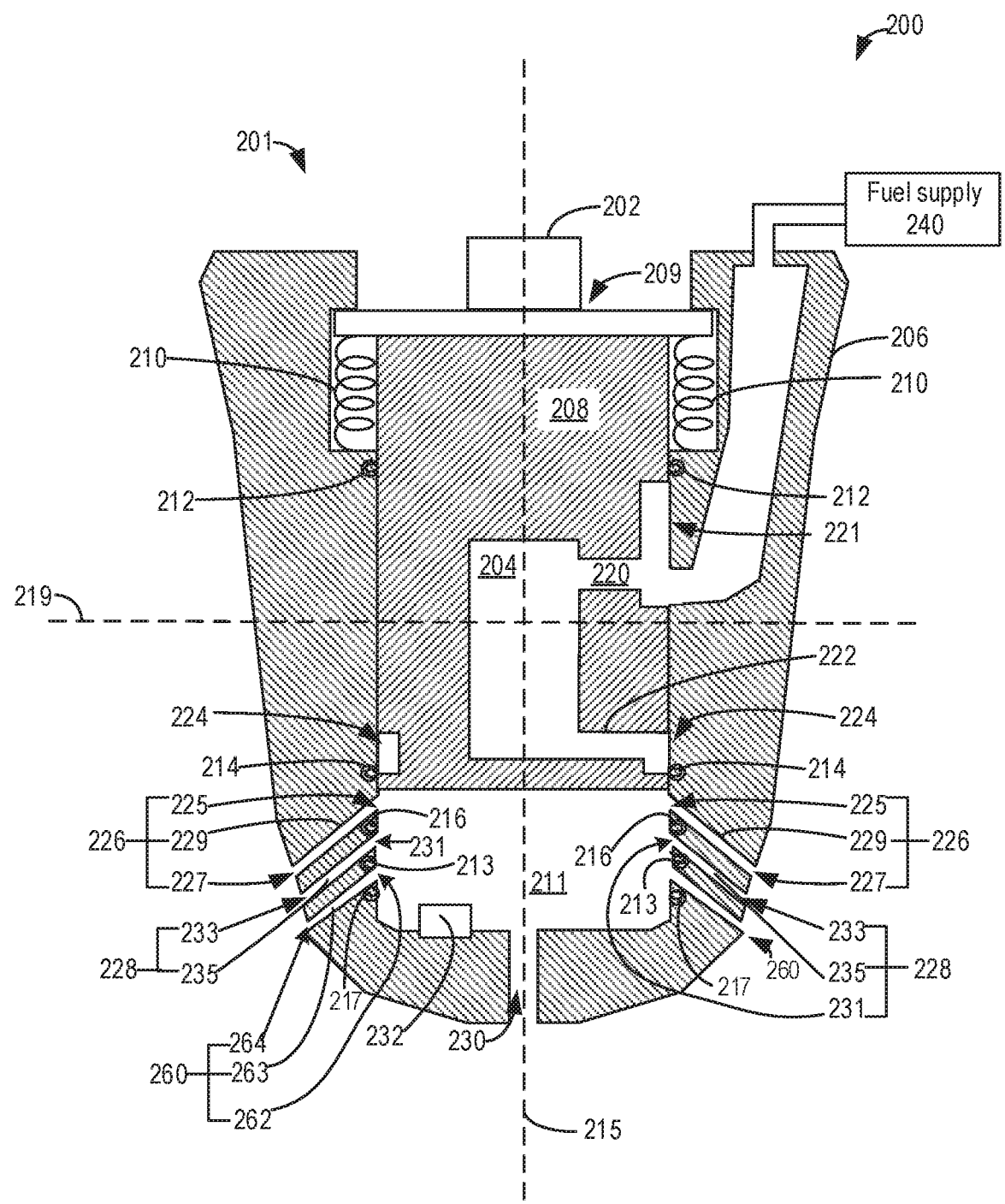
FIG. 2 shows an example of a fuel injector assembly used in the engine of FIG. 1 in a first position.

Referring to FIG. 2, an example of a fuel injector assembly 200, which may be utilized in an engine cylinder, such as cylinder 30 at FIG, 1, is illustrated. The fuel injector assembly 200 may be one non-limiting example of the fuel injector 66 and/or 67 of FIG. 1.

The fuel injector assembly 200 includes an injector body 206 housing an injector needle 208 within an interior chamber 211 of the injector body 206. The injector needle is movable along a longitudinal axis 215 of the injector body 206 In one example, the longitudinal axis 215 of the injector may be perpendicular to a transverse axis 219 of a cylinder to which the fuel injector 200 delivers fuel. However, in other examples the injector may be positioned at a different angle relative to the transverse axis.

The fuel injector body 206 includes a plurality of nozzles, including a first row of nozzles 226, a second row of nozzles 228, and a third row of nozzles 260, each arranged and positioned in a lower portion of the fuel injector body 206, The plurality of nozzles are used for delivering fuel from a fuel supply 240 (e.g., for delivering fuel to a cylinder). The fuel supply may be a high-pressure fuel supply line, for example. While the present example depicts two nozzles in the first nozzle row, it will be appreciated that any number of nozzles may be present in the first nozzle row. Each of the nozzles of the first row of nozzles 226 includes a first end 225 on an interior portion of the fuel injector body 206, a second end 227 on an external wall of the fuel injector body, and a first path 229 connecting the first end 225 and the second end 227. The first end 225 is coupled to an interior chamber 211 of the fuel injector body 206. The second end 227 opens to the exterior of the fuel injector body and the second ends of each of the nozzles lie along a first external circumferential path of the fuel injector body. Thus, each of the nozzles of the first nozzle row 226 couple the interior chamber 211 of the fuel injector body 206 to the exterior (outside) of the fuel injector body 206. Thus, if the fuel injector is positioned within a combustion chamber of the cylinder, the second end opens to the combustion chamber, and the st row of nozzles 226 provide the first path for delivering fuel to the cylinder.

As indicated in the example illustrated at FIG. 2, the first path 229 may be sloping downwards, wherein the first end 225 of the first row of nozzles 226 may be positioned higher than the second end 227. Specifically, the first end 225 that opens to the interior chamber 211 is positioned higher than the second end 227 that opens to the exterior of the fuel injector body. The exterior is an environment (e.g., combustion chamber or intake manifold) in which the fuel injector 200 is placed. It will be appreciated that the slope of the first path 229 may vary (that is, the slope may be more or less) without departing from the scope of this disclosure. In sonie examples, the first end 225 and the second end 227 of the first row of nozzles 226 may be level with each other along a transverse axis perpendicular to the longitudinal axis 215 of the injector.

The fuel injector body 206 further includes the second row of nozzles 228 arranged and positioned vertically below the first row of nozzles 226. The second row of nozzles 228 and the first nozzle row of nozzles 226 may be separated by a distance. In other words, the second row of nozzles 228 may be positioned below the first row of nozzles 226 along the longitudinal axis 215 of the injector body. The second row of nozzles 228 may deliver fuel from the fuel supply 240 (e.g., for delivering fuel to a cylinder). Each of the nozzles of the second row of nozzles 228 may provide a second path 235 that fluidically couples the interior chamber 211 of the fuel injector body 206 to the exterior (that is, outside) of the fuel injector body 206. Specifically, a first end 231 of each of the nozzles of the second row of nozzles 228 opens to the interior chamber 211 of the fuel injector body and a second end 233 of each of the nozzles of the second row of nozzles 228 opens to the exterior of the fuel injector body. Thus, if the fuel injector is positioned within the combustion chamber, the second end opens to the combustion chamber, and the second row of nozzles provides the second path 235 for delivering fuel to the cylinder. Further, the second ends of each of the nozzles of the second row of nozzles 228 lies along a second external circumferential path of the fuel injector body below the first external circumferential path.

As indicated in the example illustrated at FIG. 2, the second path 235 may be sloping downwards. That is, the first end 231 of each of the nozzles of the second row of nozzles 228 may be positioned higher than the second end 233. Specifically, the first end 231 that opens to the interior chamber 211 is positioned higher than the second end 233 that opens to the exterior of the fuel injector body. As mentioned above, the exterior is an environment (e.g., combustion chamber or intake manifold) in which the fuel injector is placed. It will be appreciated that the slope of the second path 235 may vary (that is, the slope may be more or less) without departing from the scope of this disclosure. In some examples, the first end 231 and the second end 233 of the nozzles of the second row may be level with each other along a transverse axis that is perpendicular to the longitudinal axis 215 of the injector.

The fuel injector body 206 further includes the third row of nozzles 260 arranged and positioned vertically below the second row of nozzles 228. The third row of nozzles 260 and the second row of nozzles 228 may be separated by a distance. In other words, the third row of nozzles 260 may be positioned below the second row of nozzles 228 along the longitudinal axis 215 of the injector body. The third row of nozzles 260 may deliver fuel from the fuel supply 240 (e.g., for delivering fuel to a cylinder). Each of the nozzles of the third row of nozzles 260 may provide a third path 263 that fluidically couples the interior chamber 211 of the fuel injector body 206 to the exterior (that is, outside) of the fuel injector body 206. Specifically, a first end 262 of each of the nozzles of the third row of nozzles 260 opens to the interior chamber 211 of the fuel injector body and a second end 264 of each of the nozzles of the third row of nozzles 260 opens to the exterior of the fuel injector body. Thus, if the fuel injector is positioned within the combustion chamber, the second end opens to the combustion chamber, and the third row of nozzles provides the third path 263 for delivering fuel to the cylinder. Further, the second ends of each of the nozzles of the third row of nozzles 260 lies along a third external circumferential path of the fuel injector body below the second external circumferential path.

Similar to the first path 229 and the second path 235, the third path 263 may be sloping downwards. That is, the first end 262 of each of the nozzles of the third row of nozzles 260 may be positioned higher than the second end 264. Specifically, the first end 262 that opens to the interior chamber 211 is positioned higher than the second end 264 that opens to the exterior of the fuel injector body. As mentioned above, the exterior is an environment (e.g., combustion chamber or intake manifold) in which the fuel injector is placed. It will be appreciated that the slope of the third path 263 may vary (that is, the slope may be more or less) without departing from the scope of this disclosure. In some examples, the first end 262 and the second end 264 of the nozzles of the third row may be level with each other along a transverse axis that is perpendicular to the longitudinal axis 215 of the injector.

Further, each of the nozzles the first row of nozzles 226 may be positioned along a first vertical plane of the injector body, the second row of nozzles 228 may be positioned along a second vertical plane, and the third row of nozzles 260 may be positioned along a third vertical plane along the injector body. Each nozzle of the row of nozzles positioned along one vertical plane may be parallel to the rows of nozzles positioned along the other vertical planes. Consequently, the slopes of the first path 229, the second path 235, and the third path 263 may be parallel to each other.

In one example, a first length of the first path 229 of each nozzle of the first row of nozzles 226 may be greater than a second length of the second path 235 of each nozzle of the second row of nozzles 228. The second length may be greater than a third length of the third path 263 of each nozzle of the third row of nozzles 260 However, in some examples the first length, the second length, and the third length may be substantially the same. Further, in some examples, a volume of each of the nozzles 226 may be greater than a volume of each of the nozzles 228 and the nozzles 260. In some other examples, the volume of each of the nozzles 226, 228, and 260 may be equal to each other.

Further, in some examples, when three or more nozzles are present in the first row of nozzles 226, the nozzles of the first row of nozzles 226 may be arranged substantially equidistant from each other. Similarly, the when three or more nozzles are present in the second row, nozzles of the second row of nozzles 228 may be arranged substantially equidistant from each other. Three or more nozzles of the third row of nozzles 260 may be arranged equidistant from each other. However, it will be appreciated that other arrangement of nozzles (e.g., cluster arrangement) may be possible without departing from the scope of the disclosure.

The injector needle 208 includes a fuel passage 204. The fuel passage 204 is coupled to the fuel supply 240 (e.g., a high-pressure common fuel rail, fuel supply line(s), fuel pump(s), and fuel tank) via an upper flow path 220. The upper flow path 220 is coupled to an upper annulus cut portion 221. The upper annulus cut portion 221 provides an outlet for fuel delivery from the fuel supply 240 through the upper flow path 220 to the fuel passage 204. The upper annulus cut portion 221 may fluidically couple the fuel supply 240 to the fuel passage 240 as the fuel injector needle moves downwards during various open positions of the fuel injector, thereby ensuring fuel supply to the fuel passage 204 for performing fuel injection through the injector nozzles. In other examples, the upper annulus cut portion 221 may not be annulus (for example, may be rectangular, triangular etc.), but may still be configured to establish fluidic communication between the fuel supply 240 and the fuel passage 204.

The fuel passage 204 also includes a lower flow path 222 that is coupled to a lower annulus cut portion 224 of the injector needle 208. The lower annulus cut portion 224 provides an outlet for fuel discharge from the fuel passage 204 of the injector needle 208 to the first or second row of nozzles during fuel delivery. Based on a displacement of the injector needle, the lower annulus cut portion 224 may be coupled to either the first row of nozzles, the second row of nozzles, or the third row of nozzles. The upper annulus cut portion 221 may remain coupled to the fuel supply 240 at all different positions of the injector needle 208. In other examples, the lower annulus cut portion 221 may not be annulus (for example, may be rectangular, triangular etc.), but may still be configured to establish fluidic communication between the fuel passage 204 and each of the row of nozzles.

One or more retention springs 210 may be included between the injector body 206 and the injector needle 208. Each retention spring 210 may act to bias the injector needle 208 in an upward direction (e.g., away from the nozzles towards an upper portion of the injector body) along the longitudinal axis 215 of the injector body 206. Specifically, the retention springs may act to maintain the injector needle in a closed position, wherein the lower annulus cut portion 224 is above the first row of nozzles (and hence is also above the second row of nozzles and the third row of nozzles) and is not coupled to either the first, second, or third row of nozzles. In one example, one end of each of the retention springs 210 may be coupled to the injector body 206 within a groove and another end of each of the retention springs may be coupled to an upper portion 209 of the injector needle 208.

An actuator 202 may be coupled to the injector needle 208. The actuator 202 may be used to move the needle to regulate fuel injection. Specifically, the actuator 202 may move the needle 208 along the longitudinal axis 215 in a downward direction (e.g., toward the nozzles), against the force of the springs. The actuator 202 may receive an electrical signal from a controller, such as controller 12 at FIG. 1. The electrical signal to the actuator may be based on the fuel injection mode (single, double, or multiple fuel injections, for example), a desired fuel injection amount, fuel injection timing, rail pressure, etc. Responsive to the electrical signal, the actuator may move the injector needle 208 to regulate fuel injection.

The injector body 206 further includes a first sealing ring 212, a second sealing ring 214, a thirdsealing ring 216, a fourth sealing ring 213, and a fifth sealing ring 217, which may prevent fuel leakage across the injector needle and across the nozzles of the fuel injector body. Specifically, the first sealing ring 212 may be positioned below the retention spring 210 and above the upper annulus cut portion 221. The first sealing ring 212 hermetically seals the fuel from the fuel passage 204 from leaking into a cavity between the fuel injector body and the fuel injector needle where the retention spring is located. The second sealing ring 214 is positioned below the first sealing ring 212 and above the first row of nozzles 226. The second sealing ring 214 provides hermetic sealing between the lower annulus cut portion 224 and the injector body. Consequently, leaking or dripping of fuel from the fuel passage 204 via the annulus cut portion is reduced. Specifically, when the injector is closed (that is, when the actuator is not activated), leaking or dripping of fuel from the fuel passage 204 is reduced.

The third sealing ring 216 is located between the first row of nozzles 226 and the second row of nozzles 228. The third sealing ring 216 hermetically seals the nozzles of the first row and the nozzles of the second row. Specifically, during fuel delivery through the first or second row of nozzles, the third seal 216 reduces leakage via the lower annulus cut 224 between the nozzles of the first row and the nozzles of the second row, In some examples, the first sealing ring may be located at any location above the second sealing ring 214.

The fourth sealing ring 213 is located between the second row of nozzles 228 and the third row of nozzles 260. The fourth sealing ring 213 hermetically seals the nozzles of the second row and the nozzles of the third row. Specifically, during fuel delivery through the second row or third row of nozzles, the fourth sealing ring 213 reduces leakage via the lower annulus cut between the nozzles of the second row and the nozzles of the third row.

The fifth sealing ring 217 is positioned below the fourth sealing ring 213, below the third row of nozzles 260. The fifth sealing ring 217 provides hermetic sealing between the lower annulus cut portion 224 and the injector body. Consequently, leaking or dripping of fuel from the fuel passage 204 via the annulus cut portion is reduced. Specifically, when the injector is closed (that is, when the actuator is not activated), leaking or dripping of fuel from the fuel passage 204 is reduced.

An opening 230 is provided at the bottom of the fuel injector body 206 to release air pressure from the interior chamber 211 when the fuel injector needle 208 moves up and down by the force of the actuator 202. Further,fuel injector body 206 includes a spring stopper 232 for preventing the fuel injector needle 208 from hitting an interior bottom surface of the fuel injector body when electric force is supplied to the injector needle.

FIG. 2 shows the fuel injector assembly 200 in a first position 201 wherein actuator 202 is not activated. When the actuator is not activated (that is, mechanical or electrical force provided by the actuator is turned off), an upward force provided by the spring's bias the needle upward into face-sharing, contact with an inner wall of the injector body. In other words, when the actuator is not activated the upward spring forces move the injector needle upwards until the fuel injector needle is stopped by the inner wall of the injector body. When the fuel injector assembly is at the first position, the lower annulus cut portion 224 of the injector needle is positioned above the first row of nozzles and is not coupled to nozzles of the first row of nozzles 226, to the second row of nozzles 228, or to the third row of nozzles 260. As a result, the fuel supply 240 is decoupled from the injector nozzles. However, as shown, the upper annulus cut portion 221 is fluidically coupled to the fuel supply 240, but as a result of the lower annulus cut not be coupled to any of the nozzles, fuel is blocked from exiting the fuel passage 204, and no fuel injection occurs.

Figure 3:
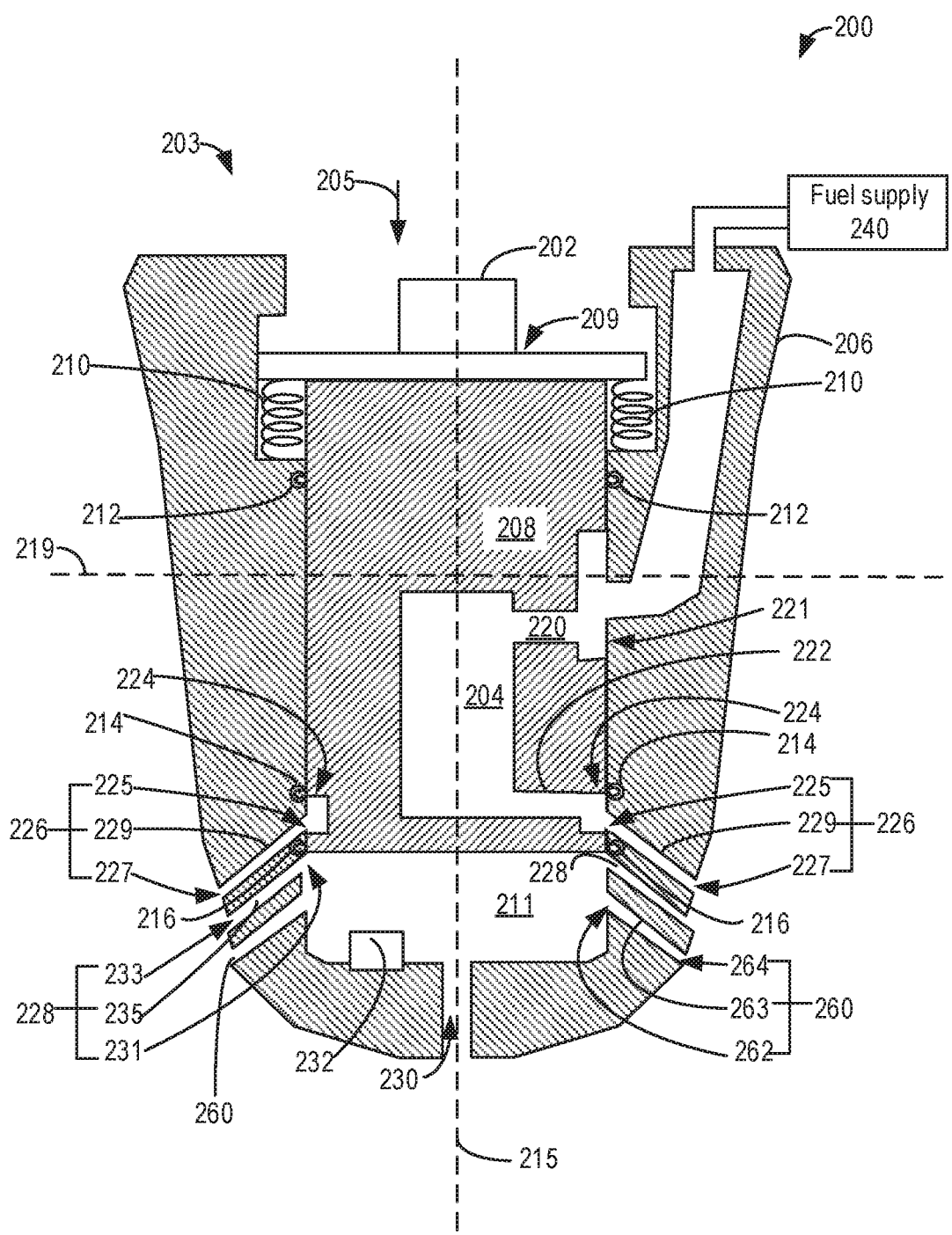
FIG. 3 shows an example of the fuel injector assembly in a second position.

FIG. 3 shows the fuel injector assembly 200 in a second position 203. For example, fuel injector needle 208 may be adjusted to the second position from the first position by activation of the actuator 202. Specifically, the actuator 202 may be activated to provide a first amount of force. In response to the activation, the actuator forces the needle 208 downward towards the nozzles against the force of the springs. The first amount of force pushes the needle 208 downward to couple the fuel supply line 240 to the first row of nozzles 226 via the lower annulus cut 224. In other words, responsive to activation of the actuator, the first amount of force moves the fuel injector needle 208 in a downward direction for a first distance along the longitudinal axis 215, which results in fluidic coupling between the fuel passage 204 and each of the nozzles of the first row of nozzles 226 via lower annulus cut 224. Thus, in the second position 203, the first row of nozzles 226 are coupled to the fuel supply 240 via the fuel passage 204 and lower annulus cut portion 224. As the fuel supply 240 is coupled to the first row of nozzles, fuel is delivered via the first row of nozzles 226.

As the injector needle moves downwards, the upper annulus cut portion 221 remains coupled to the fuel supply 240 via different portions of the upper annulus cut portion 221. For example, a first portion of upper annulus cut 221 may be coupled to the fuel supply 240 when the needle 208 is at the first position 201. As the injector needle 208 moves down, a second portion of the upper annulus cut 221 may be coupled to the fuel supply 240. The second portion may be different from the first portion. In some examples, the second portion may partially overlap with the first portion. Further, it may be noted that as the injector needle 208 moves down, there is no movement or change in size for any part of the injector body 206, Direction of movement of needle 208 from the first position (201 at FIG, 2) to the second position (203) responsive to the force provided by the actuator is indicated at 205. The actuator may be activated when an electrical input, such as current, is supplied to the actuator. The electrical input may be variable.

Further, when operating in the second position, the second sealing ring 214 reduces leakage of fuel from the fuel passage to a cavity between the fuel injector needle and the fuel injector body and third sealing ring 216 reduces fuel leakage of fuel from the fuel passage to the second row of nozzles 228. In other words, in the second position 203, the second sealing ring 214 reduces leakage between the injector needle 208 and the injector body 206 via the lower annulus cut 224. Further, the third sealing ring 216 hermetically seals the first row of nozzles and the second row of nozzles, thereby reducing leakage of fuel from the fuel passage 204 into the second row of nozzles 228 when the fuel injector needle is coupled with the first row of nozzles 226.

Figure 4:
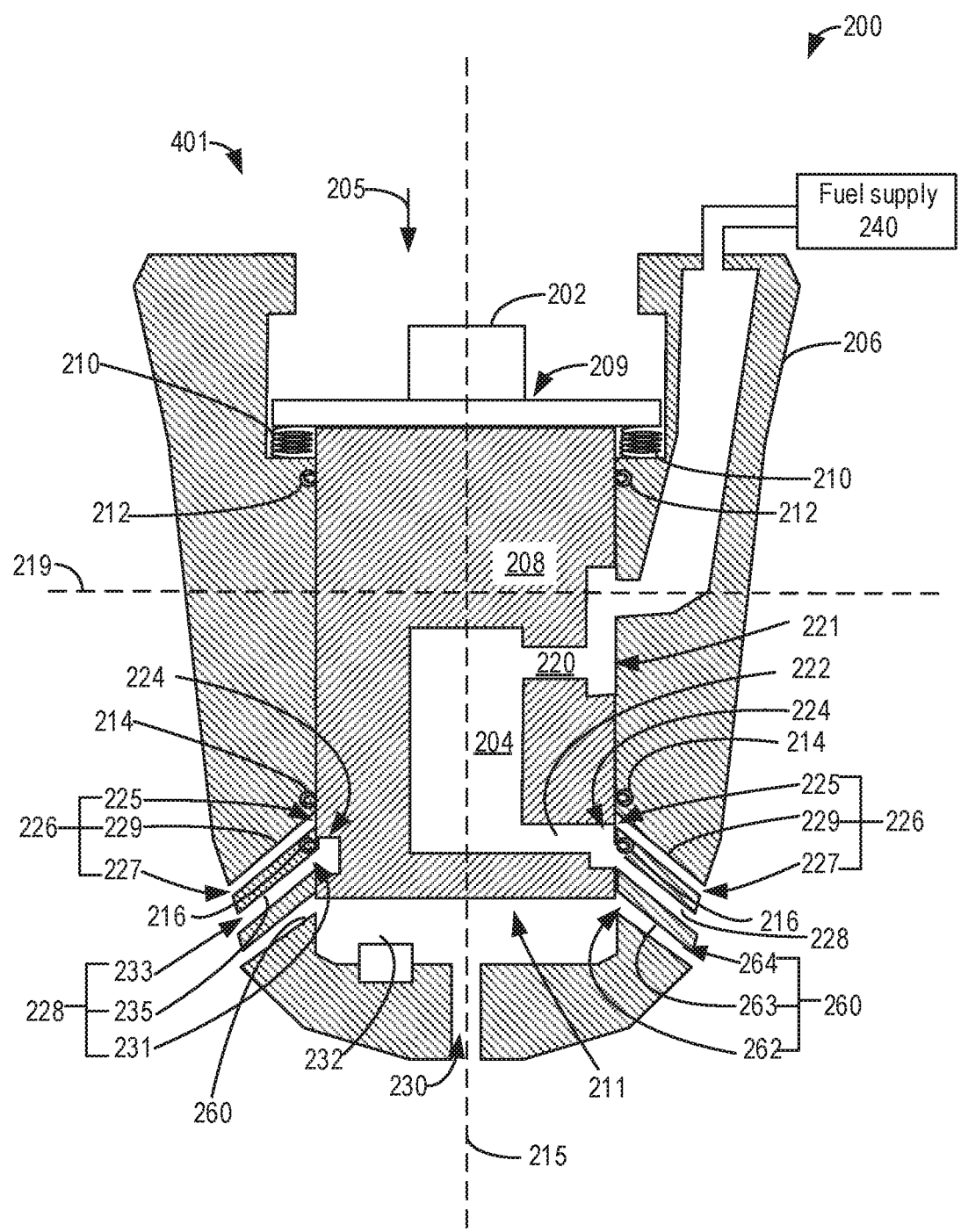
FIG. 4 shows an example of the fuel injector assembly in a third position.

FIG. 4 shows the fuel injector assembly 200 in a third position 401. For example, fuel injector needle 208 may be adjusted to the third position from the second position by the actuator 202. Specifically, a second amount of force may be provided by the actuator to move the fuel injector needle further in the downward direction against the force of the springs to conduct a second fuel injection via the second row of nozzles 228. Thus, as the fuel injector needle 208 moves downwards, the annulus cut portion is decoupled from the first row of nozzles 226 and is coupled to the second row of nozzles 228. When the fuel injector assembly is in the third position, fuel from the fuel supply 240 is delivered to the cylinder via fuel passage 204 and the second row of nozzles 228. Direction of movement of needle 208 from the second position (203 at FIG. 2) to the third position (401) responsive to the force provided by the actuator is indicated at 402

Further, as the injector needle moves downwards, the upper annulus cut portion 221 remains coupled to the fuel supply 240 via different portions of the upper annulus cut portion 221. For example, as the injector needle 208 moves down, a third portion of the upper annulus cut 221 may be coupled to the fuel supply 240. The third portion may be different from the second portion of upper annulus cut 221 that is coupled when the needle 208 is at second position 203. In some examples, the third portion may partially overlap with the second and/or the first portion, where the first portion of upper annulus cut 221 is the portion coupled to the fuel supply 240 when the needle 208 is at the first position 201.

Figure 5:
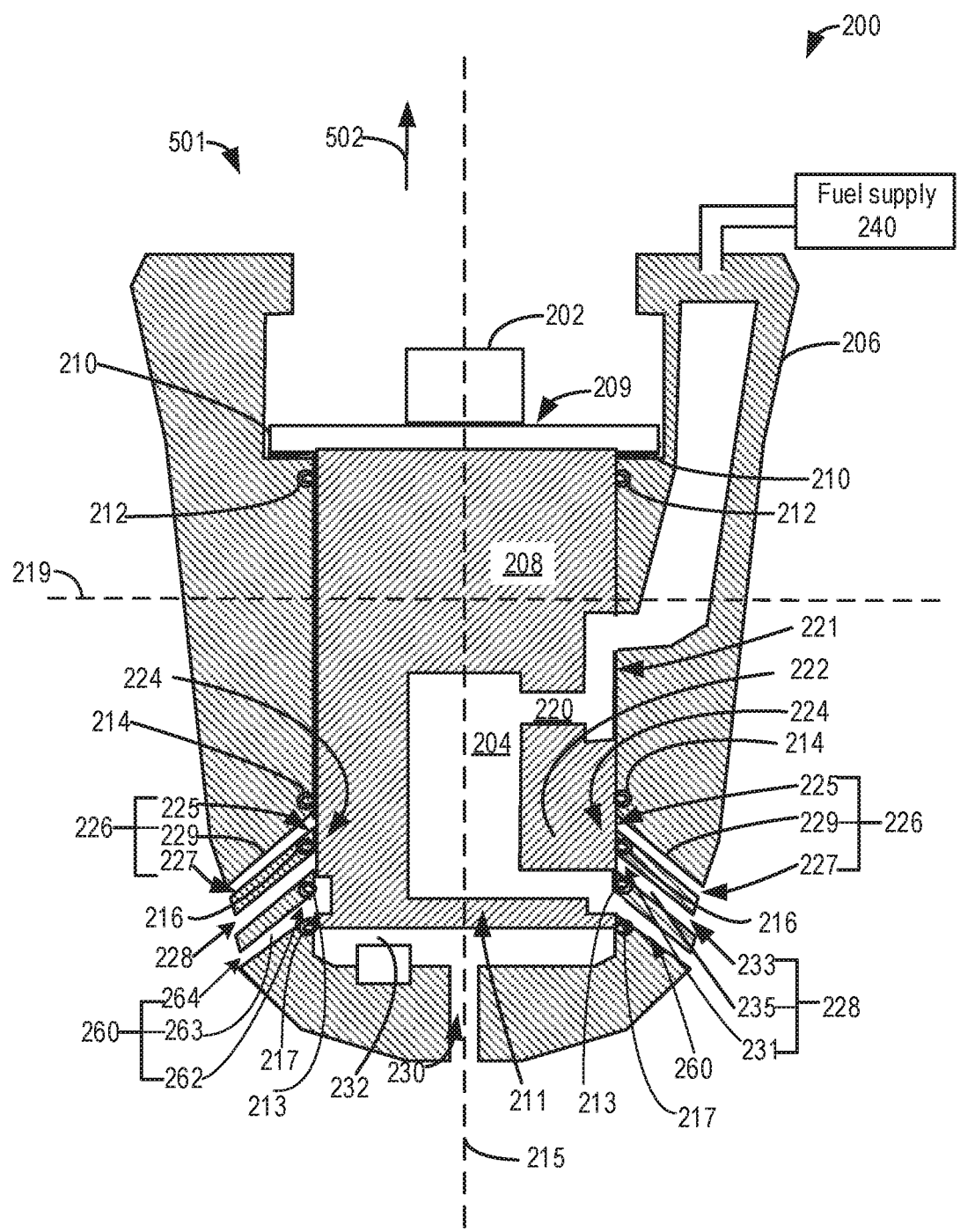
FIG. 5 shows an example of the fuel injector assembly in a fourth position.

FIG. 5 shows the fuel injector assembly 200 in a fourth position 501. The fuel injector assembly 200 may be adjusted to the fourth position from the third position when the actuator provides a third amount of force to move the fuel injector needle further in the downward direction against the force of the springs to conduct a third fuel injection via the third row of nozzles 260, Thus, as the fuel injector needle 208 moves downwards, the annulus cut portion is decoupled from the first row of nozzles 226 and coupled to the second row of nozzles 228. When the fuel injector assembly is in the third position, fuel from the fuel supply 240 is delivered to the cylinder via fuel passage 204 and the third row of nozzles 228. The direction of movement of needle 208 from the third position (401 at FIG. 4) to the fourth position (501) is along the direction of the arrow 205, responsive to the force provided by the actuator.

Further, as the injector needle moves downwards, the upper annulus cut portion 221 remains coupled to the fuel supply 240 via different portions of the upper annulus cut portion 221, example, as the injector needle 208 moves down, a fourth portion of the upper annulus cut 221 may be coupled to the fuel supply 240. The fourth portion may be different from the third portion of upper annulus cut 221 that is coupled when the needle 208 is at second position 203. In some examples, the fourth portion may partially overlap with the third, the second, and/or the first portion, where the first portion of upper annulus cut 221 is the portion coupled to the fuel supply 240 when the needle 208 is at the first position 201.

Figure 6:
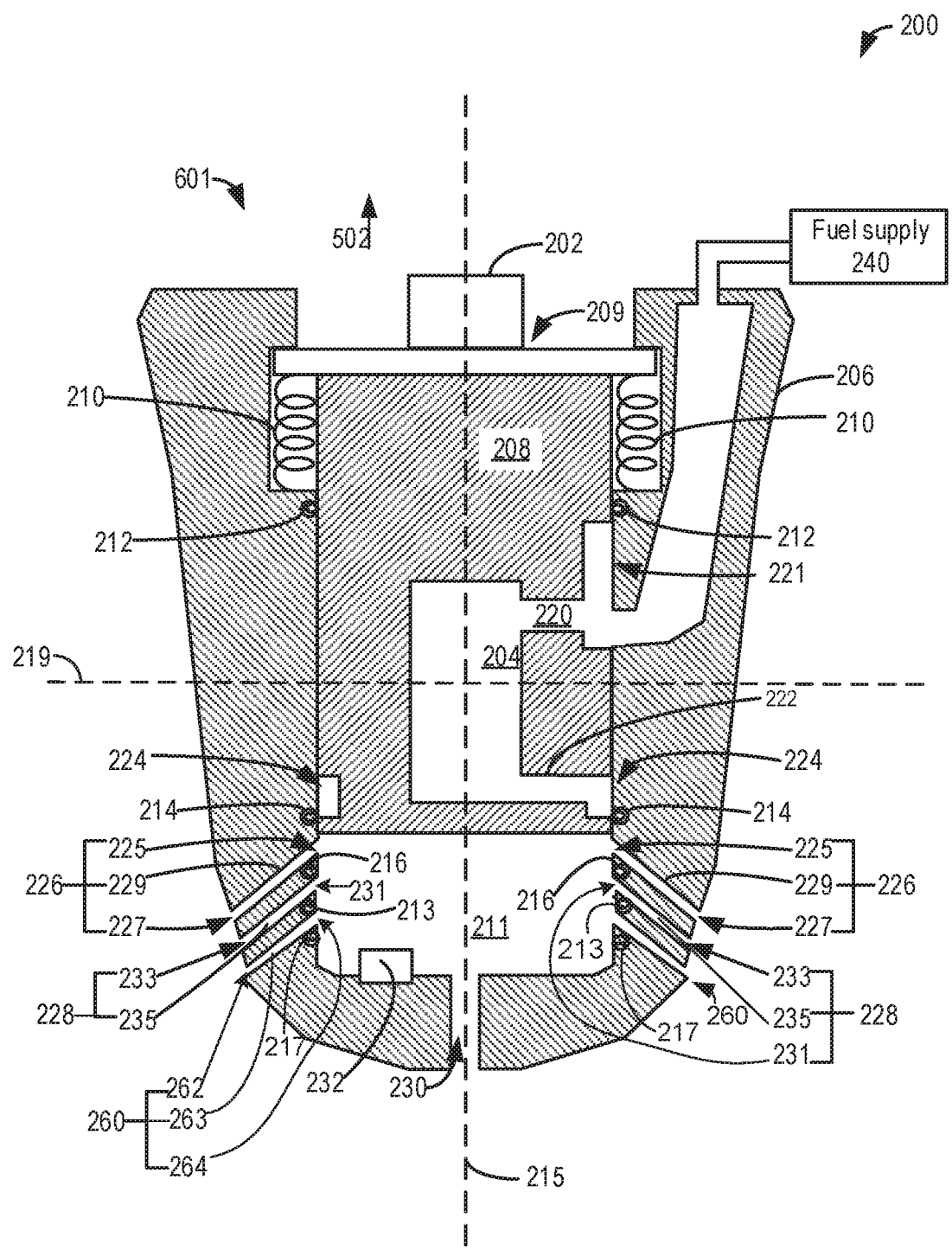
FIG. 6 shows an example of the fuel injector assembly in a fifth position.

FIG. 6 shows the fuel injector assembly 200 in a fifth position 601. The fuel injector assembly 200 may be adjusted to the fifth position from the fourth position when the actuator is deactivated. Specifically, when the fuel injector assembly 200 is in third position, responsive to actuator deactivation, springs 210 act to movethe fuel injector needle 208 in the upward direction. As the fuel injector needle 208 is drawn upwards by the springs 210, the lower annulus cut portion 224 is decoupled from the third row of nozzles 260, followed by coupling and decoupling from the second row of nozzles 228, and then followed by coupling and decoupling from the first row of nozzles 226 before reaching the fifth position. The fifth position 601 is similar to the first position 201. Thus, when the fuel injector assembly is in the fifth position 601. the fuel supply 240 is decoupled from the first, second, and third row of nozzles. Hence, no fuel injection is conducted. Direction of movement of needle 208 from the fourth position (501 at FIG. 2) to the fifth position (601) is indicated by arrow 502.

In one example, when a pilot fuel injection, a main fuel injection, and a post fuel injection are desired during a single combustion cycle, the actuator may move the injector needle downward from the first position to the fourth position via the second position and the third position. The single combustion cycle of a four-stroke engine begins with an intake stroke, followed by a compression stroke, and then a combustion stroke, and ends with an exhaust stroke. The main injection may provide the bulk of the fuel for the combustion cycle of the engine. One or more fuel pilot injections before the main in ection may provide a small amount of fuel before the main injection event, for example, to enhance combustion efficiency, and to reduce emissions. Injections after the main injections (post-injection) may generate additional heat after the main injection. The heat generated during the post-injections may be used for particulate filter regeneration, and/or may be used for increasing a temperature of one or more emission control devices during cold start conditions to reduce emissions.

As the injector moves downwards, at the second position, a pilot fuel injection may be delivered via the first row of nozzles and a second pilot injection may be delivered at the third position through the second row of nozzles. When the injector needle reaches the fourth position, the fourth position may be maintained for a desired duration to provide a main fuel injection via the third row of nozzles. Subsequently, after providing a desired fuel injection amount for the main fuel injection, the current provided by the actuator to the fuel injector needle decreases, such that the retention springs bias the injector upwards from the fourth position to the fifth position via the third position followed by the second position. As the injector moves upwards, at the third position, a first post fuel injection may be delivered via the second row of nozzles. At the second position, a second post fuel injection is delivered via the first row of nozzles. Thus, during a single actuation cycle, the injector needle moves from the first position to the fourth position via the second position and the third position and subsequently from the fourth position to the fifth position via the third position and the second position. The single actuation cycle may include a time in which the injector needle moves from the closed position to the open position and then back to the closed position. As used herein, an actuation cycle may refer to a single activation event of the actuator, and include a duration from when current is supplied to the actuator until current is no longer supplied to the actuator. Thus, during a single actuation cycle, the actuator is activated one time, although the duration of the activation and an amount of current supplied to the actuator may vary. A force from the actuator to the injector needle is supplied during the actuation cycle to move the injector needle. During each position of the injector needle in the single actuation cycle, the first and second pilot injections are performed followed by the main injection. The main injection may be followed by the first and second post fuel injections to deliver the desired fuel volume during each of the injections. Based on the force provided by the actuator (the force based on the current supplied to the actuator), and a duration spent in each of the second, third and fourth positions, the fuel injection rates and amounts may be adjusted.

In an example, where only one pilot injection, followed by a main injection, and then followed by only one post injection is desired, the injector needle may move from the first position (deactivated) to he third position and then from the third position back to the deactivated position, without moving to the fourth position. The actuator may move the injector needle from the first deactivated position to the third position via the second position. The pilot injection may happen upon coupling with the first row of nozzles at the second position, followed by the main injection by coupling to the second row of nozzles at the third position. At the end of the main injection, the actuator may be deactivated, moving the needle form the third position to the deactivated position via the second position. At the second position, post injection may happen through the first row of nozzles, followed by ending of fuel injection.

In another example, when two fuel injections are desired, such as a pilot and a main fuel injection or a main and a post fuel injection, the actuator may move the injector needle downward from the first position via the second position to an intermediate position between the first and the second row of nozzles, where the annulus cut portion is not coupled to either first or second row of nozzles. As the annulus cut portion passes through the first row of nozzles to reach the intermediate position, a first fuel injection may be performed at the second position via the first row of nozzles. Subsequently, the actuator may move the injector needle upwards from the intermediate position to the first or the fourth position via the second position, and second fuel injection may be delivered at the second position as the needle moves upwards.

In yet another example, when one fuel injection is desired, the actuator may move the needle to the second position and a single fuel injection may be delivered at the second position via the first row of nozzles. After a desired amount of fuel is delivered, the actuator may move the injector back to the first position or fourth position. As discussed above, the first position may be the same as the fifth position.

Figure 7:
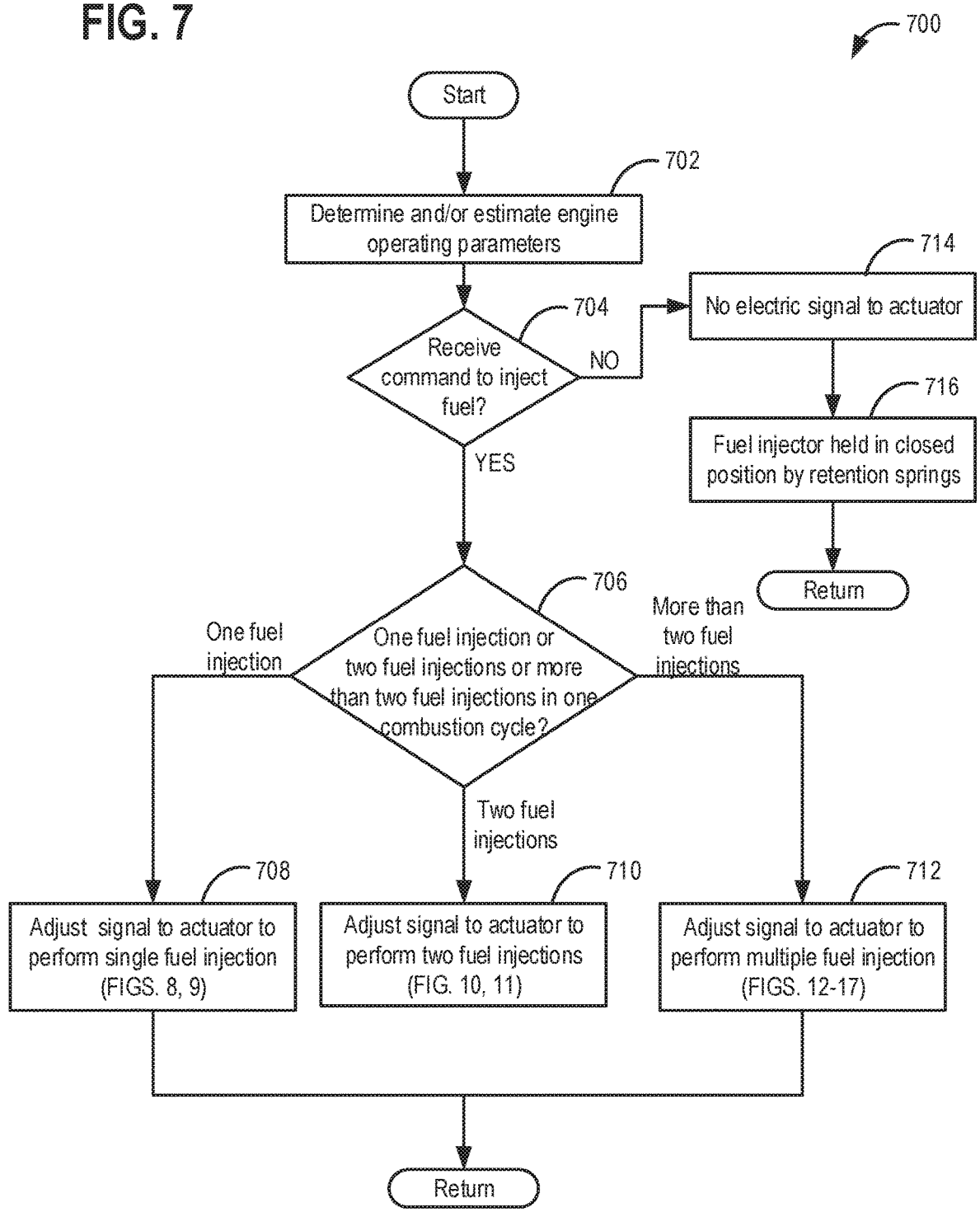
FIG. 7 depicts a high-level flow chart illustrating an example method for operating the fuel injector assembly of FIG. 2.

Turning to FIG. 7, a flow chart illustrating an example method 700 for operating a fuel injector assembly, such as fuel injector assembly 200 at FIGS. 2-6, is shown. At least portions of method 700 may be implemented as executable controller instructions stored in non-transitory memory. Additionally, portions of method 700 may be actions taken in the physical world to transform an operating state of an actuator or device, such as the actuator 202 of the fuel injector assembly. Instructions for carrying out method 700 may be executed by a controller (e.g., controller 12) based on instructions stored on a memory of the controller and in conjunction with signals received from sensors of the engine system, such as the sensors described above with reference to FIG. 1. The controller may employ engine actuators of the engine system, such as actuator 202 at FIGS. 2-6, to adjust engine operation, according to the method described below.

Method 700 starts at 702. At 702, method 700 includes determining and/or estimating engine operating parameters. The engine operating parameters may include but are not limited to engine status (e.g., on or off), engine speed, engine torque demand, indicated engine torque, engine position, and engine temperature. After determining engine operating parameters, method 700 proceeds to 704.

At 704, method 700 includes determining if a command to inject fuel is received. Fuel may be injected to the engine when the engine is rotating and when engine operation is desired by the operator or by a controller. As an example, fuel may be injected in response to engine load above a threshold and/or in response to the firing order and engine position indicating that the injector is to inject fuel to initiate combustion in the cylinder. If the command to inject fuel is yes, method 700 proceeds to 706.

At 706 method 700 includes confirming a fuel injection mode (single, double, or multiple fuel injections) based on engine operating conditions,That is, the controller may confirm if a single fuel injection, a double fuel injection, or multiple fuel injections (e.g., more than two) are desired for operating the engine. For example, a single fuel injection may be performed during one or more engine operating conditions including engine idle control, exhaust catalyst temperature above a threshold, engine temperature above a threshold, and during engine hot-start conditions. Accordingly, based on engine operating conditions, if a single fuel injection is desired, method 700 proceeds to 708. At 708, method 700 includes adjusting an electrical signal to an actuator, such as actuator 202 of fuel injection assembly 200 shown at FIG. 2, to perform a single fuel injection. Details of performing a single fuel injection by utilizing a fuel injector assembly, such as fuel injector assembly 200 at FIG. 2, will be further elaborated with respect to FIGS. 8 and 9. The method 700 then returns.

A double fuel injection may be a split fuel injection, wherein the fuel is delivered in a pilot injection and a main fuel injection, or a main fuel injection and a post fuel injection during a single combustion cycle. A pilot injection is performed prior to a main injection, whereas post injection is performed after the main injection. Typically, diesel engines perform a pilot injection in advance to the main injection in order to reduce combustion noise and emissions. In engine systems that utilize particulate filters coupled within an exhaust passage, post fuel injection following a main fuel injection may be performed for generating heat to increase a temperature of the particulate filter for regeneration.

Further, in turbocharged engine systems, post fuel injection following the main fuel injection may be utilized for reducing turbo lag. For example, if a torque demand increase is greater than a threshold, a second (post) fuel injection may be performed after a first (main) fuel injection to reduce the time required to increase turbine speed to a desired speed. Further, in some examples, post fuel injection may be performed during cold start conditions, wherein the additional exhaust energy generated may be partly utilized to reduce the duration to bring a temperature of an emission control device to a threshold temperature, thereby improving catalyst light off.

Still further, post fuel injection may be performed to maintain the temperature of the emission control device above a threshold, such as in a variable displacement engines (VDE) during operation with one or more cylinders in a deactivated state, for example. Further, split fuel injection comprising a main fuel injection and a post fuel injection may be utilized for exhaust gas recirculation (EGR) tolerance during low load conditions, for example. Specifically, during a transition from operating the engine at a higher load to very low loads, such as during a tip-out operation, while EGR is purged from the intake system, the engine may be transiently operated with split fuel injection. Thus, based on engine operating conditions, if two fuel injections (pilot and main or main and post) are desired, method 700 proceeds to 710. At 710, method 700 includes adjusting the electrical signal to the fuel injector actuator to perform two fuel injections during a single combustion cycle. Details of performing double fuel injection will be further elaborated with respect to FIGS. 10 and 11. The method 700 then returns.

Multiple fuel injections (more than two) may performed to enhance combustion for delivering desired torque. If multiple fuel injections are desired during a single combustion event, method 700 proceeds to 712. At 712, method 700 includes adjusting the electrical signal to the fuel injector actuator to perform multiple fuel injections during a single combustion cycle. Details of performing more than two fuel injections during a single combustion event will be further elaborated with respect to FIGS. 12-17. The method 700 then returns.

Retuning to 704, if it is determined that no command to inject fuel is received, no signal is sent to the actuator, as indicated at 714. At 716, the injector is held or moved upward by the retention springs, such as retention springs 210 at FIGS. 2-5, such that the injector needle is held in the closed position (illustrated in FIG. 2), resulting in a closed fuel passage, and thus no fuel injection. The method 700 then returns.

Figure 8:
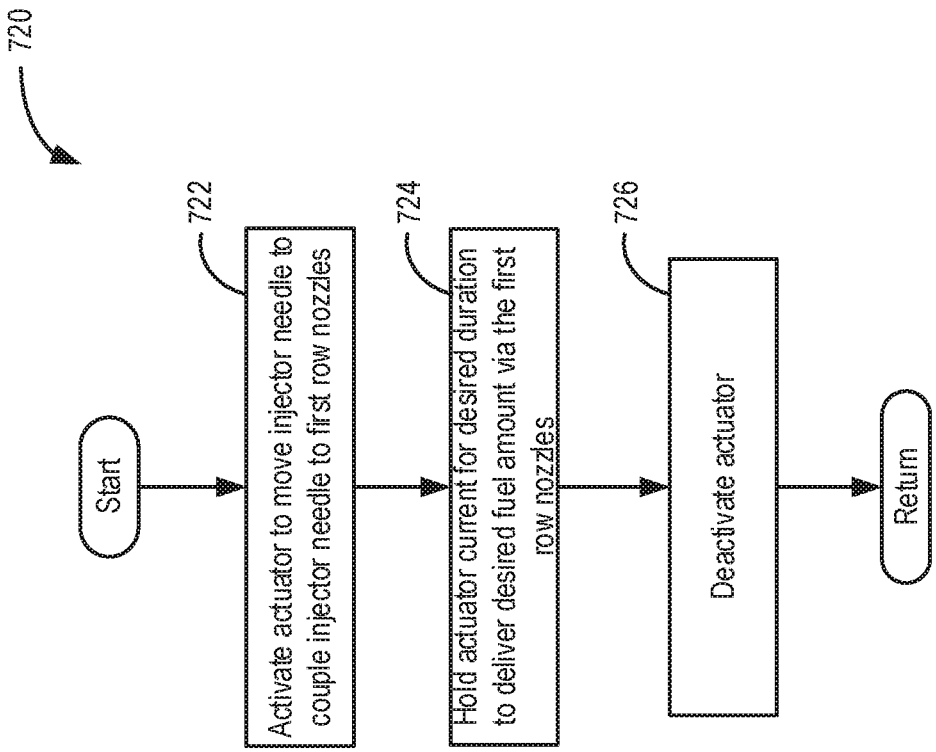
FIG. 8 shows an example method for performing a single fuel through the fuel injector assembly of FIG. 2.
Figure 9:
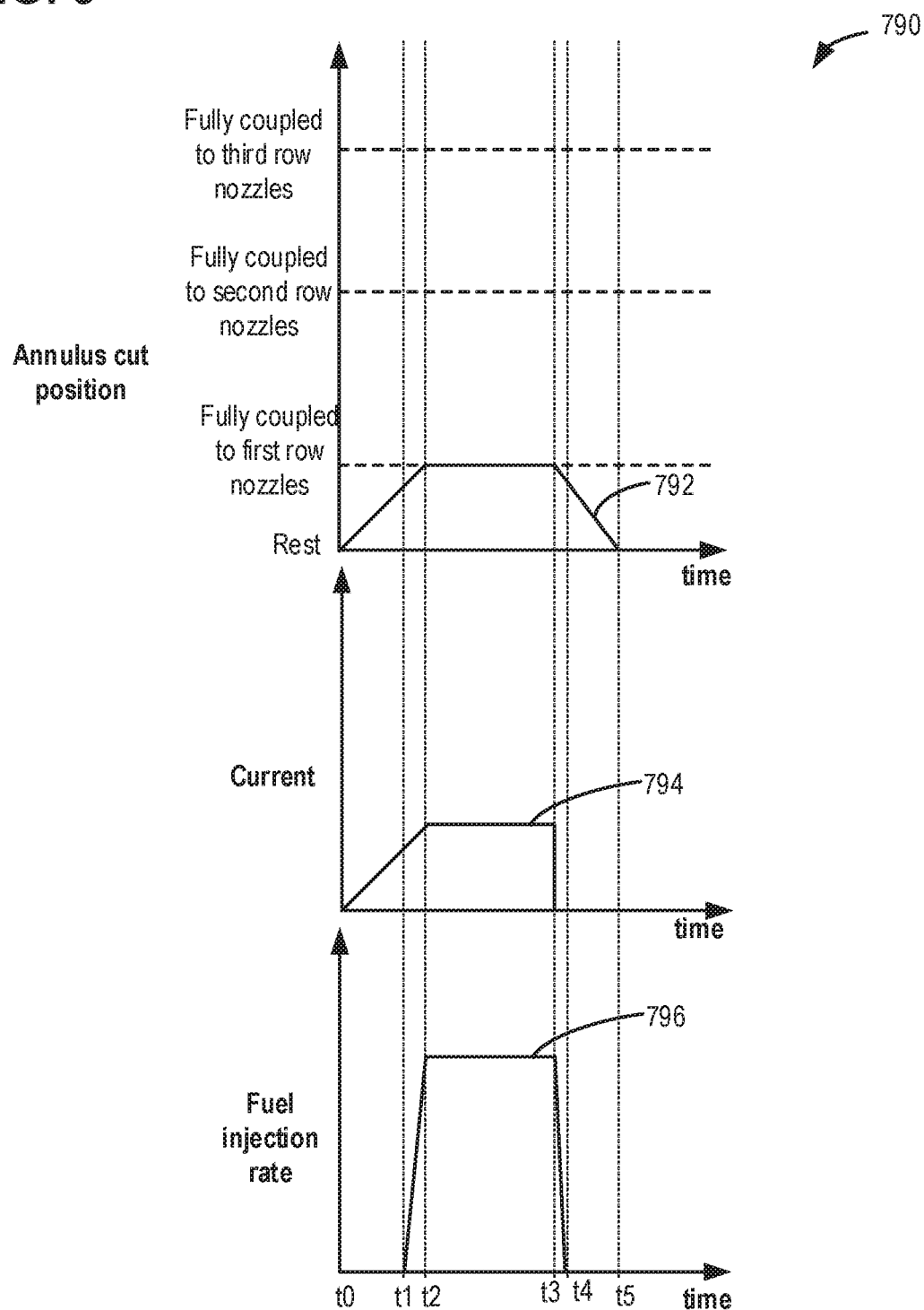
FIG. 9 shows an example operating sequence for performing a single fuel injection through the fuel injector assembly of FIG. 2.

FIG. 8 illustrates an example method 720 for performing a single fuel injection during a single combustion cycle. The single fuel injection may be performed by utilizing a fuel injector assembly, such as fuel injector assembly 200 shown in FIGS. 2 and 3. Specifically, the method illustrates control of a fuel injector actuator, such as actuator 202 at FIG. 2, for performing a single main fuel injection. The fuel injector assembly may be utilized for direct or port fuel injection depending on positioning of the fuel injector within an engine cylinder or an intake manifold. Accordingly, when the fuel injector assembly is utilized for direct fuel injection, fuel from a fuel supply, such as fuel supply 240 of FIGS. 2-6, may be delivered to a combustion chamber, such as combustion chamber 30 at FIG. 1, of the engine cylinder. When the fuel injector assembly is utilized for port fuel injection, fuel from the fuel supply may be delivered to the intake manifold.

Method 720 begins at 722. At 722, method 720 includes activating the fuel injector actuator to move the fuel injector needle to fluidically couple the fuel supply to a first row of nozzles, such as nozzles 226 illustrated in FIG. 3. In this example, it may be assumed that prior to activation, the fuel injector assembly is initially in a closed state, where no signal is supplied to the actuator, and the fuel injector needle is decoupled from the first row of nozzles and the second row of nozzles. When operating in the closed state, the fuel injector assembly may be in a first position, such as the first position 201 shown in FIG. 2. Therefore, activating the fuel injector actuator includes providing a signal to the fuel injector actuator. The signal may be an electrical signal, such as a current. For example, a controller may determine a desired current to the actuator to move the injector needle downwards towards the first row of nozzles to couple an annulus cut portion, such as lower annulus cut portion 224 (as indicated in FIG. 3) of the fuel injector needle to first row of nozzles of the fuel injector, based on engine operating parameters. The controller may then supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a current to provide desired force for a designated travel distance of the injector needle.

At 724, method 720 includes providing a holding current for a desired duration. Specifically, the holding current may be provided when the first row of nozzles are fully coupled to the annulus cut portion of the fuel injector needle. The holding current may be a constant current and may be provided to maintain the fluidic coupling between the fuel supply and the first row of nozzles for the desired duration. The desired duration may be based on a desired fuel injection amount, for example. Accordingly, if a larger amount of fuel injection is desired, the desired duration of providing the holding current may be greater. The desired fuel injection amount, or fuel demand, may be based on an accelerator pedal position (pp), engine speed (N), and measured mass airflow (MAF). Note that this fuel injection amount can also be determined based on other parameters. For example, a two-dimensional map of engine speed and pedal position can be used. Alternatively, a two-dimensional map of pedal position and vehicle speed can also be used. In another example, the fuel injection amount may be based on MAF and/or intake throttle position and commanded air-fuel ratio.

Upon delivering the desired fuel injection amount via the first row of nozzles, method 720 proceeds to 726. At 726, the fuel injector actuator may be deactivated. Deactivating the fuel injector actuator includes stopping providing the signal to the actuator. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as illustrated above at FIG. 2.

In this way, the fuel injector assembly may be utilized to deliver a single main fuel injection via the first row of nozzles. An example fuel injection is shown at FIG. 9.

Referring now to FIG. 9, a sequence 790 for a single main fuel injection is shown. The sequence of FIG. 9 may be observed during operation of the system of FIGS. 1-2 by utilizing the method of FIG. 7 in conjunction with the method of FIG. 8.

The first graph from the top of FIG. 9 shows a position of an annulus cut portion, such as lower annulus cut portion 224 at FIGS. 2-6, of a fuel injector assembly versus time. Plot 792 indicates the annulus cut position as a function of time. As shown in FIG. 9, the annulus cut position increases with respect to the Y-axis as the annulus cut portion moves in a downward direction, such as direction 205 at FIG. 3, along a longitudinal axis of the fuel injector. In other words, the Y-axis arrow indicates a movement of the annulus cut portion of the fuel injector needle (and hence the fuel injector needle) in the downward direction.

The second graph from the top of FIG. 9 shows current supplied to the actuator versus time. Plot 794 represents current over time, and the current increases in the direction of the Y-axis arrow.

The third graph from the top of FIG. 9 shows fuel injection rate versus time. Plot 796 represents fuel injection rate over time, and the fuel injection rate increases in the direction of the Y-axis arrow. All plots show time increasing along the direction of the X-axis arrow.

At time t0, the fuel injector is in a deactivated or rest state. In the deactivated state, the fuel injector needle is held in a closed position by the force of the retention springs. In the closed position, the annulus cut portion of the fuel injector is above the first row of nozzles, the second row of nozzles, and the third row of nozzles, and therefore, the annulus cut portion is not coupled to either first, second, or third row of nozzles. Thus, the fuel supply 240 is decoupled from the nozzles and fuel delivery does not take place.

Between times t0 and t1, an electric signal (that is, current) is supplied to an actuator. As a result, the fuel injector needle moves in a downward direction along a longitudinal axis of the injector. As the current increases, the injector needle moves further downwards from the rest position towards the first row of nozzles, as indicated by the plot 792. At t1, the annulus cut portion of the fuel injector needle starts coupling to the first row of nozzles. That is, at t1, a portion of the annulus cut portion is coupled to a portion of each of the first row of nozzles. Thus, at t1, fuel injection begins and fuel is injected into the environment in which the fuel injector is positioned, e.g., in case of direct fuel injection, fuel is injected into the engine cylinder and in case of port fuel injection, fuel is injected into the intake manifold.

Between t1 and t2, as the current to the actuator is increased (plot 794), the injector needle is further pushed downwards and the region of coupling between the annulus cut portion and the first row of nozzles increases. Accordingly, the fuel injection rate increases (plot 796).

At t2, the annulus cut portion is fully coupled to the first row of nozzles. Between t2 and t3, a constant holding current (plot 794) is supplied to the actuator. As a result, the annulus cut portion of the fuel injector needle remains fully coupled to the first row of nozzles between time t2 and t3 (plot 792), and the fuel is delivered at a constant fuel injection rate (plot 796) via the first row of nozzles.

At t3, current supply to the actuator is terminated (plot 794). As a result, the fuel injector needle moves in an upwards direction, such as direction 502 indicated at FIG. 5, away from the first row of nozzles along the longitudinal axis of the fuel injector by the force of the retention springs. As the fuel injector needle moves upwards, between t3 and t4, region of coupling between the annulus cut portion of the fuel injector and the first row nozzle decreases. Hence, the fuel injection rate decreases (plot 796).

At t4, the annulus cut portion of the fuel injector needle is fully decoupled from the first row of nozzles (plot 792). Consequently, fuel injection is terminated. After t4 and between t4 and t5, the fuel injector needle continues to move upwards by the force of the retention springs. At t5, the fuel injector needle comes to the rest position and movement of the fuel injector needle stops. At t5 and beyond, the fuel injector needle is held in the rest position by the retention springs. Additionally, an upper portion of the fuel injector body may prevent further movement of the injector in the upward direction. In this way, single main fuel injection may be performed.

Figure 10:
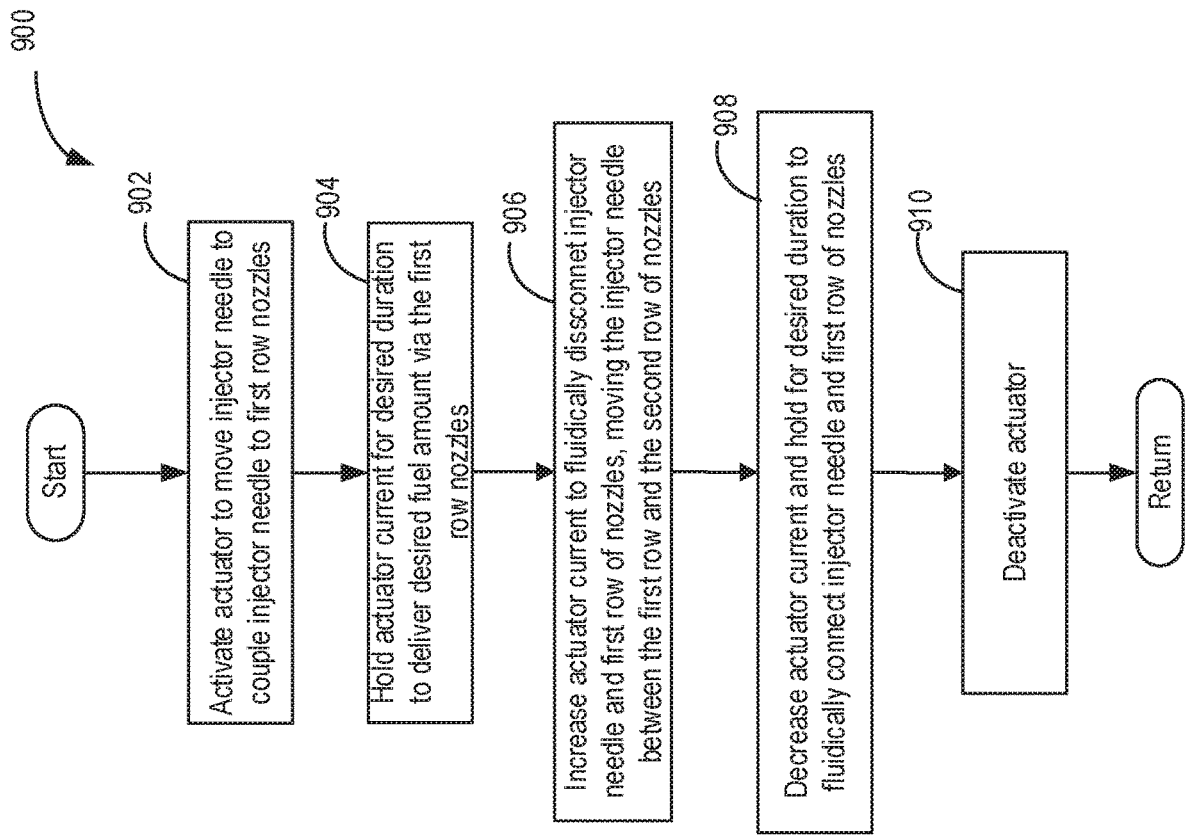
FIG. 10 shows an example method for performing two fuel injections through the fuel injector assembly of FIG. 2.
Figure 11:
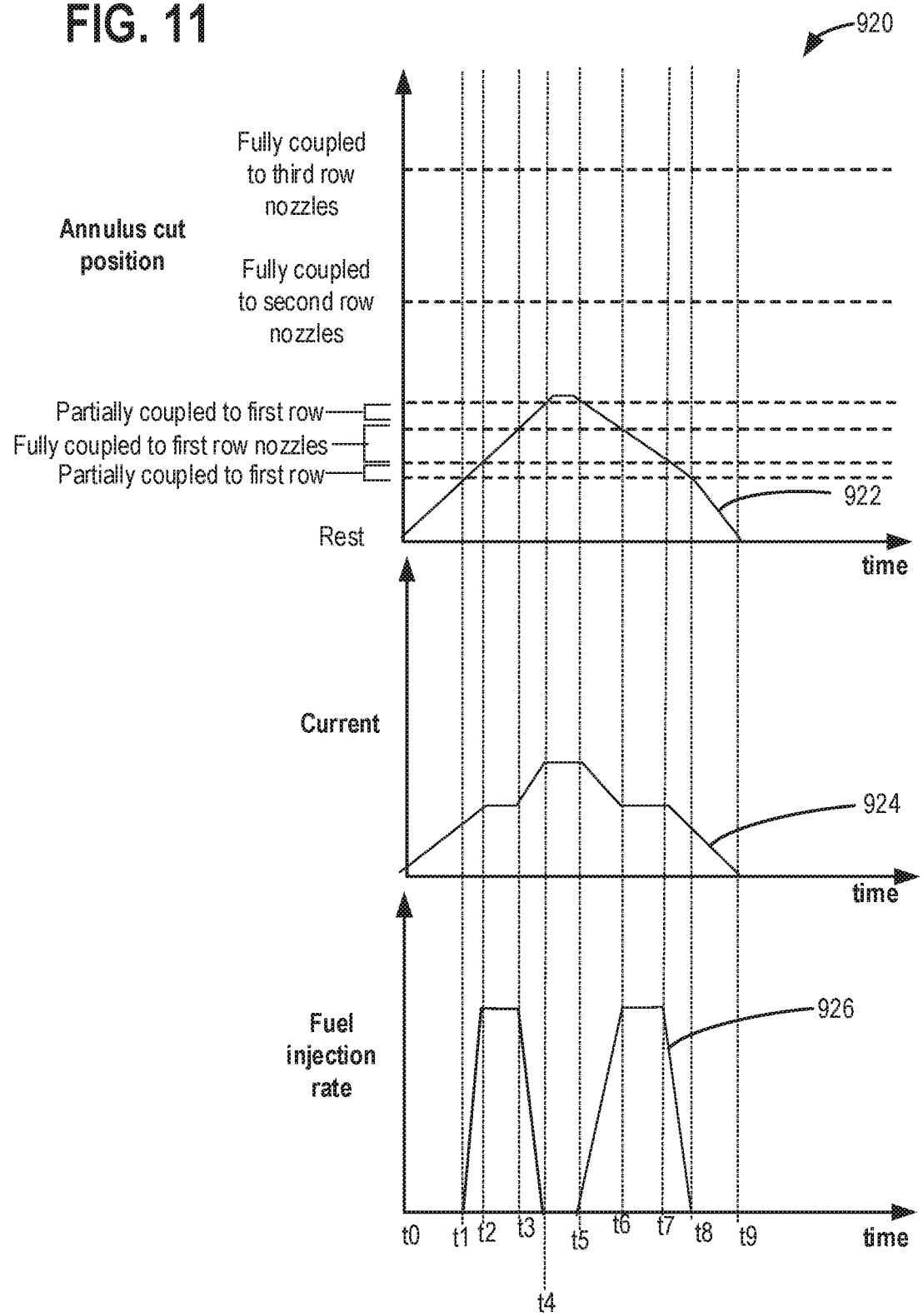
FIG. 11 shows an example operating sequence for performing two fuel injections through the fuel injector assembly of FIG. 2.

FIG. 10 illustrates an example method 900 for delivering two fuel injections during a single combustion cycle. The two fuel injections may be delivered by utilizing a fuel injector assembly, such as fuel injector assembly 200 shown at FIGS. 2-6. Specifically, the method illustrates control of a fuel injector actuator, such as actuator 202 at FIG. 2, for delivering two fuel injections. The fuel injector assembly may be utilized for direct or port fuel injection depending on positioning of the fuel injector within an engine cylinder or an intake manifold.

Method 900 begins at 902 by activating the fuel injector actuator to move the fuel injector needle to fluidically couple the fuel supply to a first row of nozzles, such as nozzles 226 at FIGS. 2-5. In this example, it may be assumed that prior to activation, the fuel injector assembly is initially is a closed state, where no signal is supplied to the actuator and the fuel injector needle is decoupled from the first and the second row of nozzles. When operating in the closed state, the fuel injector assembly may be in a first position, such as the first position 201 shown in FIG. 2. Therefore, activating the fuel injector actuator includes providing a signal to the fuel injector actuator.

The signal may be an electrical signal, such as a current. For example, a controller may determine a desired current to the actuator to move the injector needle downwards towards the first row of nozzles to couple an annulus cut portion, such as lower annulus cut portion 224 indicated at FIGS. 2-6, of the fuel injector needle to first row of nozzles of the fuel injector based on engine operating parameters. The controller may then supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector eedle.

At 904, method 900 includes providing a holding current for a desired duration. Specifically, the holding current may be provided when the first row of nozzles is fully coupled to the annulus cut portion of the fuel injector needle. The holding current may be a constant current and may be provided to maintain the fluidic coupling between the fuel supply and the first row of nozzles for the desired duration. The desired duration may be based on a desired fuel injection amount, for example, which may be determined in the manner described above with respect to FIG. 8. Accordingly, if a larger amount of fuel injection is desired, the desired duration of providing the holding current may be greater.

Upon delivering the desired fuel injection amount via the first row of nozzles, method 700 proceeds to 906. At 906, the controller may increase the current to the fuel injector actuator, thus moving the fuel injector needle further downwards away from the first row of nozzles, between the first row of nozzles and the second row of nozzles, fluidically dis-connecting the injector needle from the first row of nozzles. No fuel is injected at this position.

The method 900 proceeds to 908, where the current to the fuel injector actuator is decreased such that the injector needle moves upwards and fluidically reconnects with the first row of nozzles. As the fuel injector needle fluidically reconnects with the first row of nozzles, fuel is injected through the first row of nozzles. The current to the actuator is held to maintain the coupling with the first row of nozzles for the desired duration to inject desired fuel volume.

The method 900 then proceeds to 906, where the actuator is deactivating by ending current supply to the injector. Deactivating the fuel injector actuator includes stopping providing the signal to the actuator. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as discussed above with reference to FIG. 2. In this way, the fuel injector assembly may be utilized to deliver two fuel injections via the first row of nozzles. An example of two fuel injections through the first row of nozzles is shown at FIG. 11.

FIG. 11 illustrates a sequence 920 for two fuel injections in a single combustion cycle. The sequence of FIG. 11 may be observed during operation of the system of FIGS. 1-2 by utilizing the method of FIG. 10 in conjunction with the method of FIG. 7.

A first graph from the top of FIG. 11 shows a position of an annulus cut portion, such as lower annulus cut portion 224 at FIGS. 2-6, of a fuel injector assembly versus time. Plot 922 indicates the annulus cut position as a function of time. As shown in FIG. 11, the annulus cut position increases with respect to the Y-axis as the annulus cut portion moves in a downward direction, such as direction 205 at FIG. 3, along a longitudinal axis of the fuel injector. In other words, the Y-axis arrow indicates a movement of the annulus cut portion of the fuel injector needle (and hence the fuel injector needle) in the downward direction.

The second graph from the top of FIG. 11 shows current supplied to the actuator versus time. Plot 924 represents current over time, and the current increases in the direction of the Y-axis arrow.

The third graph from the top of FIG. 11 shows fuel injection rate versus time. Plot 926 represents fuel injection rate over time, and the fuel injection rate increases in the direction of the Y-axis arrow. All plots show time increasing along the direction of the X-axis arrow.

At time t0, the fuel injector is in a deactivated or rest state. In the deactivated state, the fuel injector needle is held in a closed position by the force of the retention springs. In the closed position, the annulus cut portion of the fuel injector is above the first row of nozzles, the second row of nozzles, and the third row of nozzles, and therefore, the annulus cut portion is not coupled to either first, second, or third row of nozzles. Thus, the fuel supply 240 is decoupled from the nozzles and fuel delivery does not take place, as illustrated in FIG. 2.

Between times t0 and t1, an electric signal (that is, current) is supplied to an actuator (plot 924). As a result, the fuel injector needle moves in a downward direction along a longitudinal axis of the injector. As the current increases, the injector needle moves further downwards from the rest position towards the first row of nozzles, as indicated by the plot 922. At t1, the annulus cut portion of the fuel injector needle starts coupling to the first row of nozzles. That is, at t1, a portion of the annulus cut portion is coupled to a portion of each of the nozzles of the first row of nozzles, thus, at t1, fuel injection begins, and fuel is injected into the environment in which the fuel injector is positioned.

Between t1 and t2, as the current to the actuator is increased (plot 924), the injector needle is further pushed downwards and the region of coupling between the annulus cut portion and the first row of nozzles increases. Accordingly, the fuel injection rate increases (plot 926).

At t2, the annulus cut portion is fully coupled to the first row of nozzles. Between t2 and t3, a constant holding current (plot 924) is supplied to the actuator. As a result, the annulus cut portion of the fuel injector needle remains fully coupled to the first row of nozzles between time t2 and t3 (plot 922), and the fuel is delivered at a constant fuel injection rate via the first row of nozzles. The fuel injector needle may move downwards between t2-t3. However, the injector needle, even if moving downwards, may remain fully coupled to the first row of nozzles, for example, when a diameter of the annulus cut portion is more than a diameter of the fuel injector nozzle.

At t3, current supply to the actuator is increased further (plot 924). As a result, the fuel injector needle moves further in the downwards direction, such as direction 205 indicated at FIG. 3, away from the first row of nozzles and towards the second row of nozzles. As the fuel injector needle moves between the first row of nozzles and second row of nozzles, between t3 and t4, the region of coupling between the annulus cut portion of the fuel injector and the first row of nozzles decreases and is partial. Hence, the fuel injection rate decreases (plot 926).

At t4, the annulus cut portion of the fuel injector needle is fully decoupled from the first row of nozzles (plot 922). Consequently, no fuel is injected. After t4 and between t4 and t5, no fuel injection occurs. Starting at t5, the current to the actuator is decreased, such that the fuel injector needle is moved upward (away from the second row of nozzles and towards the first row of nozzles), establishing partial fluidic connection between the fuel injector needle and the first row of nozzles (plot 922). As a portion of the fuel injector needle comes in contact with a portion of the first roe of nozzles, fuel is injected (plot 926) As the current decreases between t5 and t6 (plot 924), the fuel injector needle continues to move upward, and between t6 and t7 is fully coupled to the first row of nozzles (plot 922).

The current is held constant during t6 to t7, and fuel is injected through the first row of nozzles (plot 926). The current is further decreased between t7 and t8, moving the fuel injector needle upward, establishing partial fluidic coupling between the fuel injector needle and the first row of nozzles, injecting some fuel between t7 and t8. At t8, the current continues to decrease (plot 924), moving the injector needle further upward, and fluidically disconnecting from the first row of nozzles, and ending fuel injection. The current to the actuator stops at t9, deactivating the fuel injector by returning the annulus cut portion and the fuel injector needle to the default closed position (illustrated in FIG. 2). In this way, two fuel injections may be performed during one cycle of the fuel injector needle movement.

Figure 12:
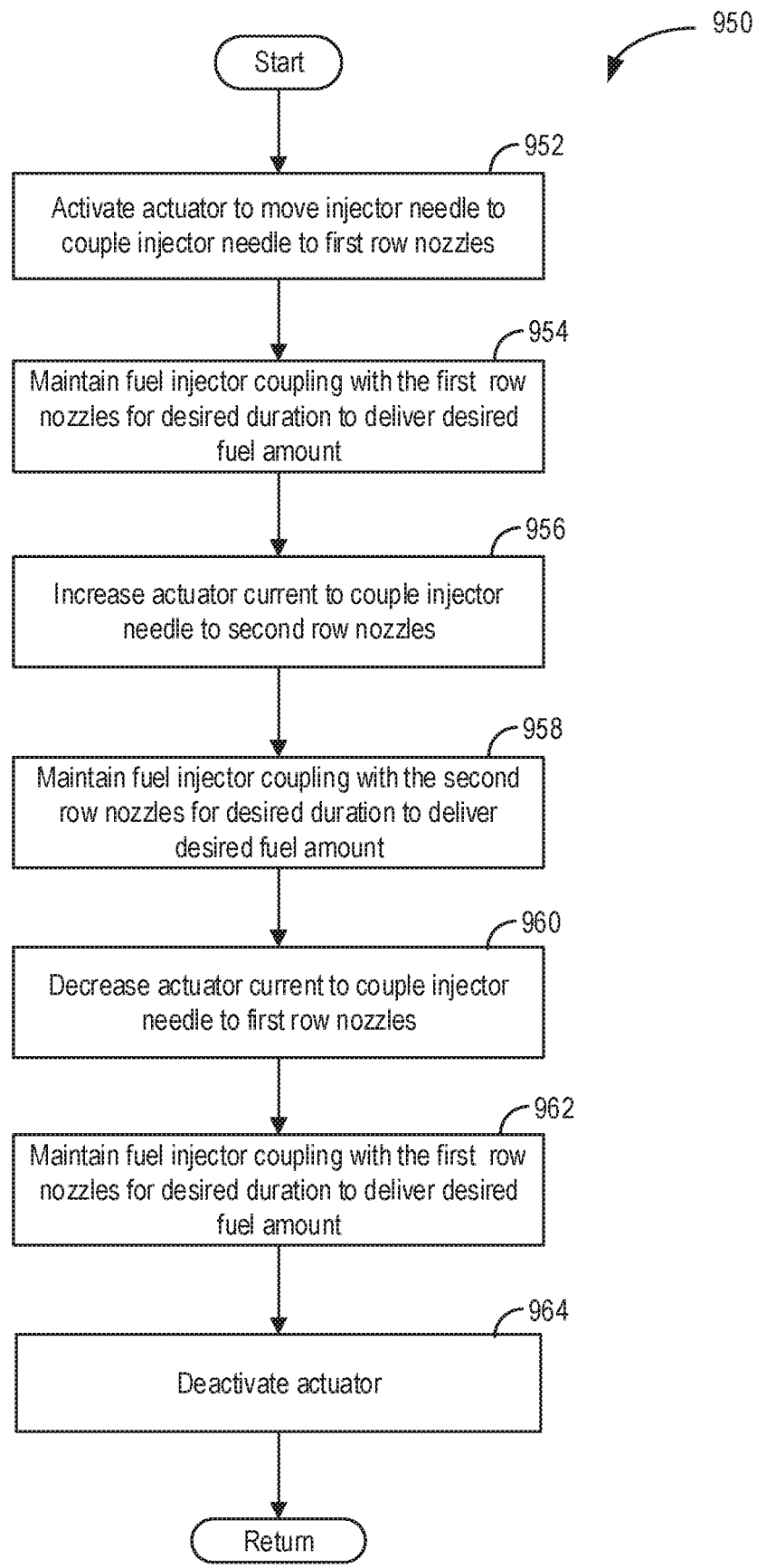
FIG. 12 shows an example method for performing three fuel injections through the fuel injector assembly of FIG. 2.
Figure 13:
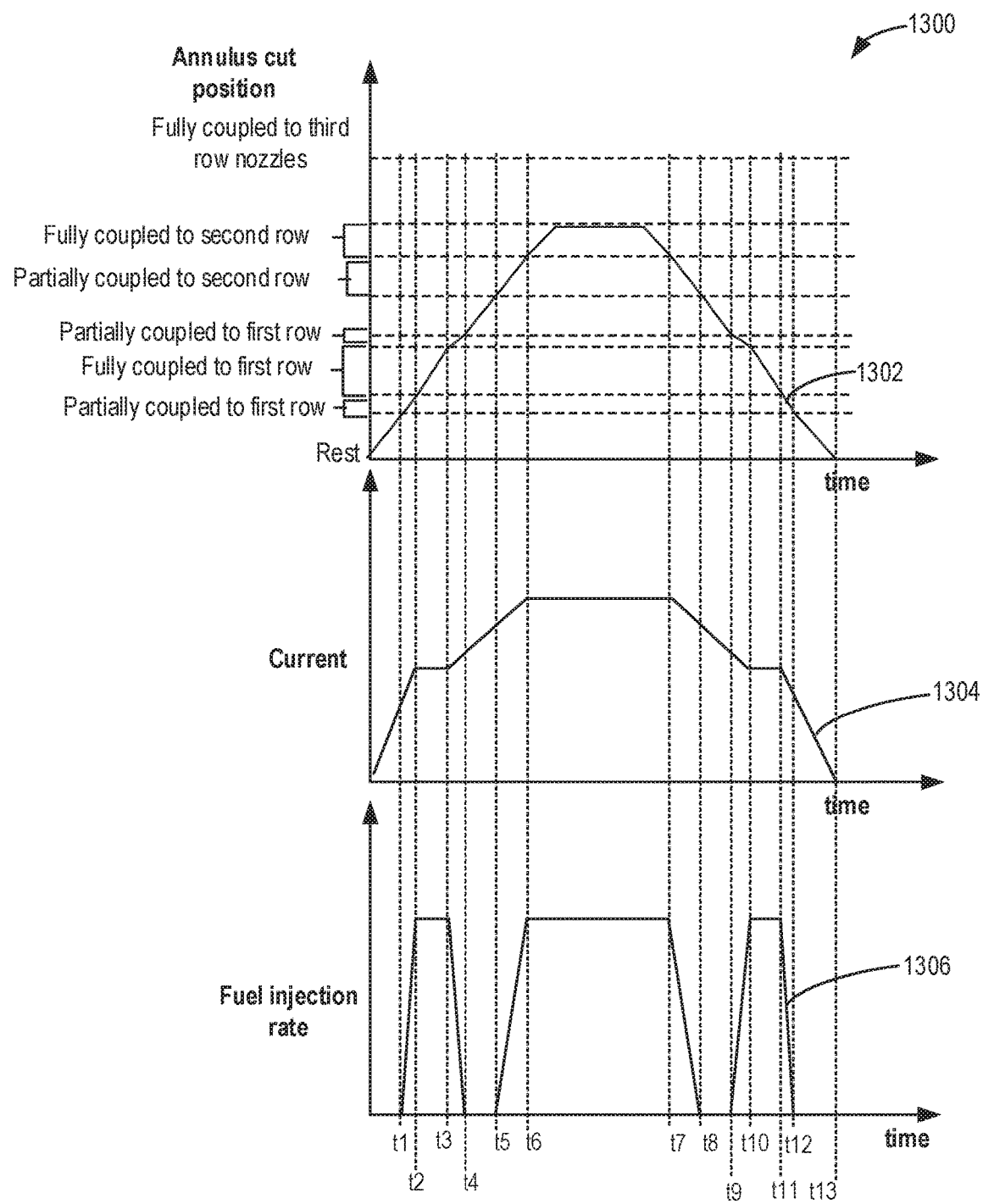
FIG. 13 shows an example operating sequence for performing three fuel injections through the fuel injector assembly of FIG. 2.

FIG. 12 illustrates an example method 950 for delivering three fuel injections during a single combustion cycle. The three fuel injections may be delivered by utilizing a fuel injector assembly, such as fuel injector assembly 200 shown at FIGS. 2-6. Specifically, the method illustrates control of a fuel injector actuator, such as actuator 202 at FIG. 2, for delivering three fuel injections.

Method 950 begins at 952 by activating the fuel injector actuator to move the fuel injector needle to fluidically couple the fuel supply to a first row of nozzles, such as nozzles 226 at FIGS. 2-5. In this example, it may be assumed that prior to activation, the fuel injector assembly is initially is a closed state, where no signal is supplied to the actuator and the fuel injector needle is decoupled from the first and the second row of nozzles. When operating in the closed state, the fuel injector assembly may be in a first position, such as the first position 201 shown in FIG. 2. Therefore, activating the fuel injector actuator includes providing a signal to the fuel injector actuator. The signal may be an electrical signal, such as a current. For example, a controller may determine a desired current to the actuator to move the injector needle downwards towards the first row of nozzles to couple the annulus cut portion, such as lower annulus cut portion 224 indicated at FIGS. 2-6, of the fuel injector needle to first row of nozzles of the fuel injector based on engine operating parameters. The controller may then supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector needle.

At 954, method 950 includes providing a holding current for a desired duration. Specifically, the holding current may be provided when the first row of nozzles are fully coupled to the annulus cut portion of the fuel injector needle. The holding current may be a constant current and may be provided to maintain the fluidic coupling between the fuel supply and the first row of nozzles for the desired duration. The desired duration may be based on a desired fuel injection amount based on engine operating conditions, for example, which may be determined in the manner explained above with respect to FIG. 8. Accordingly, if a larger amount of fuel injection is desired, the desired duration of providing the holding current may be greater.

Upon delivering the desired fuel injection amount via the first row of nozzles, method 950 proceeds to 956. At 956, the controller may increase the current to the fuel injector actuator, moving the fuel injector needle further downwards away from the first row of nozzles, and to fluidically connect with the second row of nozzles, as illustrated in FIG. 4.

The method 950 proceeds to 958, where a holding current is provided for a desired duration. Specifically, the holding current may be provided when the second row of nozzles are fully coupled to the annulus cut portion of the fuel injector needle. The desired duration for which the holding current is provided results in injection of a desired fuel volume.

The method 950 then proceeds to 950, where the current to the actuator is decreased to move the annulus cut portion of the fuel injector needle upwards to fluidically connect with the first row of nozzles. At 952, the method 950 maintains the fuel injector coupling to the first row of nozzles for the desired duration by providing a holding current. Fuel is injected through the first row of nozzles at this position of the fuel injector.

The method 950 deactivates the actuator at 952 by ending current supply to the injector. Deactivating the fuel injector actuator includes stopping providing signal to the actuator. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as discussed above with reference to FIG. 2. In this way, the fuel injector assembly may be utilized to deliver three fuel injections. An example of three fuel injections is shown at FIG. 13.

FIG. 13 illustrates a sequence 1300 for three fuel injections. The sequence of FIG. 13 may be observed during the operation of the system of FIGS. 1-2 by utilizing the method of FIG. 12 in conjunction with the method of FIG. 7.

A first graph from the top of FIG. 13 shows a position of an annulus cut portion, such as lower annulus cut portion 224 at FIGS. 2-6, of a fuel injector assembly versus time. Plot 1302 indicates the annulus cut position as a function of time. As shown in FIG. 13, the annulus cut position increases with respect to the Y-axis as the annulus cut portion moves in a downward direction, such as direction 205 at FIG. 3, along a longitudinal axis of the fuel injector. In other words, the Y-axis arrow indicates a movement of the annulus cut portion of the fuel injector needle (and hence the fuel injector needle) in the downward direction.

The second graph from the top of FIG. 13 shows current supplied to the actuator versus time. Plot 1304 represents current over time, and the current increases in the direction of the Y-axis arrow.

The third graph from the top of FIG. 13 shows fuel injection rate versus time. Plot 1306 represents fuel injection rate over time, and the fuel injection rate increases in the direction of the Y-axis arrow. All plots show time increasing along the direction of the X-axis arrow.

At time t0, the fuel injector is in the deactivated or rest state. Thus, fuel supply 240 is decoupled from the nozzles and fuel delivery does not take place, as illustrated in FIG. 2.

Between times t0 and t1, the electric signal (that is, current) is supplied to the actuator (plot 1304). As a result, the fuel injector needle moves in the downward direction along the longitudinal axis of the injector. As the current increases, the injector needle moves further downwards from the rest position towards the first row of nozzles, as indicated by the plot 1302. At t1, the annulus cut portion of the fuel injector needle starts coupling to the first row of nozzles. That is, at t1, a portion of the annulus cut portion is coupled to a portion of each nozzle of the first row of nozzles, thus, at t1, fuel injection begins, and fuel is injected into the environment in which the fuel injector is positioned.

Between t1 and t2, as the current to the actuator is increased (plot 1304), the injector needle is further pushed downwards and the region of coupling between the annulus cut portion and the first row of nozzles increases. Accordingly, the fuel injection rate increases (plot 1306).

At t2, the annulus cut portion is fully coupled to the first row of nozzles. Between t2 and t3, a constant holding current (plot 1304) is supplied to the actuator. As a result, the annulus cut portion of the fuel injector needle remains fully coupled to the first row of nozzles between time t2 and t3 (plot 1302), and the fuel is delivered at a constant fuel injection rate via the first row of nozzles.

At t3, current supply to the actuator is increased further (plot 1304). As a result, the fuel injector needle moves further in downwards direction, such as direction 205 indicated at FIG. 3, away from the first row of nozzles and towards the second row of nozzles. As the fuel injector needle moves from t3 to t4, the region of coupling between the annulus cut portion of the fuel injector and the first row nozzle decreases and is partial. Hence, the fuel injection rate decreases (plot 1306).

At t4, the annulus cut portion of the fuel injector needle is fully decoupled from the first row of nozzles (plot 1302). Consequently, no fuel is injected. After t4 and between t4 and t5, the fuel injector current increases. Starting at t5, the current to the actuator is increased, such that the fuel injector needle moved downwards to partially couple with the second row of nozzles, (plot 1302). As a portion of the fuel injector needle comes in contact with a portion of the first row of nozzles, fuel is injected (plot 1306). As the current increases, at t6 the fuel injector needle is fully fluidically coupled to the second row of nozzles.

The current is held constant during t6 to t7, and fuel is injected through the second row of nozzles (plot 1306). The current is decreased between t7 and t8, moving the fuel injector needle upward, establishing partial fluidic coupling between the fuel injector needle and the first row of nozzles, injecting some fuel between t7 and t8. At t8, the current continues to decrease (plot 1304), moving the injector needle further upward, fluidically disconnecting from the second row of nozzles, and no fuel is injected between t8 and t9.

Between t9 and t10, the annulus cut portion of the fuel injector is partially coupled to the first row of nozzles as the fuel injector needle continues to move upward (plot 1302) due to the decreasing current (plot 1304). Fuel is injected between t9 and t10, and at t10, the annulus cut portion of the fuel injector needle is fully coupled to the first row of nozzles. The current to the injector is held for the desired duration, injecting fuel through the first row of nozzles between t10 and t11.

At t11, the current to the actuator continues to decrease, moving the injector needle upwards. Between t11 and t12, the annulus cut portion of the fuel injector needle is only partially coupled to the first row of nozzles, injecting fuel through the first row of nozzles.

As current continues to decrease between t12 and t13 (plot 1304), the injector needle with the annulus cut portion continues to move upward and is fluidically disconnected from the first row of nozzles. At t13, the current to the actuator ends (plot 1304), deactivating the fuel injector by returning the annulus cut portion and the fuel injector needle to the default closed position (illustrated in FIG. 2). In this way, three fuel injections may be performed during one cycle of the fuel injector needle movement.

Figure 14:
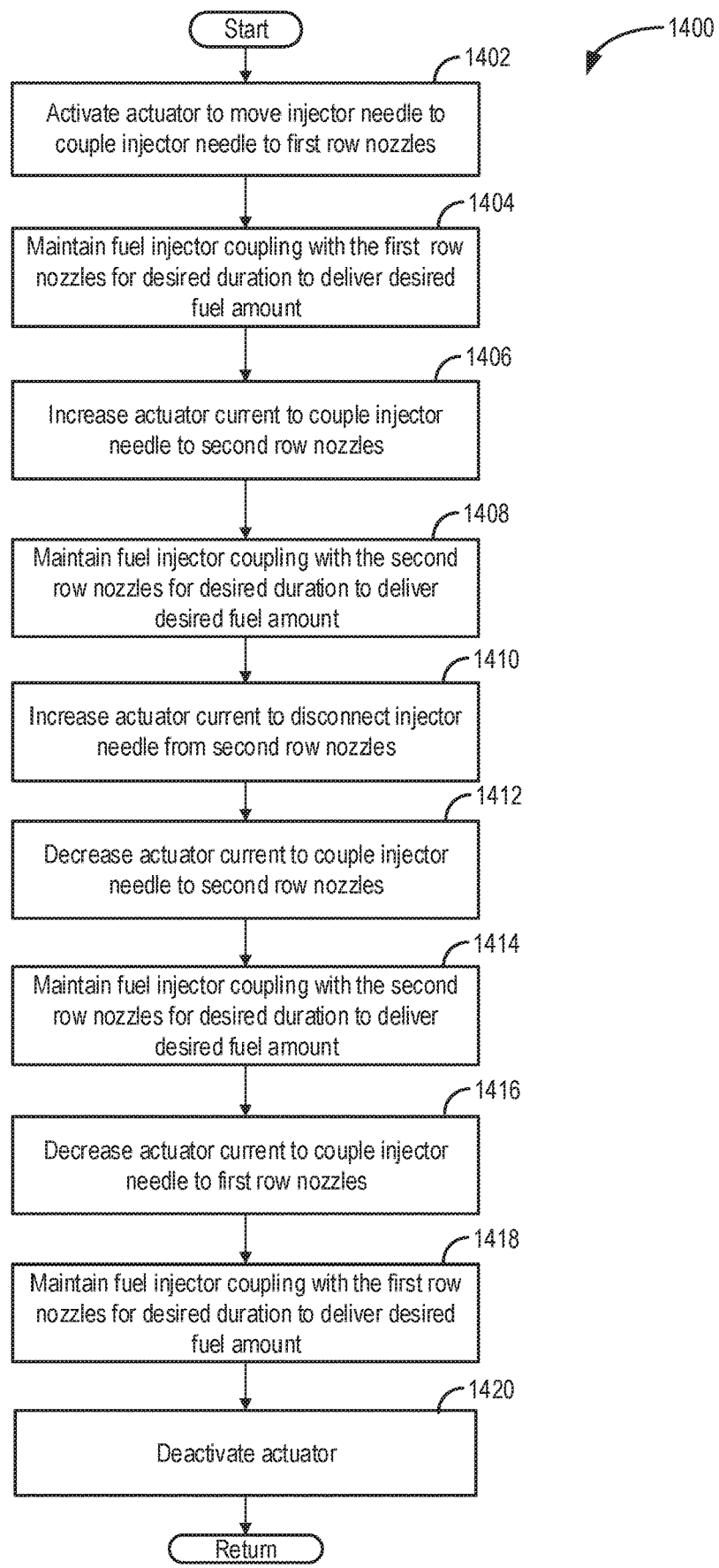
FIG. 14 shows an example method for performing four fuel injections through the fuel injector assembly of FIG. 2.
Figure 15:
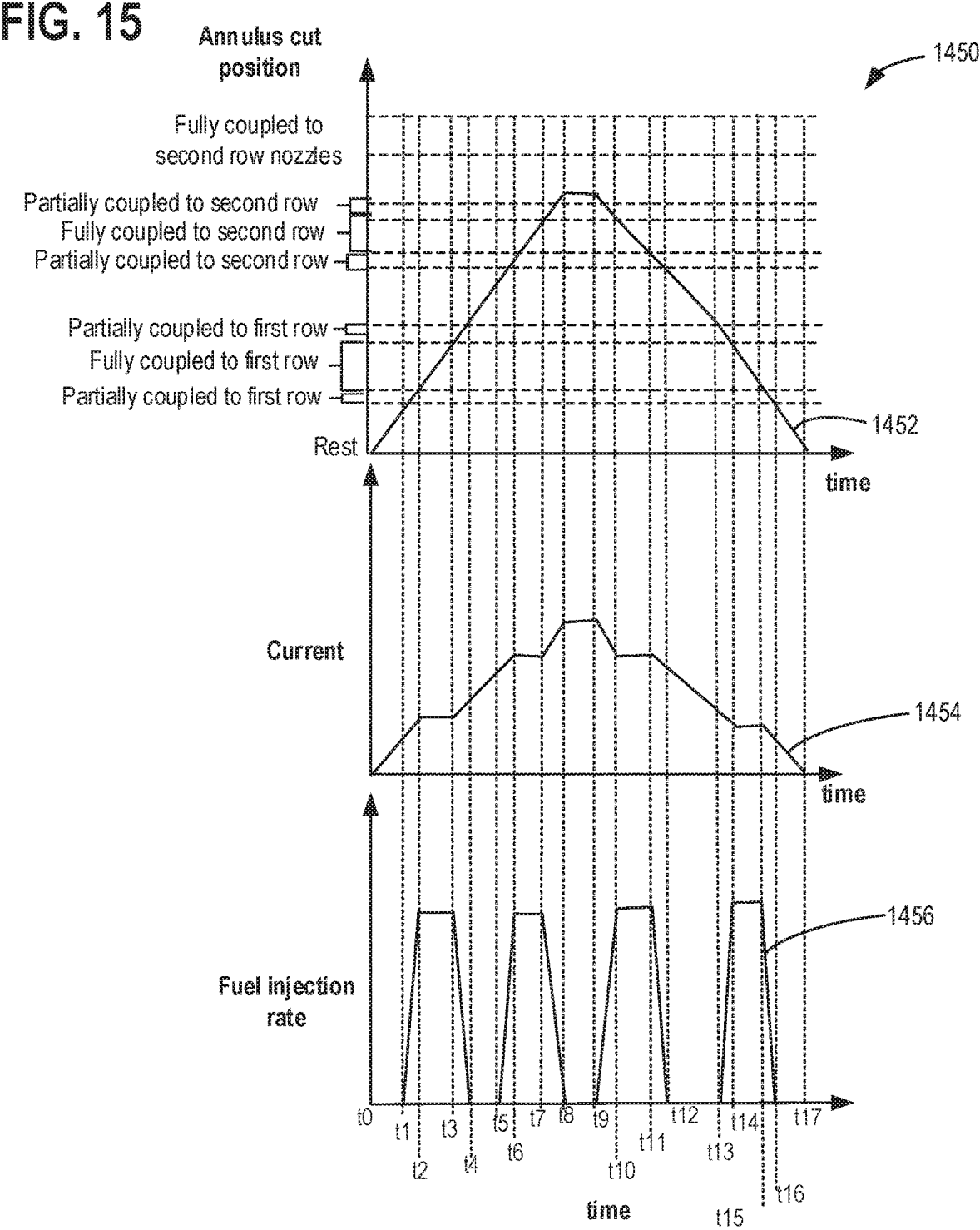
FIG. 15 shows an example operating sequence for performing four fuel injections through the fuel injector assembly of FIG. 2.

FIG. 14 illustrates an example method 1400 for delivering four fuel injections during a single combustion cycle. The four fuel injections may be delivered by utilizing a fuel injector assembly, such as fuel injector assembly 200 shown at FIGS. 2-6. Specifically, the method illustrates control of a fuel injector actuator, such as actuator 202 at FIG. 2, for delivering four fuel injections.

Method 1400 begins at 1402 by activating the fuel injector actuator to move the fuel injector needle to fluidically couple the fuel supply to a first row of nozzles. In this example, it may be assumed that prior to activation, the fuel injector assembly is initially is a closed state, where no signal is supplied to the actuator and the fuel injector needle is decoupled from the first, the second, and the third row of nozzles. When operating in the closed state, the fuel injector assembly may be in a first position, such as the first position 201 shown in FIG. 2. Therefore, activating the fuel injector actuator includes providing a signal to the fuel injector actuator. The signal may be an electrical signal, such as a current. The controller may supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector needle.

At 1404, method 1400 includes providing a holding current for maintaining a desired fuel injection duration. Specifically, the holding current may be provided when the first row of nozzles are fully coupled to the annulus cut portion of the fuel injector needle. The holding current may be a constant current and may be provided to maintain the fluidic coupling between the fuel supply and the first row of nozzles for the desired duration. The desired duration may be based on a desired fuel injection amount based on engine operating conditions, as described above with respect to FIG. 8. Accordingly, if a larger amount of fuel injection is desired, the desired duration of providing the holding current may be greater.

Upon delivering the desired fuel injection amount via the first row of nozzles, method 1400 proceeds to 1406. At 1406, the controller may increase the current to the fuel injector actuator, moving the fuel injector needle further downwards away from the first row of nozzle, and to fluidically connect with the second row of nozzles, as illustrated in FIG. 4.

The method 1400 proceeds to 1408, where a holding current is provided for a desired duration. Specifically, the holding current may be provided when the second row of nozzles are fully coupled to the annulus cut portion of the fuel injector needle. The desired duration for which the holding current is provided, results in injection of desired fuel volume.

The method 1400 then proceeds to 1410, where the current to the actuator is increased to move the annulus cut portion of the fuel injector needle downwards to fluidically disconnect from the second row of nozzles (but not connecting to the third row of nozzles). At 1412, the method 1400 decreases current to the actuator, moving the injector needle upwards to fluidically reconnect with the second row of nozzles. At 1414, a holding current is provided to maintain the injector needle in fluidic communication with the second row of nozzles for a desired duration to inject the desired fuel volume.

The method 1400 proceeds to 1416, decreasing the current to the actuator to move the injector needle further upwards to disconnect from the second row of nozzles and connect to the first row of nozzles. At 1418, a holding current for a desired duration in provided to inject fuel through the first row of nozzles.

The method 1400 proceeds to 1420, where the actuator is deactivated by ending current supply to the injector. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as discussed above with reference to FIG. 2. In this way, the fuel injector assembly may be utilized to deliver four fuel injections. An example of five four injections is shown at FIG. 15.

FIG. 15 illustrates a sequence 1450 for four fuel injections. The sequence of FIG. 15 may be observed during the operation of the system of FIGS. 1-2 by utilizing the method of FIG. 14 in conjunction with the method of FIG. 7.

A first graph of FIG. 15 shows a position of an annulus cut portion, such as lower annulus cut portion 224 at FIGS. 2-6, of a fuel injector assembly versus time. Plot 1452 indicates the annulus cut position as a function of time. As shown in FIG. 9, the annulus cut position increases with respect to the Y-axis as the annulus cut portion moves in a downward direction, such as direction 205 at FIG. 3, along a longitudinal axis of the fuel injector. In other words, the Y-axis arrow indicates a movement of the annulus cut portion of the fuel injector needle (and hence the fuel injector needle) in the downward direction.

The second graph from the top of FIG. 15 shows current supplied to the actuator versus time. Plot 1454 represents current over time, and the current increases in the direction of the Y-axis arrow.

The third graph from the top of FIG. 15 shows fuel injection rate versus time. Plot 1456 represents fuel injection rate over time, and the fuel injection rate increases in the direction of the Y-axis arrow. All plots show time increasing along the direction of the X-axis arrow.

At time t0, the fuel injector is in a deactivated or rest state. In the deactivated state, the fuel injector assembly is held in a closed position by the force of the retention springs. In the closed position, the annulus cut portion of the fuel injector is above the first row of nozzles, the second row of nozzles, and the third row of nozzles, and therefore, the annulus cut portion is not coupled to either first, second, or third row of nozzles. Thus, fuel supply 240 is decoupled from the nozzles and fuel delivery does not take place, as illustrated in FIG. 2.

Between times t0 and t1, an electric signal (that is, current) is supplied to an actuator (plot 1304). As a result, the fuel injector needle moves in a downward direction along a longitudinal axis of the injector. As the current increases, the injector needle moves further downwards from the rest position towards the first row of nozzles, as indicated by the plot 1452. At t1, the annulus cut portion of the fuel injector needle starts coupling to the first row of nozzles. Thus, at t1, fuel injection begins and fuel in injected into the environment in which the fuel injector is positioned. That is, in case of direct fuel injection, fuel is injected into the engine cylinder and in case of port fuel injection; fuel is injected into the intake manifold.

Between t1 and t2, as the current to the actuator is increased (plot 1454), the injector needle is further pushed downwards and the region of coupling between the annulus cut portion and the first row of nozzles increases. Accordingly, the fuel injection rate increases (plot 1456).

At t2, the annulus cut portion is fully coupled to the first row of nozzles. Between t2 and t3, a constant holding current (plot 1454) is supplied to the actuator. As a result, the annulus cut portion of the fuel injector needle remains fully coupled to the first row of nozzles between time t2 and t3 (plot 1452), and the fuel is delivered at a constant fuel injection rate via the first row of nozzles.

At t3, current supply to the actuator is increased further (plot 1454). As a result, the fuel injector needle moves further in downwards direction, such as direction 205 indicated at FIG. 3, away from the first row of nozzles and towards the second row of nozzles. As the fuel injector needle moves from t3 to t4, region of coupling between the annulus cut portion of the fuel injector and the first row nozzle decreases and is partial. Hence, the fuel injection rate decreases (plot 1456).

At t4, the annulus cut portion of the fuel injector needle is fully decoupled from the first row of nozzles (plot 1452). Consequently, no fuel is injected. After t4 and between t4 and t5, the fuel injector current increases. Starting at t5, the current to the actuator is increased, such that the fuel injector needle moved downwards to partially couple with the second row of nozzles, (plot 1452). As a portion of the fuel injector needle comes in contact with a portion of the first row of nozzles, fuel is injected (plot 1456). As the current increases, at t6 the fuel injector needle is fully fluidically coupled to the second row of nozzles.

The current is held constant during t6 to t7, and fuel is injected through the second row of nozzles (plot 1452). The current is increased between t7 and t8, moving the fuel injector needle downward, wherein fluidic coupling between the fuel injector needle and the second row of nozzles is only partial injecting some fuel between t7 and t8. At t8, the current continues to increase (plot 1454), moving the injector needle further downward, fluidically disconnecting from the second row of nozzles, and no fuel is injected between t8 and t9.

Between t9 and t10, the annulus cut portion of the fuel injector is partially coupled to the second row of nozzles as the fuel injector needle continues to move upward (plot 1452) due to the decreasing current (plot 1454). Fuel is injected between t9 and t10, and at t10, the annulus cut portion of the fuel injector needle is fully coupled to the second row of nozzles. The current to the injector is held for the desired duration, injecting fuel through the first row of nozzles between t10 and t11.

At t11, the current to the actuator continues to decrease, moving the injector needle upwards. Between t11 and t12, the annulus cut portion of the fuel injector needle is only partially coupled to the second row of nozzles, injecting fuel through the first row of nozzles.

The current continues to decrease (plot 1454) between t12-t13, disconnecting the annulus cut portion from the second row of nozzles, suspending fuel injection (plot 1456). As the current continues to decrease between t13-t14, the fuel injector needle continues to move upward (plot 1452. Fuel is injected between t13-t14, as the annulus cut portion of the fuel injector needle is partially coupled to the first row of nozzles. As the current is increased, the annulus cut portion is fully coupled to the first row of nozzles (plot 1452), and the current is held constant between t14-t15. The current to the injector is held for the desired duration, injecting fuel through the first row of nozzles between t14 and t15.

At t15, the current to the actuator further decreases (plot 1454), the annulus cut portion of the fuel injector is partially coupled to the first row of nozzles as the fuel injector needle continues to move upward (plot 1452) due to the decreasing current (plot 1454). Fuel is injected between t15 and t16.

Between t16-t17, the current supply to the injector decreases and ends at t17. With decreasing current, the injector needle continues to move upward. Away from the nozzles, ending fuel injection. In this way, four fuel injections may be performed during one cycle of the fuel injector needle movement.

Figure 16:
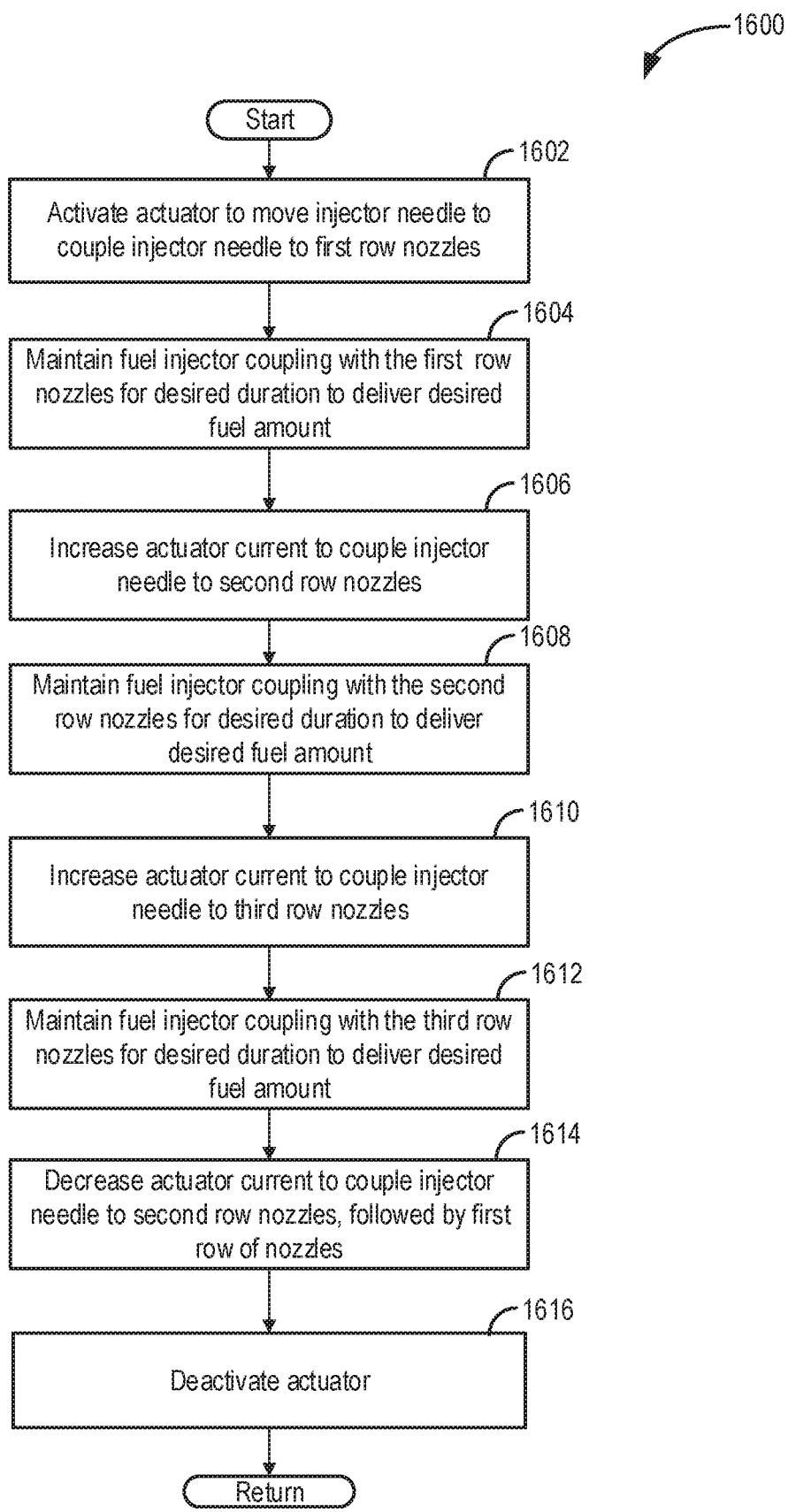
FIG. 16 shows an example method for performing five fuel injections through the fuel injector assembly of FIG. 2.
Figure 17:
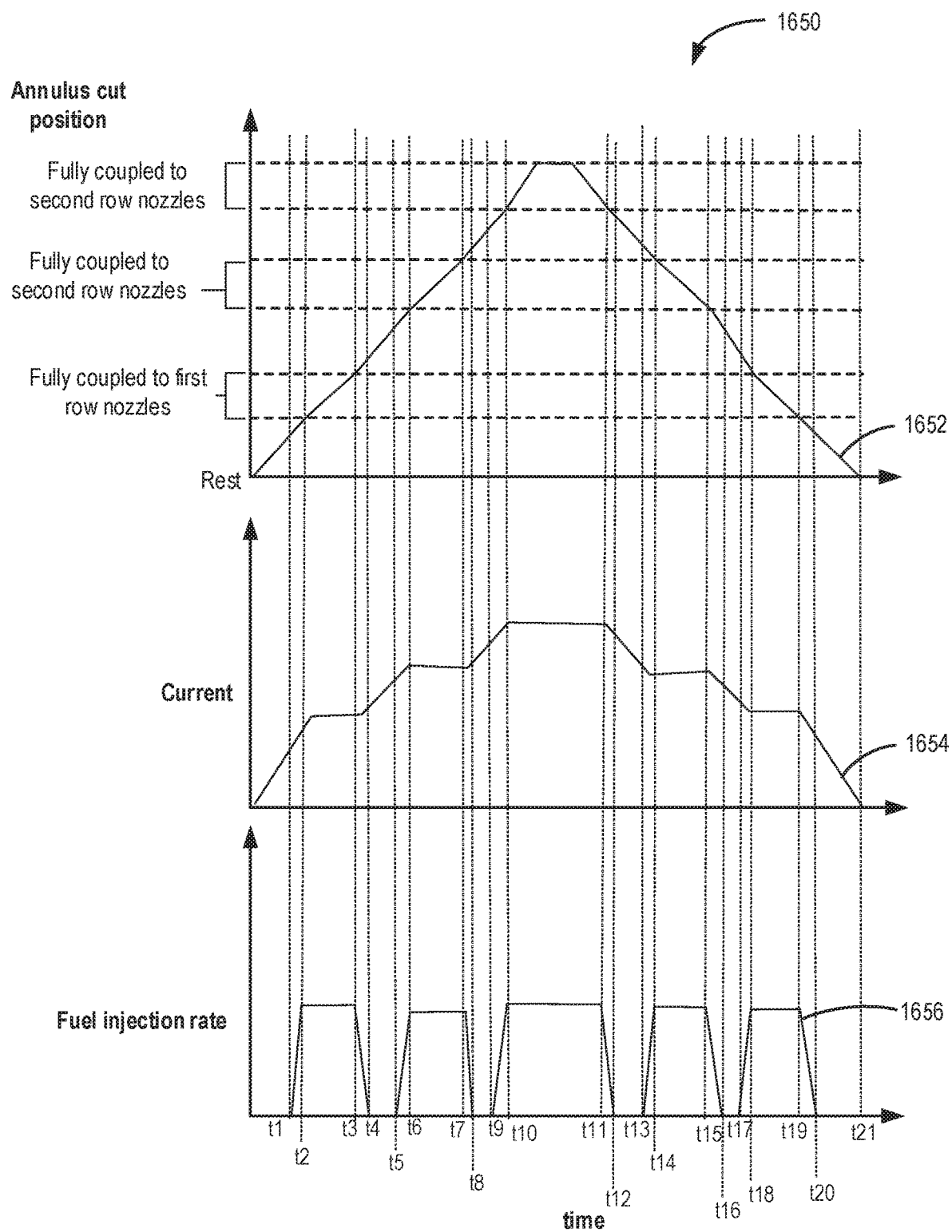
FIG. 17 shows an example operating sequence for performing five fuel injections through the fuel injector assembly of FIG. 2.

FIG. 16 illustrates an example method 1600 for delivering five fuel injections during a single combustion cycle. The five fuel injections may be delivered by utilizing a fuel injector assembly, such as fuel injector assembly 200 shown at FIGS. 2-6. Specifically, the method illustrates control of a fuel injector actuator, such as actuator 202 at FIG. 2, for delivering five fuel inj ections.

Method 1600 begins at 1602 by activating the fuel injector actuator to move the fuel injector needle to fluidically couple the fuel supply to a first row of nozzles. In this example, it may be assumed that prior to activation, the fuel injector assembly is initially is a closed state, where no signal is supplied to the actuator and the fuel injector needle is decoupled from the first, the second, and the third row of nozzles. When operating in the closed state, the fuel injector assembly may be in a first position, such as the first position 201 shown in FIG. 2. Therefore, activating the fuel injector actuator includes providing a signal to the fuel injector actuator. The signal may be an electrical signal, such as a current. The controller may supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector needle.

At 1604, method 1600 includes providing a holding current for maintaining a desired duration. Specifically, the holding current may be provided when the first row of nozzles are fully coupled to the annulus cut portion of the fuel injector needle. The holding current may be a constant current and may be provided to maintain the fluidic coupling between the fuel supply and the first row of nozzles for the desired duration. The desired duration may be based on a desired fuel injection amount based on engine operating condition. Accordingly, if a larger amount of fuel injection is desired, the desired duration of providing the holding current may be greater. As such, the desired fuel injection amount, or fuel demand may be based on a pedal position (pp), engine speed (N), and measured mass airflow (MAF). Note that this fuel injection amount can also be determined based on other parameters. For example, a two-dimensional map of engine speed and pedal position can be used. Alternatively, a two-dimensional map of pedal position and vehicle speed can also be used.

Upon delivering the desired fuel injection amount via the first row of nozzles, method 1600 proceeds to 1606. At 1606, the controller may increase the current to the fuel injector actuator moving the fuel injector needle further downwards away from the first row of nozzle, and to fluidically connect with the second row of nozzles.

The method 1600 proceeds to 1608, where a holding current is provided for a desired duration. Specifically, the holding current may be provided when the second row of nozzles are fully coupled to the annulus cut portion of the fuel injector needle. The desired duration for which the holding current is provided, results in injection of desired fuel volume.

The method 1600 then proceeds to 1610, where the current to the actuator is increased to move the annulus cut portion of the fuel injector needle downwards to fluidically connect with the third row of nozzles. At 1612, the method 1600 maintains the fuel injector coupling to the third row of nozzles for the desired duration by providing a holding current. Fuel is injected through the third row of nozzles at this position of the fuel injector.

The method 1600 decreases the current to the actuator at 1614, and as the injector needle moves upwards, the injector needle fluidically disconnects from the third row of nozzle and sequentially connects with the second row of nozzles, followed by the first row of nozzles. At each fluidic connection with the nozzle holes, current may be held to maintain the specific position to inject desired fuel volume, as described above.

The method 1600 proceeds to 1616, ending current supply to the injector. Deactivating the fuel injector actuator includes stopping providing signal to the actuator. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as discussed above with reference to FIG. 2. In this way, the fuel injector assembly may be utilized to deliver five fuel injections. An example of five fuel injections is shown at FIG. 17.

FIG. 17 illustrates a sequence 1650 for four fuel injections. The sequence of FIG. 17 may be observed while operating the system of FIGS. 1-2 by utilizing the method of FIG. 16 in conjunction with the method of FIG. 7.

A first graph from the top of FIG. 17 shows a position of an annulus cut portion, such as lower annulus cut portion 224 at FIGS. 2-6, of a fuel injector assembly versus time. Plot 1652 indicates the annulus cut position as a function of time. As shown in FIG. 13, the annulus cut portion increases with respect to the Y-axis as the annulus cut portion moves in a downward direction, such as direction 205 at FIG. 3, along a longitudinal axis of the fuel injector. In other words, the Y-axis arrow indicates a movement of the annulus cut portion of the fuel injector needle (and hence the fuel injector needle) in the downward direction.

The second graph from the top of FIG. 17 shows current supplied to the actuator versus time. Plot 1654 represents current over time, and the current increases in the direction of the Y-axis arrow.

The third graph from the top of FIG. 17 shows fuel injection rate versus time. Plot 1656 represents fuel injection rate over time, and the fuel injection rate increases in the direction of the Y-axis arrow. All plots show time increasing along the direction of the X-axis arrow.

At time t0, the fuel injector is in a deactivated or rest state. In the deactivated state, the fuel injector needle is held in a closed position by the force of the retention springs. In the closed position, the annulus cut portion of the fuel injector is above the first row of nozzles, the second row of nozzles, and the third row of nozzles, and therefore, the annulus cut portion is not coupled to either first, second, or third row of nozzles. Thus, fuel supply 240 is decoupled from the nozzles and fuel delivery does not take place, as illustrated in FIG. 2.

Between times t0 and t1, an electric signal (that is, current) is supplied to an actuator (plot 1304). As a result, the fuel injector needle moves in a downward direction along a longitudinal axis of the injector. As the current increases, the injector needle moves further downwards from the rest position towards the first row of nozzles, as indicated by the plot 1652. At t1, the annulus cut portion of the fuel injector needle starts coupling to the first row of nozzles. Thus, at t1, fuel injection begins and fuel in injected into the environment in which the fuel injector is positioned. That is, in case of direct fuel injection, fuel is injected into the engine cylinder and in case of port fuel injection; fuel is injected into the intake manifold.

Between t1 and t2, as the current to the actuator is increased (plot 1654), the injector needle is further pushed downwards and the region of coupling between the annulus cut portion and the first row of nozzles increases. Accordingly, the fuel injection rate increases (plot 1656).

At t2, the annulus cut portion is fully coupled to the first row of nozzles. Between t2 and t3, a constant holding current (plot 1654) is supplied to the actuator. As a result, the annulus cut portion of the fuel injector needle remains fully coupled to the first row of nozzles between time t2 and t3 (plot 1652), and the fuel is delivered at a constant fuel injection rate via the first row of nozzles.

At t3, current supply to the actuator is increased further (plot 1654). As a result, the fuel injector needle moves further in downwards direction, such as direction 205 indicated at FIG. 3, away from the first row of nozzles and towards the second row of nozzles. As the fuel injector needle moves from t3 to t4, region of coupling between the annulus cut portion of the fuel injector and the first row nozzle decreases and is partial. Hence, the fuel injection rate decreases (plot 1656).

At t4, the annulus cut portion of the fuel injector needle is fully decoupled from the first row of nozzles (plot 1652). Consequently, no fuel is injected. After t4 and between t4 and t5, the fuel injector current increases. Starting at t5, the current to the actuator is increased, such that the fuel injector needle moved downwards to partially couple with the second row of nozzles, (plot 1652). As a portion of the fuel injector needle comes in contact with a portion of the first row of nozzles, fuel is injected (plot 1656). As the current increases, at t6 the fuel injector needle is fully fluidically coupled to the second row of nozzles.

The current is held constant during t6 to t7, and fuel is injected through the second row of nozzles (plot 1656). The current is increased between t7 and t8, moving the fuel injector needle downward, wherein fluidic coupling between the fuel injector needle and the second row of nozzles is only partial injecting some fuel between t7 and t8. At t8, the current continues to increase (plot 1654), moving the injector needle further downward, fluidically disconnecting from the second row of nozzles, and no fuel is injected between t8 and t9.

Between t9 and t10, the annulus cut portion of the fuel injector is partially coupled to the first row of nozzles as the fuel injector needle continues to move downward (plot 1652) due to the increasing current (plot 1654). Fuel is injected between t9 and t10, and at t10, the annulus cut portion of the fuel injector needle is fully coupled to the third row of nozzles. The current to the injector is held for the desired duration, injecting fuel through the first row of nozzles between t10 and t11.

At t11, the current to the actuator decreases moving the injector needle upwards. Between t11 and t12, the annulus cut portion of the fuel injector needle is only partially coupled to the third row of nozzles, injecting fuel through the third row of nozzles.

As current continues to decrease between t12 and t13 (plot 1654), the injector needle with the annulus cut portion continues to move upward and is fluidically disconnected from the third row of nozzles. At t13, the annulus cut portion is partially coupled to the second row of nozzle, injecting fuel between t13 to t14. At t14, the second row of nozzles are fully coupled to the second row of nozzles. A holding current is provided to the injector between t14 and t15 to inject desired fuel volume through the second row of nozzles. As current continues to decrease during t15 to t16, the second row of nozzles are partially coupled to the annulus cut portion, injecting fuel through the second row of nozzles during t15 to t16.

As current continues to decrease between t16 and t17 (plot 1654), the injector needle with the annulus cut portion continues to move upward and is fluidically disconnected from the second row of nozzles. At t17, the annulus cut portion is partially coupled to the first row of nozzle, injecting fuel between t17 to t18. At t18, the first row of nozzles are fully coupled to the fuel injector. A holding current is provided to the injector between t18 and t19 to inject desired fuel volume through the first row of nozzles. As current continues to decrease during t19 to t20, the first row of nozzles are partially coupled to the annulus cut portion, injecting fuel through the first row of nozzles during t18 to t19.

During t20 to t21, the current to the actuator ends (plot 1654), deactivating the fuel injector by returning the annulus cut portion and the fuel injector needle to the default closed position (illustrated in FIG. 2).

In this way, up to five fuel injections may be performed during one cycle of the fuel injector needle movement, delivering fuel from three different rows of the injector nozzles along different vertical planes of the injector body. The volume of fuel delivered during each position of the fuel injector during one cycle of the fuel injector needle movement may be adjusted to deliver up to two fuel pre-injections, followed by a main injection event and then followed by up to two fuel post-injections, based on engine operating conditions. Thus, desired fuel volume may be delivered and efficiently combusted, while reducing fuel spray penetration and fuel spray interaction, which in turn may prevent degradation of emissions.

In a second embodiment of a fuel injector assembly, in addition to delivering fuel from fuel injector nozzles located along three different vertical planes of an injector body, a pressure of fuel injection at each open position of the fuel injector during a single cycle of fuel injector needle movement may be increased to further enhance fuel spray atomization. The downward movement of a plurality of injector needles within respective fuel chambers inside the injector body may increase the pressure and decrease the volume inside the respective fuel chamber. The high-pressure fuel from each chamber may be delivered through coupled injector nozzles into a combustion chamber, resulting in enhanced fuel spray atomization and reduced fuel spray penetration into walls of the combustion chamber.

FIG. 18 shows a second embodiment of a fuel injector assembly 300, which may be utilized in an engine cylinder, such as cylinder 30 at FIG. 1, is illustrated. The fuel injector assembly 300 may be one non-limiting example of the fuel injector 66 and/or fuel injector 67 of FIG. 1.

The fuel injector assembly 300 includes an injector body 340 housing a first injector needle 316 movably within a first chamber 322 of the injector body 340. The first injector needle 316 is movable along a longitudinal axis 315 of the injector body 340. A second injector needle 318 may be movably housed inside a second chamber 324 that encircles the first injector needle 316. The second injector needle 318 may be an annulus injector needle, which encircles a circumference of the first injector needle 316 A length L2 of the second injector needle 318 may be less than a length L1 of the first injector needle 316. A third injector needle 320 may be movably housed inside a third chamber 326 that encircles the second injector needle 318. The third injector needle 320 may be an annulus injector needle, which encircles a circumference of the second injector needle 318. A length L3 of the third injector needle 320 may be less than the length L2 of the second injector needle.

In one example, there may be no fluidic connection between each of the chambers housing the respective needles. Each injector needle may be in tight face sharing contact with interior walls of the annulus injector around the injector needle and with the respective chamber as the injector needle moves upward or downward inside the chamber. Each of the injector needles housed inside the respective chambers may be movable along a longitudinal axis 315 of the injector body 340. In one example, the longitudinal axis 315 of the injector may be perpendicular to a transverse axis 309 of a cylinder to which the fuel injector 300 delivers fuel. However, in other examples the injector may be positioned at a different angle relative to the transverse axis.

The fuel injector body 340 includes a plurality of nozzles, including a first row of nozzles 342, a second row of nozzles 344, and a third row of nozzles 346, each arranged and positioned in a lower portion of the fuel injector body 340. The plurality of nozzles are used for delivering fuel from a fuel supply 330 (e.g., for delivering fuel to a cylinder). The fuel supply 330 may be a high-pressure fuel supply line, for example.

Each of the nozzles of the first row of nozzles 342 includes a first end 341 fluidically connecting to the first chamber 322, a second end 343 on an external wall of the fuel injector body 340, and a first path 342a connecting the first end 341 and the second end 343. The first end 341 is coupled to the first chamber 322 of the fuel injector body 340. The second end 343 opens to the exterior of the fuel injector body and the second ends of each of the nozzles lie along a first external circumferential path of the fuel injector body. Thus, each of the nozzles of the first nozzle row 342 couple the first chamber 322 of the fuel injector body 340 to the exterior (outside) of the fuel injector body 340. Thus, if the fuel injector is positioned within a combustion chamber of the cylinder, the second end opens to the combustion chamber, and the first row of nozzles 342 provide the first path for delivering fuel to the cylinder.

As indicated in the example illustrated in FIG. 18, the first path 342a may be sloping downwards, wherein the first end 341 of the first row of nozzles 342 may be positioned higher than the second end 343. Specifically, the first end 341 that opens to the first chamber 322 is positioned higher than the second end 343 that opens to the exterior of the fuel injector body. The exterior is an environment combustion chamber or intake manifold) in which the fuel injector 300 is placed. It will be appreciated that the slope of the first path 342a may vary (that the slope may be more or less) without departing from the scope of this disclosure. In some examples, the first end 341 and the second end 343 of the first row of nozzles 342 may be level with each other along a transverse axis perpendicular to the longitudinal axis 315 of the injector.

The fuel injector body 340 further includes the second row of nozzles 344 arranged and positioned vertically above the first row of nozzles 342. The second row of nozzles 344 and the first nozzle row of nozzles 342 may be separated by a distance. In other words, the second row of nozzles 344 may be positioned above the first row of nozzles 342 along the longitudinal axis 315 of the injector body. The second row of nozzles 344 may deliver fuel from the fuel supply 330, Each of the nozzles of the second row of nozzles 344 may provide a second path 344a that fluidically couples the second chamber 324 of the fuel injector body 340 to the exterior (that is, outside) of the fuel injector body 340, Specifically, a first end 345 of each of the nozzles of the second row of nozzles 344 opens to the second chamber 324 of the fuel injector body and a second end 343 of each of the nozzles of the second row of nozzles 344 opens to the exterior of the fuel injector body. Thus, if the fuel injector is positioned within the combustion chamber, the second end opens to the combustion chamber, and the second row of nozzles provide the second path 344a. for delivering fuel to the cylinder. Further, the second ends of each of the nozzles of the second row of nozzles 344 lies along a second external circumferential path of the fuel injector body above the first external circumferential path.

The fuel injector body 340 further includes a third row of nozzles 346 arranged and positioned vertically above the second row of nozzles 344. The third row of nozzles 346 and the second row of nozzles 344 may be separated by a distance. In other words, the third row of nozzles 346 may be positioned above the second row of nozzles 344 along the longitudinal axis 315 of the injector body. The third row of nozzles 346 may deliver fuel from the fuel supply 330. Each of the nozzles of the third row of nozzles 346 may provide a third path 346a that fluidically couples the third chamber 326 of the fuel injector body 340 to the exterior (that is, outside) of the fuel injector body 340. Specifically, a first end 349 of each of the nozzles of the third row of nozzles 346 opens to the third chamber 326 of the fuel injector body and a second end 351 of each of the nozzles of the third row of nozzles 346 opens to the exterior of the fuel injector body. Thus, if the fuel injector is positioned within the combustion chamber, the second end opens to the combustion chamber, and the third row of nozzles provide the third path 346a for delivering fuel to the cylinder. Further, the second ends of each of the nozzles of the third row of nozzles 346 lies along a third external circumferential path of the fuel injector body above the second external circumferential path.

Similar to the first path and the second path, the third path 346a may be sloping downwards. That is, the first end 349 of each of the nozzles of the third row of nozzles 346 may be positioned higher than the second end 351. Specifically, the first end 349 that opens to the third chamber 326 is positioned higher than the second end 351 that opens to the exterior of the fuel injector body. As mentioned above, the exterior is an environment (e.g., combustion chamber or intake manifold) in which the fuel injector is placed. It will be appreciated that the slope of the third path 346a may vary (that is, the slope may be more or less) without departing from the scope of this disclosure. in some examples, the first end 349 and the second end 351 of the nozzles of the third row may be in level with each other along a transverse axis that is perpendicular to the longitudinal axis 315 of the injector.

Further, each of the nozzles the first row of nozzles 342 may be arranged in parallel with each of the nozzles of the second row of nozzles 344 and parallel to the third row of nozzles 346, Similarly, the second row of nozzles 344 may be parallel to the third row of nozzles 346. Consequently, the slopes of the first path 342a, the second path 344a, and the third path 346a may be parallel to each other.

Further, in some examples, when three or more nozzles are present in the first row of nozzles 342, the nozzles of the first row of nozzles 342 may be arranged substantially equidistant from each other. Similarly, the when three or more nozzles are present in the second row, nozzles of the second row of nozzles 344 may be arranged substantially equidistant from each other. Three or more nozzles of the third row of nozzles 346 may be arranged substantially equidistant from each other. However, it will be appreciated that other arrangement of nozzles (e.g., cluster arrangement) may be possible without departing from the scope of the disclosure.

The fuel supply 330 includes a first fuel supply branch 317 fluidically connecting to the first chamber. The first fuel supply branch 317 may open into the first chamber 322 along a bottom section of the first chamber 322, the bottom section being close to a base 338 of the fuel injector body 340. A fluid channel 332 may be present in the first injector needle, as illustrated in FIG. 18. The fluid channel 332 may open along a base 333 of the first fuel injector needle 316.

Similarly, the fuel supply 330 includes a second fuel supply branch 319 fuidically connecting to the second chamber 324. The second fuel supply branch 319 may open into the second chamber 324 along a bottom section of the second chamber 324. A fluid channel 334 may be present in the second injector needle, as illustrated in FIG. 18. The fluid channel 334 may open along a base 335 of the second fuel injector needle 318.

The fuel supply 330 includes a third fuel supply branch 321 fluidically connecting to the third chamber 326. The third fuel supply branch 321 may open into the third chamber 326 along a bottom section of the third chamber 326. The third fuel supply branch may be vertically higher than the second fuel supply branch 319 and the second fuel supply branch is vertically higher than the first fuel supply branch 317. A fluid channel 336 may be present in the third injector needle, as illustrated in FIG. 18. The fluid channel 336 may open along a base 337 of the third fuel injector needle 320.

One or more retention springs may be included between the injector body 340 and each of the injector needles. A first set of retention springs 310 may be coupled to a top section 304 of the first injector needle 316. A second set of retention springs 312 may be coupled to a top section 306 of the second injector needle 318, and a third set of retention springs 314 may be coupled to a top section 308 of the third injector needle 320. Each of the retention springs coupled to the respective injector needles may act to bias the injector needle in an upward direction (e.g., away from the nozzles towards an upper portion of the injector body) along the longitudinal axis 315 of the injector body 340.

The top section 304 of the first injector needle 316 may be vertically higher than the top section 306 of the second injector needle 318, and the top section 306 of the second injector needle 318 is vertically higher than the top section 308 of the third injector needle 320. When the injector is in a closed position 370 (no fuel injection), each of the retention springs may bias the coupled top section of the respective needles away from the injector body. In one example, when the injector is in the closed position, the top section 304 may not be in physical contact with the top section 306 and the top section 306 is not in physical contact with the top section 308. As the fuel injector starts injecting fuel, the relative position of each of the top sections may vary as the respective injector needle moves downward towards the base 338 of the fuel injector body 340, as will be described below with reference to FIGS. 19-25.

An actuator 303 may be coupled to the top section 304 of the first injector needle 316. The actuator 303 may be used to move the first injector needle 316 to regulate fuel injection. Specifically, the actuator 303 may move the first injector needle 316 along the longitudinal axis 315 in a downward direction (e.g., toward the nozzles), against the force of the first set of springs 310. The actuator 303 may receive an electrical signal from a controller, such as controller 12 at FIG. 1. The electrical signal to the actuator may be based on the fuel injection mode (single, double, or multiple fuel injections, for example), a desired fuel injection amount, fuel injection timing, rail pressure, etc. Responsive to the electrical signal, the actuator may move the first injector needle 316 to regulate fuel injection.

An opening 360 is provided at the base 338 of the fuel injector body 340 to release air pressure from the first chamber 322 when the first injector needle 316 moves up and down by the force of the actuator 303. Further, each of the chambers may include one or more stoppers (not shown) for stopping the respective fuel injector needles from hitting an interior bottom surface of the chambers when electric force is supplied to the injector needle.

FIGS. 19-23 show the fuel injector 300 in various positions during fuel injection. It is to be understood that some features of the fuel injector 300 have been removed from FIGS. 19-23 for clarity, and that the fuel injector 300 illustrated in FIGS. 19-23 is the same fuel injector illustrated in FIG. 18.

Figure 19:
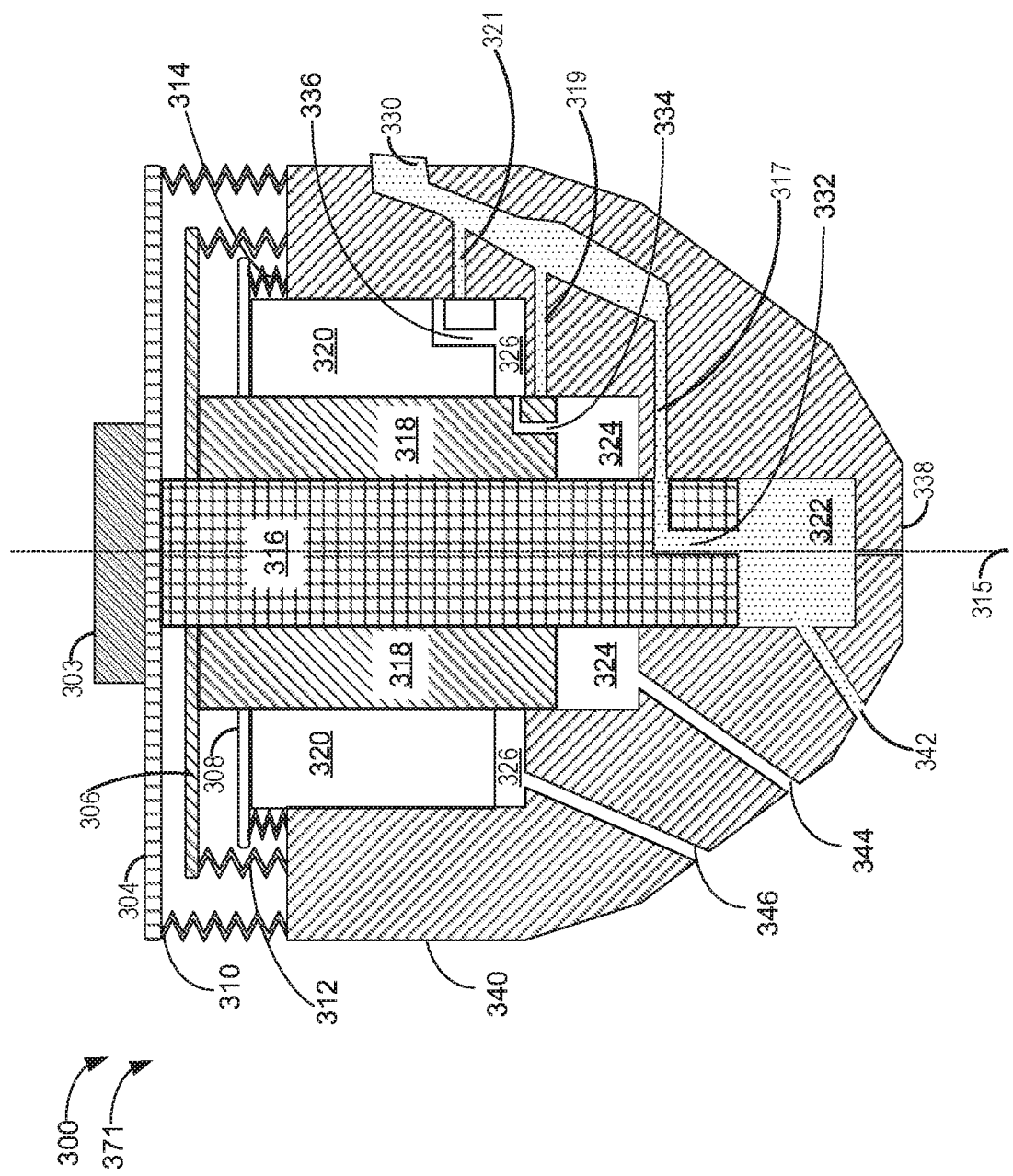
FIG. 19 shows the fuel injector assembly of FIG. 18 in a first open position.

FIG. 19 shows the fuel injector 300 in a first open position 371. In the first open position 371, the first fuel injector needle 316 may be adjusted by activation of the actuator 303. Specifically, the actuator 303 may be activated to provide a first amount of force. In response to the activation, the actuator forces the first injector needle 316 downward towards the base 338 of the injector body 340 against the force of the first set of springs 310. The first amount of force pushes the first injector needle downward to couple the first fuel supply branch 317 of the fuel supply line 330 to the fluid channel 332, In other words, responsive to activation of the actuator, the first amount of force moves the first injector needle 316 in a downward direction for a first distance along the longitudinal axis 315, which results in fluidic coupling between the fluid channel 332 to the first fuel supply branch 317. Fluidic coupling of the fluid channel 332 and the first fuel supply branch 317 results in high-pressure fuel entering he first chamber 322 and fuel from the first chamber 322 is delivered through the first set of injector nozzles 342 outside the injector body, for example, into a combustion chamber.

During the first open position 371, no fuel is present in the second chamber 324 or the third chamber 326, as there is no fluidic connection between the fluid channel 334 and the second fuel supply branch 319 or between the fluid channel 336 and the third fuel branch 321. Hence, no fuel is injected through the second row of nozzles or the third set of nozzles fluidically coupled to the second chamber 324 and the third chamber 326, respectively.

Figure 20:
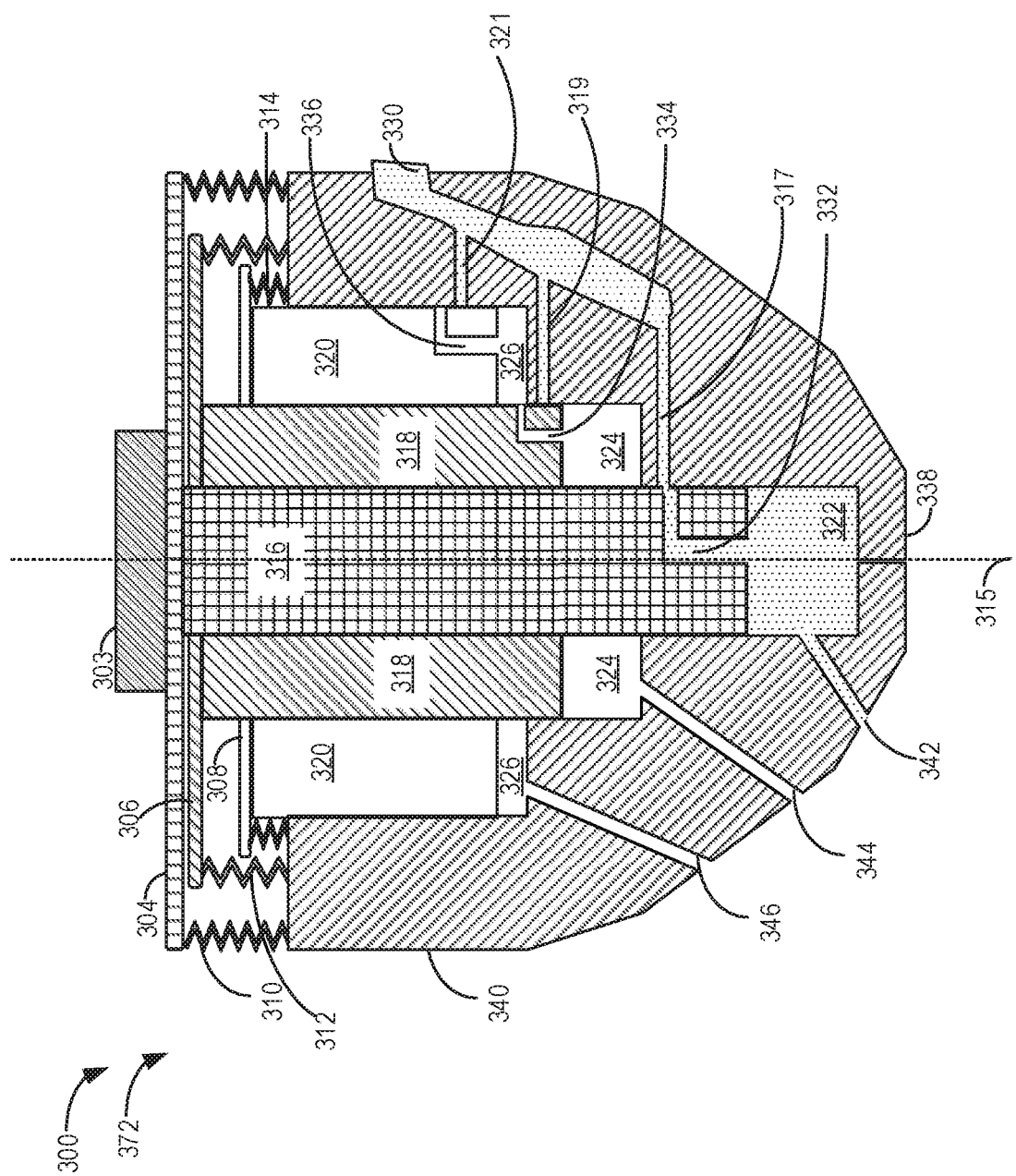
FIG. 20 shows the fuel injector assembly of FIG. 18 in a second open position.

The actuator 303 may maintain the fuel injector in the first position 371 for a specific duration to deliver a fuel volume based on engine operating conditions, after which the actuator may 303 may increase the force applied to move the first injector needle further downwards towards the base of the fuel injector body against the force of the first set of springs 310 to a second open position 372, as illustrated in FIG. 20. In the second open position 372, in one example, the top section 304 of the first injector needle 316 as moving downward may not come in contact with the top section 306 of the second injector needle 318.

As the first injector needle 316 moves downward along the first chamber 322, fuel from the first chamber continues to be injected through the first set of nozzles 342, while the fluid channel 332 moves from complete fluidic connection to the first fuel supply branch 317 to a partial connection, still directing high-pressure fuel to the first chamber. The second injector needle 318 and the third injector needle 320 do not move downwards during the second open position 372, as there is no physical contact between the top section 306 of the second injector needle and the top section 304 of the first injector needle. Additionally, there is no physical contact between the top section 308 of the third injector needle and the top section 306 of the second injector needle. Therefore, the second injector needle and the third injector needle do not move downwards, towards the combustion chamber.

There is no fluidic connection between the fluid channel 334 and the second fuel supply branch 319 or between the fluid channel 336 and the third fuel branch 331. Hence, no fuel flows to the second chamber 324 or to the third chamber 326, and no fuel is injected through the second row of nozzles or the third set of nozzles fluidically coupled to the second chamber 324 and the third chamber 326, respectively.

Figure 21:
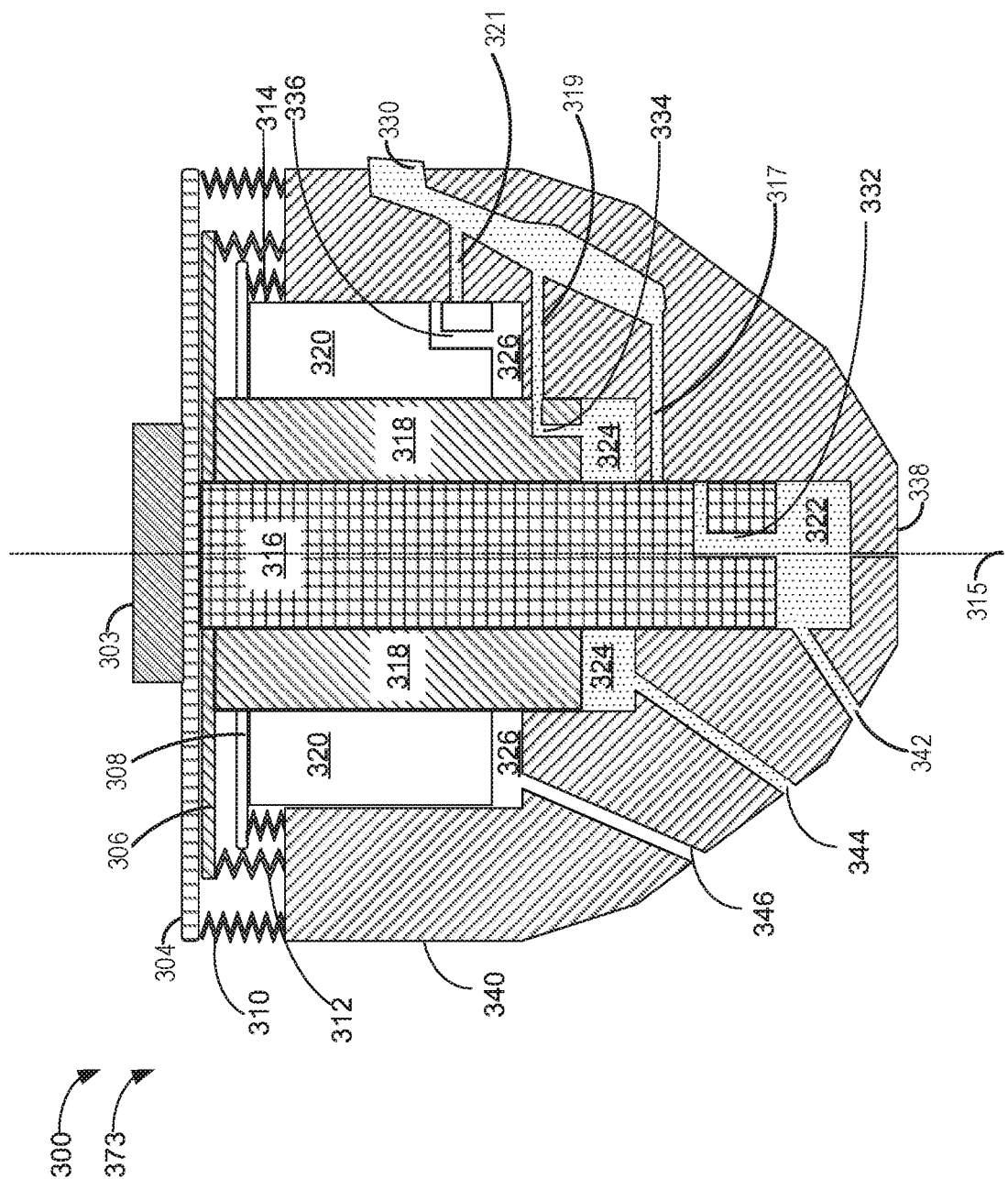
FIG. 21 shows the fuel injector assembly of FIG. 18 in a third open position.

A third open position 373 of the fuel injector 300 is illustrated in FIG. 21. As the fuel injector moves from the second position 371 (illustrated in FIG, 20) to the third position 373 (illustrated in FIG. 21), the actuator 303 moves the top section 304 of the first injector needle 316 downwards. Consequently, the tops section 306 of the second injector needle 318, which is in face sharing contact with the top section 304, also moves in a downward direction.

The downward movement of the first injector needle 316 and the second injector needle 318 results in the decoupling of the fluid channel 332 and the first fuel supply branch 317 and simultaneously the second fluid channel 334 is fluidically connected to the second fuel supply branch 319.

While the fluid channel 332 is fluidically disconnected from the first fuel supply branch 317, fuel continues to be injected through the first set of nozzles 342 as fuel is still present inside the first chamber 322. The pressure inside the first chamber 322 during the third position 373 is more than the pressure inside the first chamber in the first position 371 and the second open position 37.

High-pressure fuel is also present inside the second chamber 324 due to fluidic coupling of the fluid channel 334 to the second fuel supply branch 319. Fuel from the second chamber 324 is injected through the second set of nozzles 344. No fuel is present inside the third chamber 326 during the third open position 373 as there is no fluidic connection between the fluid channel 336 and the third fuel branch 321. Hence, no fuel is injected through the third set of nozzles fluidically coupled to the third chamber 326.

Figure 22:
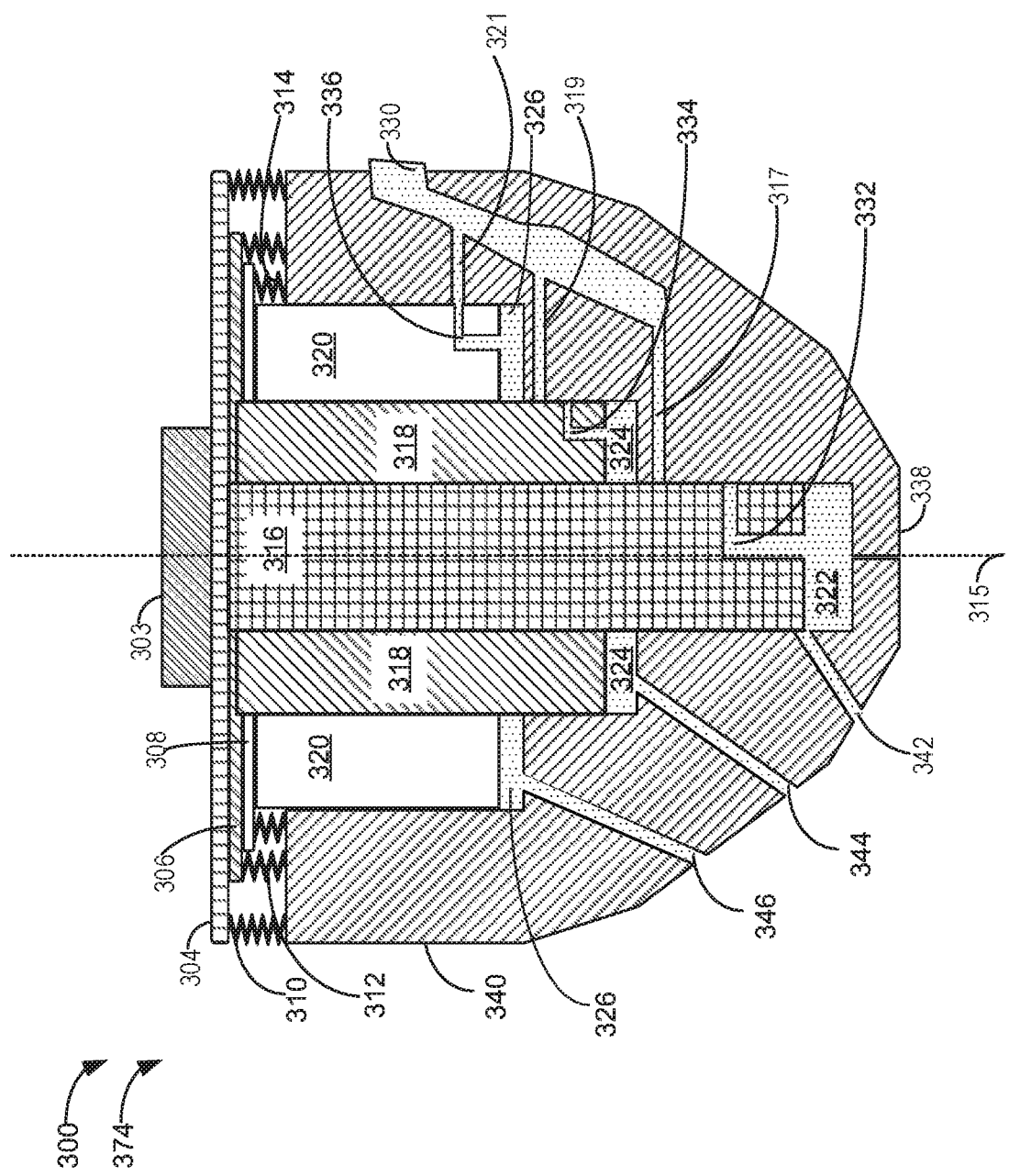
FIG. 22 shows the fuel injector assembly of FIG. 18 in a fourth open position.

The fuel injector 300 moves form the third open position 373 of FIG. 21 to a fourth open position 374, illustrated in FIG. 22. As the fuel injector moves from the third open position 371 (illustrated in FIG. 21) to the fourth open position 374, the actuator 303 moves the top section 304 of the first injector needle 316 downwards. Consequently, the top section 306 of the second injector needle 318, which is in face sharing contact with the top section 304, also moves in a downward direction and comes in contact with the top section 308 of the third injector needle 320. The top section 308 and the coupled third injector needle also move downwards, wherein the third injector needles moves downward inside the third chamber 326.

The downward movement of the first injector needle 316 along with the second injector needle 318 results in the decoupling of the second channel 334 and the second fuel supply branch 319, suspending fuel delivery to the second chamber. However, residual fuel volume is present in the second chamber after fuel delivery and fuel injection during the third position. As the second injector needle moves downwards, the volume of the second chamber 324 decreases. Additionally, the fluid channel 332 continues to remain disconnected from the first fuel supply branch 317 as the first injector needle moves downwards reducing the volume inside the first chamber 322 further. The downward movement of the third injector needle along the third chamber 326 brings the fluid channel 336 in fluidic connection with the third fuel branch 321.

While the fluid channel 332 is fluidically disconnected from the first fuel supply branch 317, fuel continues to be injected through the first set of nozzles 342 as fuel is still present inside the first chamber 322 (delivered during the first and second positions). The volume of the first chamber 322 containing fuel during the fourth open position 374 is less than the volume inside the first chamber containing fuel in each of the third, the second, and the first positions described above, The pressure inside the first chamber 322 during the fourth open position 374 is more than the pressure inside the first chamber in each of the third, the second, and the first positions described above.

Fuel is also present inside the second chamber 324 while there is no fluidic coupling between the second channel 334 to the second fuel supply branch 319 in the fourth position. Fuel from the second chamber 324 is injected through the second set of nozzles 344 The pressure inside the second chamber 324 during the fourth position 374 is more than the pressure inside the second chamber 324 in each of the third, the second, and the first positions described above.

Due to the fluidic coupling of the fluid channel 336 with the third fuel supply branch 321, fuel may be present inside the third chamber 326 during the fourth position 374. Fuel is injected through the third set of nozzles 346. Thus, in the fourth position, fuel is injected through each of the first, second, and third set of nozzles.

The actuator 303 may be deactivated (for example, by stopping current). Deactivation of the actuator 303 may cause each of the retention spring to bias upwards, away from the injector body 340. The upward movement of each of the retention springs moves the coupled top section of each of the injector needles upward, away from the injector body, returning the fuel injector 300 to the closed position of FIG. 18, thereby ending fuel injection. The upward movement of each of the injector needles upward fluidically disconnects each of the fluid channels from the respective fuel channel branches. During he upward movement of the injector needles, fluidic connection may be re-established and then disconnected for the fluid channel 332 and the fluid channels 334 from the respective fuel channel branches.

In one example, the fuel injector may be deactivated after the first position, while in another example, the fuel injector may be deactivated after the second position. In other examples, the fuel injector may be deactivated after the third position. The duration for which current may be maintained at a constant level during each of the open positions of the fuel injector may determine the volume of fuel injected through each of the nozzles holes, which in turn depends on engine operating conditions. In one example, when engine speed is low, less fuel volume is required to sustain engine operation. In contrast, when operating at high engine speed, more fuel may be injected through the fuel injector.

Figure 23:
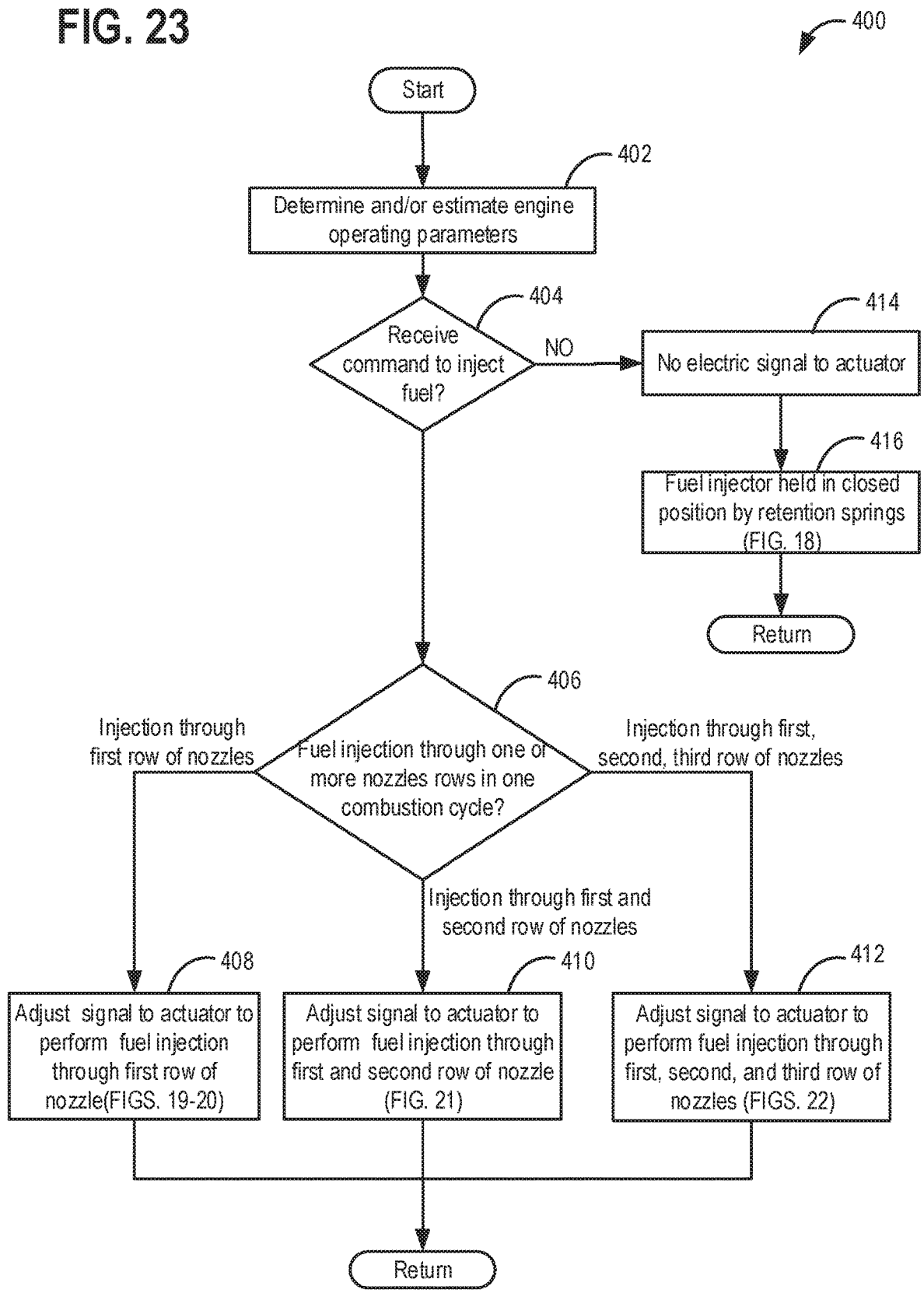
FIG. 23 depicts a high-level flow chart illustrating an example method for operating the fuel injector assembly of FIG. 18.
Figure 24:
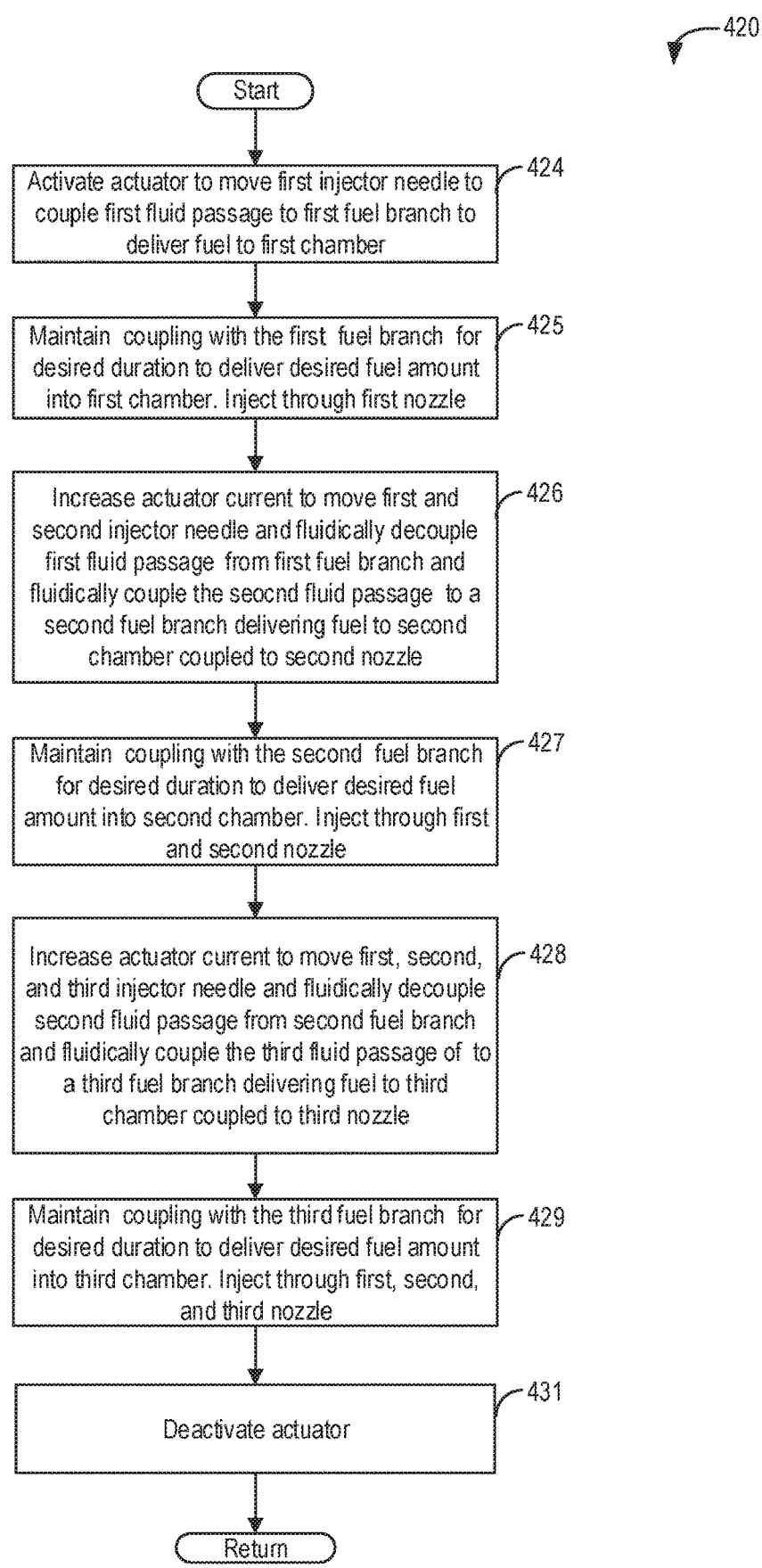
FIG. 24 shows an example method for performing fuel injections through the fuel injector assembly of FIG. 18.

Turning to FIG. 23, a flow chart illustrating an example method 400 for operating a fuel injector assembly, such as fuel injector assembly 300 at FIGS. 18-22, is shown. At least portions of method 400 may be implemented as executable controller instructions stored in non-transitory memory. Additionally, portions of method 400 may be actions taken in the physical world to transform an operating state of an actuator or device, such as the actuator 303 of the fuel injector assembly. Instructions for carrying out method 400 may be executed by a controller (e.g., controller 12) based on instructions stored on a memory of the controller and in conjunction with signals received from sensors of the engine system, such as the sensors described above with reference to FIG. 1. The controller may employ engine actuators of the engine system, such as actuator 303 at FIGS. 18-22, to adjust engine operation, according to the method described below.

Method 400 starts at 402. At 402, method 400 includes determining and/or estimating engine operating parameters. The engine operating parameters may include but are not limited to engine status (e.g., on or off), engine speed, engine torque demand, indicated engine torque, engine position, and engine temperature. After determining engine operating parameters, method 400 proceeds to 404.

At 404, method 400 includes determining if a command to inject fuel is received. Fuel may be injected to the engine when the engine is rotating and when engine operation is desired by the operator or by a controller. As an example, fuel may be injected in response to engine load above a threshold and/or in response to the firing order and engine position indicating that the injector is to inject fuel to initiate combustion in the cylinder. If the command to inject fuel is yes, method 400 proceeds to 406.

At 406, method 400 includes determining if the fuel injection mode for the current fuel injection event is through one or more rows of nozzles based on engine operating conditions. That is, the controller may confirm if a fuel injection is only through first row of nozzles, or through first and second row of nozzles, or through the first, second, and third row of nozzles for operating the engine. For example, fuel injection only through the first row of nozzles may be performed during one or more engine operating conditions including engine idle, to control exhaust catalyst temperature above a threshold, engine temperature above a threshold, and during engine hot-start conditions. Accordingly, based on engine operating conditions, if fuel injection through first set of nozzles is desired, method 400 proceeds to 408. At 408, method 400 includes adjusting an electrical signal to an actuator, such as actuator 303 of fuel injection assembly 300 shown at FIGS. 19-20, to perform fuel injection through the first row of nozzles. The method 400 then returns.

Fuel injection may be through the first and through the second row of nozzles, for example, if a torque demand is greater than a threshold and more fuel volume (e.g., more fuel than the fuel volume desired during less torque demand) needs to be injected to the combustion chamber. Additionally fuel through first and second row of nozzles may be injected during cold start conditions, wherein the additional exhaust energy generated may be partly utilized to bring a temperature of an emission control device to a threshold temperature, thereby improving catalyst light-off, and also, to maintain the temperature of the emission control device above a threshold. Fuel injections from each of the first row and the second row of nozzles may also be performed during highway cruise conditions to reduce fuel spray wall impingement and to reduce HC emissions. Thus, based on engine operating conditions, if fuel injection through both the first row and the second row is desired, method 400 proceeds to 410. At 410, method 400 includes adjusting the electrical signal to the fuel injector actuator to perform fuel injections through the first row and the second row of nozzles during a single combustion cycle, as illustrated in FIG. 21. The method 400 then returns.

During some engine operating conditions, it may be desirable to inject fuel through each of the first row, second row, and third row of nozzles for delivering desired torque, for regeneration or increasing temperature of one or more exhaust after-treatment devices (e.g., particulate filters, three-way catalyst). Fuel injections from each of the three rows of nozzles may be performed to deliver a small amount of fuel during the expansion stroke into the exhaust system to increase the exhaust gas temperature for the purposes of reducing catalyst light-off time and for diesel particulate filter regeneration. Under peak power and load conditions, fuel injection from each of the three rows of nozzles may be performed (one injection during the intake stroke and two injections during compression stroke) to reduce soot and NOx emissions. Accordingly, if fuel injections through each of the first, second, and third row of nozzles is desired during a single combustion event, method 400 proceeds to 412. At 412, method 400 includes adjusting the electrical signal to the fuel injector actuator to perform fuel injections through all three rows of nozzles during a single combustion cycle (illustrated in FIG. 22). Details of performing three fuel injections during a single combustion event will be further elaborated with respect to FIG. 24. The method 400 then returns.

Returning to 404, if it is determined that no command to inject fuel is received, no signal is sent to the actuator, as indicated at 414. At 416, the injector is held or moved upward by the retention springs, such as retention springs 310, 312, and 314 in FIG. 18, such that the injector needle is held in the closed position, resulting in closed fuel passages, and thus no fuel injection. The method 400 then returns.

FIG. 24 shows an example method 420 for operating a fuel injector, for example, the fuel injector 300 of FIGS. 18-22 in conjunction with the method 400 illustrated in FIG. 23. Specifically, the method illustrates control of a fuel injector actuator, such as actuator 303, illustrated in FIG. 18, for delivering fuel injections through first, second, and/or third row of nozzles. The fuel injector assembly may be utilized for direct or port fuel injection depending on positioning of the fuel injector within an engine cylinder or an intake manifold.

Method 420 begins at 424 by activating the fuel injector actuator to move the first fuel injector needle to fluidically couple the first fluid passage of the first injector needle to a first fuel branch. High-pressure fuel is delivered through the first fuel branch fluidically coupled to the first fluid passage to the first chamber. Activating the fuel injector may include an electrical signal, such as a current, being provided to an actuator coupled to the first injector needle. For example, a controller may determine a desired current to the actuator to move the first injector needle downwards to couple the first fluid passage to the first fuel branch, as illustrated in FIGS. 19-20. The controller may then supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector needle. The fluidic coupling of the first fluid passage and the first fuel branch may be partial or complete, delivering fuel to the first fuel chamber.

The method 420 proceeds to 425, holding the current supply to the actuator, maintaining the fluidic coupling of the first fluid passage and the first fuel branch, continuing to deliver high-pressure fuel to the first chamber. Fuel from the first chamber is injected through the first row of nozzles, as illustrated in FIGS. 19-20. In this example, it may be assumed that prior to activation, the fuel injector assembly is initially is a closed state, where no signal is supplied to the actuator and the first passage of the first fuel injector needle is decoupled from the first fuel branch. Hence, no fuel is present inside the first chamber and no fuel is injected, as illustrated in FIG. 18.

At 426, the method 420 includes increasing current supply to the actuator, moving the first injector needle together with the second injector needle downwards, towards the injector nozzles. The downward movement of the first injector and the second injector results in decoupling of the first fluid passage from the first fuel branch, ending high-pressure fuel supply to the first chamber. The downward movement of the first fuel injector needle along the first chamber increases the pressure inside the first chamber with residual fuel (that is, fuel left in first chamber after injection through first row of nozzles at 425). Additionally, the downward movement of the first and the second injector needle results in fluidic coupling of the second fluid passage of the second injector needle with the second fuel branch. The coupling of the second fluid passage to the second fuel branch results in supply of high-pressure fuel to the second chamber, which is coupled to the second row of nozzles.

The method 420 proceeds to 427, maintaining the current supply to the actuator to maintain the coupling of the second fluid passage and the second fuel branch, continuing to deliver high-pressure fuel to the second chamber. Fuel from the second chamber may be injected through the second row of nozzles to the combustion chamber. Additionally, fuel continues to be injected from the first chamber through the first row of nozzles The method 420 proceeds to 428, further increasing the current to the actuator moving the first injector needle along with the second and third fuel injector needles along the respective chambers. The controller may increase the current to the fuel injector actuator moving the first fuel injector needle further downwards wherein top section of the first injector needle comes in face-sharing contact with the top section of the second injector needles. The top section of the second injector needle may be in face-sharing contact with the top section of the third injector needle. Thus, downward movement of the first injector needle also moves the second and the third injector needles downward. The downward movement of the injector needles decouples the second fluid passage from the second fuel branch, ending high-pressure fuel delivery to the second chamber. The downward movement of the first fuel injector needle along the first chamber increases the pressure inside the first chamber with residual fuel (that is, fuel left in first chamber after injection through first row of nozzles at 427). The downward movement of the second fuel injector needle along the second chamber increases the pressure inside the second chamber with residual fuel (that is, fuel left in second chamber after injection through second row of nozzles at 427). Additionally, the third fluid passage is coupled to the third fuel branch, delivering high-pressure fuel to the third chamber.

The method 420 proceeds to 429, maintaining the current supply to the actuator to maintain the coupling of the third fluid passage and the third fuel branch, continuing to deliver high-pressure fuel to the third chamber. Fuel from the third chamber may be injected through the third row of nozzles to the combustion chamber. Additionally, fuel continues to be injected from the second chamber through the second row of nozzles, and from the first chamber through the first row of nozzles.

The method 420 then proceeds to 431, where the actuator is deactivated by ending current supply to the injector. Deactivating the fuel injector actuator includes stopping providing signal to the actuator. In the absence of an electric signal to the electric actuator, the plurality of retention springs coupled to the injector body and to each of the injector needles push the first, second, and third injector needles upward along the longitudinal axis, away from the nozzles. In one example, the actuator may be deactivated after fuel injection at 425 or after fuel injection at 427, ending fuel injection. In this way, the fuel injector assembly may be utilized to deliver fuel injections via the first row, second row, and/or third row of nozzles based on engine operating parameters.

FIG. 25 illustrates a sequence 450 for fuel injections through three rows of injector nozzles, wherein each row of the injector nozzle is along a different vertical plane of the injector body. The sequence of FIG. 25 may be observed during operation by the system of FIGS. 1 and 18 by utilizing the method of FIGS. 23 and 24.

A first graph with a plot 452 shows fluidic coupling of each fluid channel of the three injector needles to respective fuel branch line, such as fluidic coupling of each fluid channel 334, 334, and 336 to fuel supply branch 317, 319, or 321 respectively, as illustrated in FIGS. 19-22. Plot 452 indicates change in fluidic coupling of the fluid channel as the injector needle/s move in a downward direction along a longitudinal axis of the fuel injector in the direction of Y-axis arrow.

The second graph with a plot 454 shows current supplied to the actuator versus time. Plot 454 represents current over time, and the current increases in the direction of the Y-axis arrow.

The third graph with a plot 456 shows fuel injection rate versus time. Plot 456 represents fuel injection rate over time, and the fuel injection rate increases in the direction of the Y-axis arrow. All plots show time increasing along the direction of the X-axis arrow.

At time t0, the fuel injector is in a deactivated or rest state. In the deactivated state, the fuel injector needles are held in a closed position by the force of the retention springs. No current is supplied to the actuator (plot 454). In the closed position, none of the fluid channels is coupled to the respective fuel branch lines (plot 452). Thus, fuel is not supplied to any of the three fuel chambers and thus, no fuel is injected through any of the nozzles between t0-t1, and fuel delivery does not take place (plot 456). The closed position of the fuel injector assembly is illustrated in FIG. 18.

Between t0 and t1, an electric signal (that is, current) is supplied to the actuator (plot 454). As a result, the first fuel injector needle moves in a downward direction along a longitudinal axis of the injector. As the current increases, the first injector needle moves further downwards from the rest position towards the first fuel branch, as indicated by the plot 452. At t1, the fluid passage of the first injector needle is partially coupled to the first fuel branch line (plot 452), and as a result fuel starts entering the first chamber and fuel injection starts through the first row of nozzles (plot 456). In case of direct fuel injection, fuel is injected into the engine cylinder and in case of port fuel injection, fuel is injected into the intake manifold.

Between t1 and t2, as the current to the actuator is increased (plot 454), the first injector needle is further pushed downwards and at t2, the fluid passage of the first injector needle is fully coupled to the first fuel branch line. Accordingly, the fuel injection rate increases (plot 456).

Between t2 and t3, a constant holding current (plot 454) is supplied to the actuator. As a result, the fluid passage of the first injector needle remains fully coupled to the first fuel branch line (plot 452), and the fuel is delivered at a constant fuel injection rate via the first row of nozzles (plot 456).

At t3, current supply to the actuator is increased further (plot 454). As a result, the first fuel injector needle with the fluid passage moves further in downwards direction, away from the first fuel branch, resulting in partial coupling of the fluid passage of the first fuel injector with the first fuel branch line (plot 452) between t3 to t4. Fuel continues to be injected through the first row of nozzles at a constant fuel injection rate (plot 456).

At t4, the fluid passage of the first fuel injector, which is fluidically decoupled from the first fuel branch, line (plot 452). However, fuel present in the first chamber continues to be delivered through the first row of nozzles at constant rate (plot 456) between t4-t5. The fuel injector current increases between t4-t5 (plot 454), and the downward movement of the first and the second injector enables at t5 to partially couple the fluid passage of the second fuel injector needle with the second fuel branch line (plot 452). As a portion of the fluid passage of the second fuel injector needle comes in contact with a portion of the second fuel branch line, fuel is delivered to the second chamber and is injected through the second row of nozzles, as well as continues to be injected from the first row of nozzles (plot 456). As the current increases, at t6 the fluid passage of the second fuel injector needle is fully fluidically coupled to the second fuel branch line.

The current is held constant during t6 to t7 (plot 454), and fuel is injected through the second row of nozzles and through the first row of nozzles (plot 456). The current is further increased between t7 and t8, moving the first and the second fuel injector needles further downward, establishing partial fluidic coupling between the fluid passage of the second fuel injector needle and the second fuel branch line. Fuel continues to be injected through the first and the second row of nozzles between t7 and t8. At t8, the current continues to increase (plot 454), moving the first, the second, and the third injector needle further downward, fluidically disconnecting from the fluid passage of the second injector needle from the second fuel branch line, while fuel continues to be injected through the first and the second row at constant rate between t8-t9 (plot 456).

Between t9 and t10, the fluid passage of the third injector needle is partially coupled to the third fuel branch line (plot 452) due to the increasing current (plot 454). Partial coupling of the fluid passage of the third injector needle to the third fuel branch line, fuel in delivered to the third fuel chamber and fuel is injected through the third row, and through the second and the first row of nozzles, increasing fuel injection rate (plot 456) between t9-t10. At t10, the fluid passage of the third injector needle is fully coupled to the third fuel branch line. The current to the injector is held for the desired duration, injecting fuel through the third row of nozzles and from the second and the first row of nozzles between t10 and t11.

At t11, the current to the actuator decreases, moving the first, the second, and the third injector needle upwards. Between t11 and t12, the third injector needle is partially coupled to the third fuel branch line (plot 452) due to the decreasing current (plot 454). Fuel continues to be injected at a constant rate from the third row of nozzles and from the first and the second row of nozzles (plot 456).

At t12, the fluid passage of the third injector needle is fully decoupled from the third fuel branch line. The current to the injector is suspended, and the fuel injector moves to the closed positioned ending fuel injection from all the fuel injector nozzles holes between t12-t13. As the injector needles move upwards to the closed position between t12-t13, fluidic coupling between each of the fluid passage and the respective fuel branch may be re-established for a short duration and at t13 when the injector is in the closed position, no more fuel is injected through the nozzle holes (plot 456).

In this way, fuel injections through the first, second, and/or third row of nozzles may be performed during one cycle of the fuel injector needle movement, increasing fuel spray atomization for fuel distribution, which enhances combustion efficiency. Further, fuel injection via the first row of nozzles may commence at a first, lower pressure. Then, as the first injector needle continues to move downward as the fuel injection event proceeds, the fuel may be injected from the first row of nozzles at a second, higher pressure, and then at a third, still higher pressure. Likewise, the fuel injected out of the second row of nozzles may first be injected at a first, lower pressure, and then as the second injector needle moves downward, the fuel may be injected from the second row of nozzles at a second, higher pressure. The fuel injected out of the third row of nozzles may be injected at a single pressure.

In this way, the fuel injector may provide variable-pressure fuel injection. This variable injection pressure may be provided via three distinct fuel chambers within the fuel injector. Each of the fuel chambers may be subject to different pressures as the volumes of the chambers change and as fluidic coupling and decoupling from the fuel supply occur over the course of the fuel injection event. The three fuel chambers may be provided fuel from the same fuel supply, and the fuel supply may be maintained at a constant pressure over the course of the fuel injection event. Additionally, each fuel chamber may be configured to fluidically couple to only a single row of nozzles, and the nozzles to which each chamber couples does not change over the course of the fuel injection event.

The technical effect of injecting fuel through three rows of injector nozzles, wherein each row of injector nozzle is at different vertical plane of the injector body, is reducing fuel penetration and fuel impingement into cylinder wall by injecting fuel at different locations of the combustion chamber. The high-pressure fuel injected through the injector nozzles enhances fuel spray atomization, thereby improving combustion characteristics, which in turn reduces emissions. Additionally, the ability of the fuel injector assembly to perform up to five fuel injections in one actuation cycle of the fuel injector allows fuel pre-injection, fuel main injection, and fuel post injection based on engine operating parameters with accurate control of timing between two consecutive injections. This may further enhance emission quality, increase combustion efficiency, and reduce wear and tear of the fuel injector.

An example method for a fuel injector, comprises injecting fuel from the fuel injector by displacing a plurality of fuel injector needles of the fuel injector to deliver fuel through a first nozzle coupled to a first fuel chamber, a second nozzle coupled to a second fuel chamber, and a third nozzle coupled to a third fuel chamber during a single actuation cycle of the fuel injector. In the preceding example, additionally or optionally, displacing the plurality of fuel injector needles comprises displacing a first injector needle of the plurality of fuel injector needles for a first distance from a closed position to a first open position, wherein at the first open position, the fuel injector injects fuel through the first nozzle fluidically coupled to the first chamber, the first chamber receiving fuel through a first passage of the first injector needle fluidically coupled to a first fuel branch. In any or all of the preceding examples, additionally or optionally, displacing the first injector needle further comprises displacing the first injector needle along with a second injector needle of the plurality of fuel injector needles for a second distance from the first open position to the second open position, wherein at the second open position, the fuel injector injects fuel through the second nozzle and through the first nozzle. In any or all of the preceding examples, additionally or optionally, at the second open position, the second chamber receives fuel through a second passage of the second injector needle, the second passage coupled to a second fuel branch, and at the second open position, the first injector needle is fluidically decoupled from the first fuel branch and the first chamber does not receive fuel through the first passage of the first injector needle. In any or all of the preceding examples, additionally or optionally, displacing the first injector needle further comprises displacing the first injector needle along with the second injector needle and a third injector needle of the plurality of injector needles for a third distance from the second open position to a third open position, wherein at the third open position, the fuel injector injects fuel through the third nozzle, through the second nozzle, and through the first nozzle. In any or all of the preceding examples, additionally or optionally, at the third open position, the third chamber receives fuel through a third passage of the third injector needle coupled to a third fuel branch, the first chamber is fluidically decoupled from the first fuel branch and does not receive fuel through the first passage of the first injector needle, and the second chamber is fluidically decoupled from the second fuel branch and does not receive fuel through the second passage of the second injector needle. In any or all of the preceding examples, additionally or optionally, a third pressure in the first chamber at the third open position is more than a second pressure in the first chamber at the second open position and the second pressure is more than a first pressure in the first chamber at the first open position. In any or all of the preceding examples, additionally or optionally, a fourth pressure in the second chamber at the third open position is more than a fifth pressure in the second chamber at the second open position. In any or all of the preceding examples, additionally or optionally, further comprising moving the fuel injector from the third open position to the closed position via the second open position and the first open position, wherein at the closed position, no fuel is delivered to each of the first chamber, the second chamber, and the third chamber, and no fuel is injected through the first nozzle, the second nozzle, and the third nozzle.

An example fuel injector system, comprising a fuel injector body including a first nozzle positioned vertically below a second nozzle and the second nozzle positioned vertically below a third nozzle, a first injector needle movable within a first chamber of the fuel injector body, the first injector needle including a first fluid passage configured to couple to a first fuel supply branch, the first chamber fluidically connected to the first nozzle, a second annulus injector needle surrounding at least a portion of the first fuel injector needle, the second annulus fuel injector needle movable within a second chamber of the fuel injector body, the second annulus injector needle including a second fluid passage configured to couple to a second fuel supply branch, the second chamber fluidically connected to the second nozzle, a third annulus injector needle surrounding at least a portion of the second annulus injector needle, the third annulus injector needle movable within a third chamber of the fuel injector body, the third annulus fuel injector needle including a third fluid passage configured to couple to a third fuel supply branch, the third chamber fluidically connected to the third nozzle, and an actuator for controlling a movement of the first fuel injector needle. In the preceding example, additionally or optionally, further comprising a controller storing non-transitory instructions in memory that when executed cause the controller to: responsive to a command to inject fuel to the cylinder, perform an actuation cycle of the fuel injector to conduct a plurality of fuel injections, during the actuation cycle, activate the actuator to move the first injector needle downward by a first distance, fluidically coupling the first fuel supply branch to the first chamber and therein performing a first fuel injection through the first nozzle. In any or all of the preceding examples, additionally or optionally, the instructions further cause the controller to activate the actuator to move the first injector needle and the second injector needle downward by a second distance, fluidically coupling the second fuel supply branch to the second chamber and fluidically decoupling the first fuel supply branch and the first chamber, and therein performing a second fuel injection through the second nozzle and the first nozzle. In any or all of the preceding examples, additionally or optionally, the instructions further cause the controller to activate the actuator to move the first injector needle, the second injector needle, and the third injector needle downward by a third distance, fluidically coupling the third fuel supply branch to the third chamber and fluidically decoupling the second fuel supply branch and the second chamber, and therein performing a third fuel injection through each of the third nozzle, the second nozzle, and the first nozzle. In any or all of the preceding examples, additionally or optionally, wherein each of the first fuel supply branch, the second fuel supply branch, and the third fuel supply branch are coupled to a common high-pressure fuel supply.

Another example method for a fuel injector comprising, moving an injector needle from a first position to a fourth position via a second position and a third position, performing a first fuel injection at the second position, a second fuel injection at the third position, and a third fuel injection at the fourth position, and subsequently moving the needle from the fourth position to the first position via the third position and the second position, and performing a fourth fuel injection at the third position and a fifth fuel injection at the second position. Moving the injector needle from the first position to the second position, from the second position to the third position, and from the third position to the fourth position happens simultaneously with the first, second, and third fuel injection events, respectively. In the preceding example, additionally or optionally, further comprising, during the second fuel injection, holding the needle at the third position for a desired duration, the desired duration based on a desired fuel injection amount. In any or all of the preceding examples, additionally or optionally, wherein moving the needle from the first position to the fourth position includes initiating an electrical input to the actuator at the first position and increasing the input to a desired value, the desired value based on a displacement of the needle from the first position to the fourth position. In any or all of the preceding examples, additionally or optionally, further comprising, during the third fuel injection, holding the needle at the fourth position by maintaining the electrical input at the desired value for the desired duration. In any or all of the preceding examples, additionally or optionally, wherein moving the needle from the fourth position to the first position includes decreasing the electrical input over time from the desired value from the fourth position to the first position and stopping the input when the needle is at the first position. When the needle is at the fourth position, the electrical input to the needle is decreased to move the needle from the fourth position back to the first position. Once the needle reaches the first position the electrical input to the needle ends. In any or all of the preceding examples, additionally or optionally, wherein the injector needle at the first position is vertically above the injector needle in second position and the injector needle in the second position is vertically above the injector needle in the third position along a longitudinal axis of the injector needle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
injecting fuel from a fuel injector by displacing a plurality of fuel injector needles of the fuel injector along a longitudinal axis of the fuel injector to deliver the fuel through a first nozzle of the fuel injector coupled to a first fuel chamber of the fuel injector, a second nozzle of the fuel injector coupled to a second fuel chamber of the fuel injector, and a third nozzle of the fuel injector coupled to a third fuel chamber of the fuel injector during a single actuation cycle of the fuel injector, and the plurality of fuel injector needles comprising a second injector needle encircling a first injector needle, an outlet of the second nozzle positioned vertically above an outlet of the first nozzle along the longitudinal axis of the fuel injector and an outlet of the third nozzle positioned vertically above the outlet of the second nozzle along the longitudinal axis of the fuel injector, wherein the fuel that is delivered through the first nozzle, the second nozzle, and the third nozzle is supplied by a common fuel supply configured to fluidly couple to each of the first fuel chamber, the second fuel chamber, and the third fuel chamber.

2. The method of claim 1, wherein displacing the plurality of fuel injector needles along the longitudinal axis of the fuel injector comprises displacing the first injector needle for a first distance along the longitudinal axis of the fuel injector from a closed position to a first open position, wherein at the first open position, the fuel injector injects fuel through the first nozzle fluidically coupled to the first fuel chamber, the first fuel chamber receiving fuel through a first passage of the first injector needle fluidically coupled to a first fuel branch, and wherein the second nozzle is spaced apart from the first nozzle and spaced apart from the third nozzle.

3. The method of claim 2, wherein displacing the first injector needle along the longitudinal axis of the fuel injector further comprises displacing the first injector needle along with the second injector needle for a second distance along the longitudinal axis of the fuel injector from the first open position to a second open position, wherein at the second open position, the fuel injector injects fuel through the second nozzle and through the first nozzle.

4. The method of claim 3, wherein at the second open position, the second fuel chamber receives fuel through a second passage of the second injector needle, the second passage coupled to a second fuel branch, and at the second open position, the first injector needle is fluidically decoupled from the first fuel branch and the first fuel chamber does not receive fuel through the first passage of the first injector needle.

5. The method of claim 3, wherein displacing the first injector needle along the longitudinal axis of the fuel injector further comprises displacing the first injector needle along with the second injector needle and a third injector needle of the plurality of injector needles for a third distance along the longitudinal axis of the fuel injector from the second open position to a third open position, wherein at the third open position, the fuel injector injects fuel through the third nozzle, through the second nozzle, and through the first nozzle.

6. The method of claim 5, wherein at the third open position, the third fuel chamber receives fuel through a third passage of the third injector needle coupled to a third fuel branch, the first fuel chamber is fluidically decoupled from the first fuel branch and does not receive fuel through the first passage of the first injector needle, and the second fuel chamber is fluidically decoupled from the second fuel branch and does not receive fuel through the second passage of the second injector needle.

7. The method of claim 6, wherein a third pressure in the first fuel chamber at the third open position is more than a second pressure in the first fuel chamber at the second open position and the second pressure is more than a first pressure in the first fuel chamber at the first open position.

8. The method of claim 6, wherein a fourth pressure in the second fuel chamber at the third open position is more than a fifth pressure in the second fuel chamber at the second open position.

9. The method of claim 6, further comprising moving the first injector needle from the third open position to the closed position via the second open position and the first open position, wherein at the closed position, no fuel is delivered to each of the first fuel chamber, the second fuel chamber, and the third fuel chamber, and no fuel is injected through the first nozzle, the second nozzle, and the third nozzle.

10. A method, comprising:
injecting fuel from a fuel injector by displacing a plurality of fuel injector needles along a longitudinal axis of the fuel injector to deliver the fuel to a cylinder through a first row of nozzles coupled to a first fuel chamber, a second row of nozzles coupled to a second fuel chamber, and a third row of nozzles coupled to a third fuel chamber during a single actuation cycle of the fuel injector, the displacing including displacing a first injector needle for a first distance along the longitudinal axis of the fuel injector from a closed position to a first open position, wherein at the first open position, the fuel injector injects fuel through the first row of nozzles, the injecting further including selectively coupling and decoupling the first fuel chamber to a first fuel branch, the second fuel chamber to a second fuel branch, and the third fuel chamber to a third fuel branch, the first fuel chamber receiving fuel through a first passage of the first injector needle fluidically coupled to the first fuel branch, the plurality of fuel injector needles including a second injector needle encircling the first injector needle, and wherein respective outlets of the second row of nozzles are positioned vertically above respective outlets of the first row of nozzles along the longitudinal axis of the fuel injector and respective outlets of the third row of nozzles are positioned vertically above the respective outlets of the second row of nozzles along the longitudinal axis of the fuel injector, the second row of nozzles spaced apart from the first row of nozzles and spaced apart from the third row of nozzles,
wherein displacing the first injector needle along the longitudinal axis of the fuel injector further comprises displacing the first injector needle along with the second injector needle for a second distance along the longitudinal axis of the fuel injector from the first open position to a second open position, wherein at the second open position, the fuel injector injects fuel through the second row of nozzles and through the first row of nozzles.

11. The method of claim 10, wherein at the second open position, the second fuel chamber receives fuel through a second passage of the second injector needle, the second passage coupled to the second fuel branch, and at the second open position, the first injector needle is fluidically decoupled from the first fuel branch and the first fuel chamber does not receive fuel through the first passage of the first injector needle.

12. The method of claim 10, wherein displacing the first injector needle along the longitudinal axis of the fuel injector further comprises displacing the first injector needle along with the second injector needle and a third injector needle of the plurality of injector needles for a third distance along the longitudinal axis of the fuel injector from the second open position to a third open position, wherein at the third open position, the fuel injector injects fuel through the third row of nozzles, through the second row of nozzles, and through the first row of nozzles.

13. The method of claim 12, wherein at the third open position, the third fuel chamber receives fuel through a third passage of the third injector needle coupled to the third fuel branch, the first fuel chamber is fluidically decoupled from the first fuel branch and does not receive fuel through the first passage of the first injector needle, and the second fuel chamber is fluidically decoupled from the second fuel branch and does not receive fuel through the second passage of the second injector needle.

14. The method of claim 13, wherein a third pressure in the first fuel chamber at the third open position is more than a second pressure in the first fuel chamber at the second open position and the second pressure is more than a first pressure in the first fuel chamber at the first open position, wherein a fourth pressure in the second fuel chamber at the third open position is more than a fifth pressure in the second fuel chamber at the second open position.

15. The method of claim 13, further comprising moving the first injector needle from the third open position to the closed position along the longitudinal axis of the fuel injector via the second open position and the first open position, wherein at the closed position, no fuel is delivered to each of the first fuel chamber, the second fuel chamber, and the third fuel chamber, and no fuel is injected through the first row of nozzles, the second row of nozzles, and the third row of nozzles.

16. A method, comprising:
operating an engine in a first operating mode;
in response to determining that the engine is operating in the first operating mode, injecting fuel from a fuel injector by displacing a first fuel injector needle, a second fuel injector needle, and a third fuel injector needle to deliver fuel through a first row of nozzles coupled to a first fuel chamber, a second row of nozzles coupled to a second fuel chamber, and a third row of nozzles coupled to a third fuel chamber during a first single actuation cycle of the fuel injector;
operating the engine in a second operating mode;
in response to determining that the engine is operating in the second operating mode, injecting fuel from the fuel injector by displacing the first fuel injector needle and the second fuel injector needle to deliver fuel through only the first row of nozzles and the second row of nozzles during a second single actuation cycle of the fuel injector.

17. The method of claim 16, further comprising operating the engine in a third operating mode, and in response to determining that the engine is operating in the third operating mode, injecting fuel from the fuel injector by displacing the first fuel injector needle to deliver fuel through only the first row of nozzles during a third single actuation cycle of the fuel injector.

18. The method of claim 17, wherein the first operating mode includes a request to regenerate a particulate filter coupled in an exhaust passage downstream of the engine, the second operating mode includes a torque demand being greater than a threshold, and the third operating mode includes the torque demand being less than the threshold.

* * * * *